(12) United States Patent
Duan et al.

(10) Patent No.: US 11,855,746 B2
(45) Date of Patent: Dec. 26, 2023

(54) INTER-SATELLITE LINK AIDED UE POSITIONING IN NON-TERRESTRIAL NETWORK

(71) Applicant: QUALCOMM Incorporated, San Diego, CA (US)

(72) Inventors: Weimin Duan, San Diego, CA (US); Jun Ma, San Diego, CA (US); Mehmet Izzet Gurelli, San Diego, CA (US); Huilin Xu, Temecula, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 17/643,069

(22) Filed: Dec. 7, 2021

(65) Prior Publication Data

US 2023/0179295 A1 Jun. 8, 2023

(51) Int. Cl.
*H04B 7/185* (2006.01)
*H04L 5/00* (2006.01)

(52) U.S. Cl.
CPC ..... *H04B 7/18554* (2013.01); *H04B 7/18543* (2013.01); *H04L 5/0051* (2013.01)

(58) Field of Classification Search
None
See application file for complete search history.

(56) References Cited

U.S. PATENT DOCUMENTS

| 4,987,420 | A | 1/1991 | Inamiya | |
|---|---|---|---|---|
| 2014/0194145 | A1 | 7/2014 | Do et al. | |
| 2014/0295881 | A1* | 10/2014 | Werner | G01S 5/0236 455/456.1 |
| 2022/0225119 | A1* | 7/2022 | Liberg | H04B 7/18513 |

OTHER PUBLICATIONS

International Search Report and Written Opinion—PCT/US2022/045251—ISA/EPO—dated Feb. 13, 2023.
Liu C., et al., "Dual-Satellite Source Geolocation with Time and Frequency Offsets and Satellite Location Errors", 2017 20th International Conference on Information Fusion (Fusion), International Society of Information Fusion (ISIF), Jul. 10, 2017 (Jul. 10, 2017), 8 Pages, XP033142540, DOI: 10.23919/ICIF.2017.8009716 [retrieved on Aug. 11, 2017] p. 1, right-hand column, paragraph 2 figure 1.

* cited by examiner

*Primary Examiner* — Willie J Daniel, Jr.
(74) *Attorney, Agent, or Firm* — QUALCOMM Incorporated

(57) ABSTRACT

Aspects presented herein may improve the precision and performance of a TDOA-based UE positioning scheme that is associated with an NTN. In one aspect, a UE receives, from a first satellite, a first PRS at a first reception time. The UE receives, from a second satellite, a second PRS at a second reception time and an indication of a transmission-reception time difference, the transmission-reception time difference being a difference between a time the second satellite transmits the second PRS to the UE and a time the second satellite receives an RS from the first satellite. The UE calculates an RSTD for the first PRS and the second PRS based at least in part on the first reception time of the first PRS, the second reception time of the second PRS, and the transmission-reception time difference.

30 Claims, 27 Drawing Sheets

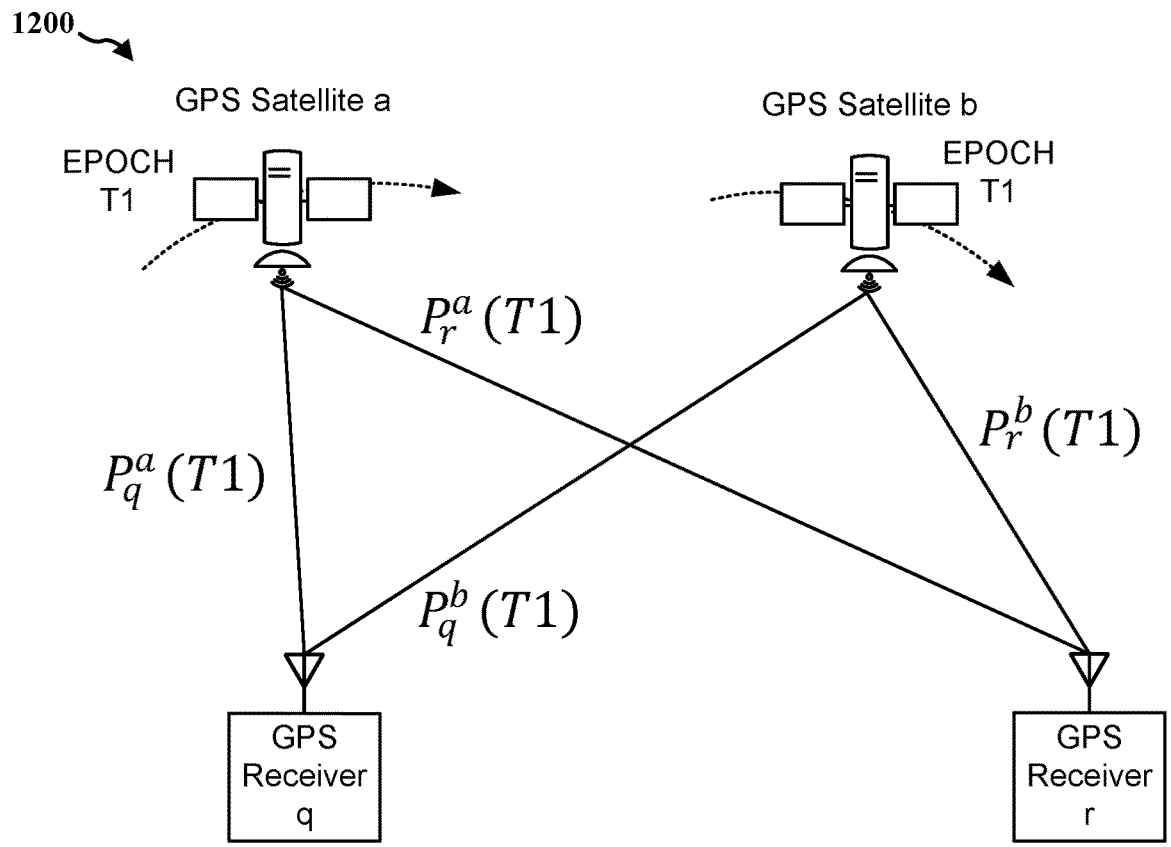
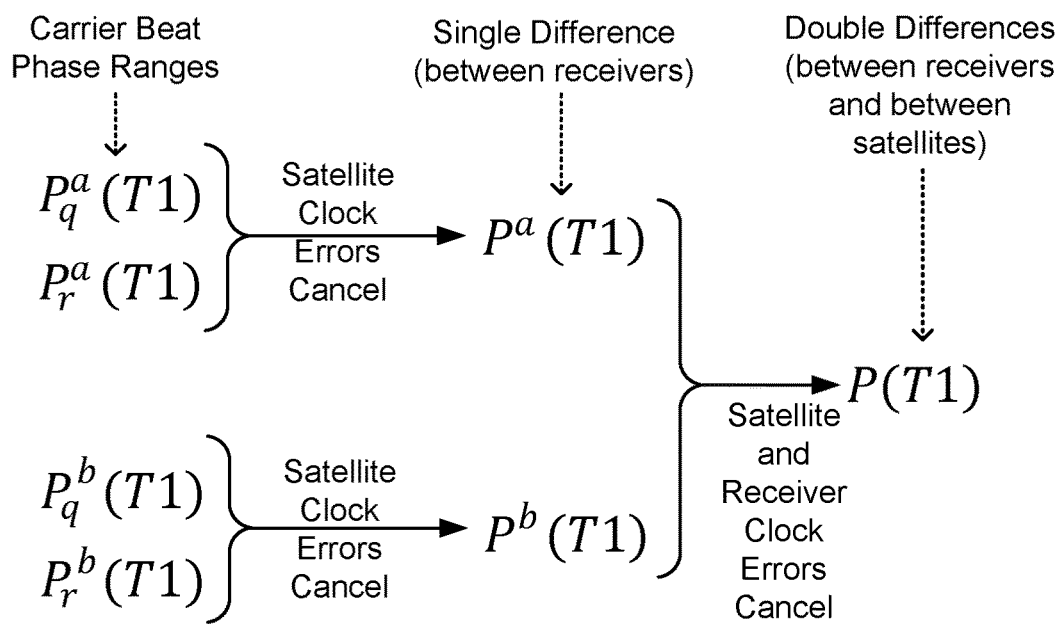
FIG. 12

INTER-SATELLITE LINK AIDED UE POSITIONING IN NON-TERRESTRIAL NETWORK

TECHNICAL FIELD

The present disclosure relates generally to communication systems, and more particularly, to wireless communications involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some communication systems may also support a number of cellular network-based positioning technologies, where the geographic location of a wireless device may be determined based on measuring radio signals exchanged between the wireless device and other wireless devices. For example, a distance between a wireless device and a transmission reception point (TRP) may be estimated based on the time it takes for a reference signal (e.g., a positioning reference signal (PRS)) transmitted from the TRP to reach the wireless device. Other examples of cellular network-based positioning technologies may include downlink-based, uplink-based, and/or downlink-and-uplink-based positioning methods.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a first satellite, a first positioning reference signal (PRS) at a first reception time ($T_{\_Rx \leftarrow sat\_1}$). The apparatus receives, from a second satellite, a second PRS at a second reception time ($T_{\_Rx \leftarrow sat\_2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives a reference signal (RS) from the first satellite. The apparatus calculates a reference signal time difference (RSTD) for the first PRS and the second PRS based at least in part on the first reception time of the first PRS ($T_{\_Rx \leftarrow sat\_1}$), the second reception time of the second PRS ($T_{\_Rx \leftarrow sat\_2}$), and the transmission-reception time difference ($T_{sat\_2\_Tx \rightarrow Rx}$).

In an aspect of the disclosure, a method, a computer-readable medium, and an apparatus are provided. The apparatus transmits, to a second satellite, an RS at a first transmission time. The apparatus transmits, to a UE, a PRS at a second transmission time. The apparatus transmits, to the UE, an indication of a time gap ($T_{gap,iner-sat\_RS\_1 \rightarrow PRS\_1}$) between the first transmission time and the second transmission time.

In an aspect of the disclosure, a method, a computer-readable medium, and an apparatus are provided. The apparatus receives, from a first satellite, an RS at a first reception time. The apparatus transmits, to a UE, a PRS at a first transmission time. The apparatus transmits, to the UE, an indication of a transmission-reception time difference ($T_{sat\_2\_Tx \rightarrow Rx}$) between the first reception time and the first transmission time.

In an aspect of the disclosure, a method, a computer-readable medium, and an apparatus are provided. The apparatus receives, from a first satellite, a first PRS at a first reception time ($T_{\_Rx \leftarrow sat\_1}$). The apparatus receives, from a second satellite, a second PRS at a second reception time ($T_{\_Rx \leftarrow sat\_2}$), the second PRS being transmitted from the first satellite and relayed to the UE via the second satellite. The apparatus calculates a RSTD for the first PRS and the second PRS based at least in part on the first reception time of the first PRS ($T_{\_Rx \leftarrow sat\_1}$), the second reception time of the second PRS ($T_{\_Rx \leftarrow sat\_2}$), and a group delay ($T_{GD\_BP}$) associated with the second satellite.

In an aspect of the disclosure, a method, a computer-readable medium, and an apparatus are provided. The apparatus transmits, to a UE, a first PRS at a first transmission time. The apparatus transmits, to a second satellite, a second PRS at a second transmission time, the second PRS being relayed to the UE via the second satellite. The apparatus transmits, to the UE, an indication of a time gap ($T_{gap,PRS\_2 \rightarrow PRS\_1}$) between the first transmission time and the second transmission time.

In an aspect of the disclosure, a method, a computer-readable medium, and an apparatus are provided. The apparatus receives, from a first satellite, a PRS at a first reception time. The apparatus relays, to a UE, the PRS at a first relay time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a diagram illustrating an example of a double difference between receivers and between satellites in accordance with various aspects of the present disclosure.

DETAILED DESCRIPTION

Figure 1:
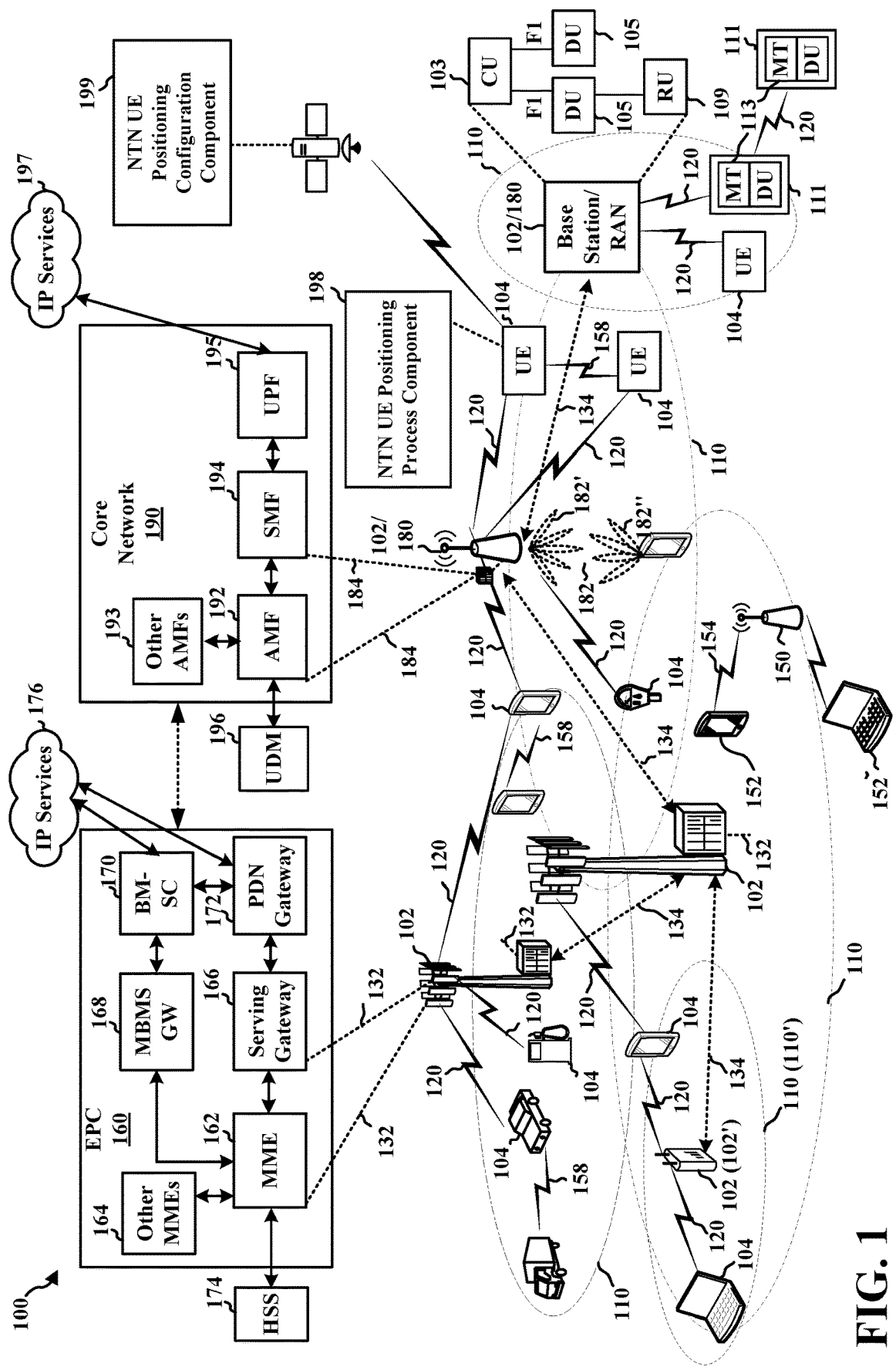
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the precision and performance of a TDOA-based UE positioning scheme that is associated with an NTN. Aspects presented herein provided enhanced TDOA based UE positioning schemes that may leverage the inter-satellite link to mitigate the impact of synchronization errors across different satellites.

In certain aspects, a UE 104 may include an NTN UE positioning process component 198 configured to receive PRSs from different satellites for UE positioning. In one configuration, the NTN UE positioning process component 198 may be configured to receive, from a first satellite, a first PRS at a first reception time ($T_{\_Rx\_sat\_1}$). In such configuration, the NTN UE positioning process component 198 may receive, from a second satellite, a second PRS at a second reception time ($T_{\_Rx\_sat\_2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives an RS from the first satellite. In such configuration, the NTN UE positioning process component 198 may calculate an RSTD for the first PRS and the second PRS based at least in part on the first reception time of the first PRS ($T_{\_Rx\_sat\_1}$), the second reception time of the second PRS ($T_{\_Rx\_sat\_2}$), and the transmission-reception time difference ($T_{sat\_2\_Tx \rightarrow Rx}$).

In another configuration, the NTN UE positioning process component 198 may be configured to receive, from a first satellite, a first PRS at a first reception time ($T_{\_Rx\_sat\_1}$) In such configuration, the NTN UE positioning process component 198 may receive, from a second satellite, a second PRS at a second reception time ($T_{\_Rx\_sat\_2}$), the second PRS being transmitted from the first satellite and relayed to the UE via the second satellite. In such configuration, the NTN UE positioning process component 198 may calculate an RSTD for the first PRS and the second PRS based at least in part on the first reception time of the first PRS ($T_{\_Rx\_sat\_1}$), the second reception time of the second PRS ($T_{\_Rx\_sat\_2}$), and a group delay ($T_{GD\_BP}$) associated with the second satellite.

In certain aspects, a satellite may include an NTN UE positioning configuration component 199 configured to transmit PRS to a UE to assist UE positioning. In one configuration, the NTN UE positioning configuration component 199 may be configured to transmit, to a second satellite, an RS at a first transmission time. In such configuration, the NTN UE positioning configuration component 199 may transmit, to a UE, a PRS at a second transmission time. In such configuration, the NTN UE positioning configuration component 199 may transmit, to the UE, an indication of a time gap ($T_{gap,iner\-sat\_RS\_1 \rightarrow PRS\_1}$) between the first transmission time and the second transmission time.

In another configuration, the NTN UE positioning configuration component 199 may be configured to receive, from a first satellite, an RS at a first reception time. In such configuration, the NTN UE positioning configuration component 199 may transmit, to a UE, a PRS at a first transmission time. In such configuration, the NTN UE positioning configuration component 199 may transmit, to the UE, an indication of a transmission-reception time difference ($T_{sat\_2\_Tx \to Rx}$) between the first reception time and the first transmission time.

In another configuration, the NTN UE positioning configuration component 199 may be configured to transmit, to a UE, a first PRS at a first transmission time. In such configuration, the NTN UE positioning configuration component 199 may transmit, to a second satellite, a second PRS at a second transmission time, the second PRS being relayed to the UE via the second satellite. In such configuration, the NTN UE positioning configuration component 199 may transmit, to the UE, an indication of a time gap ($T_{gap,PRS\_2 \to PRS\_1}$) between the first transmission time and the second transmission time.

In another configuration, the NTN UE positioning configuration component 199 may be configured to receive, from a first satellite, a PRS at a first reception time. In such configuration, the NTN UE positioning configuration component 199 may relay, to a UE, the PRS at a first relay time.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 103, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 103, the DU 105, and the RU 109. A RAN may be disaggregated with a split between the CU 103 and an aggregated DU/RU. The CU 103 and the one or more DUs 105 may be connected via an F1 interface. A DU 105 and an RU 109 may be connected via a fronthaul interface. A connection between the CU 103 and a DU 105 may be referred to as a midhaul, and a connection between a DU 105 and an RU 109 may be referred to as a fronthaul. The connection between the CU 103 and the core network may be referred to as the backhaul. The RAN may be based on a functional split between various components of the RAN, e.g., between the CU 103, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 103 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 103 and a DU 105. IAB nodes 111 may include a DU 105 and a mobile termination (MT) 113. The DU 105 of an IAB node 111 may operate as a parent node, and the MT 113 may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2A:
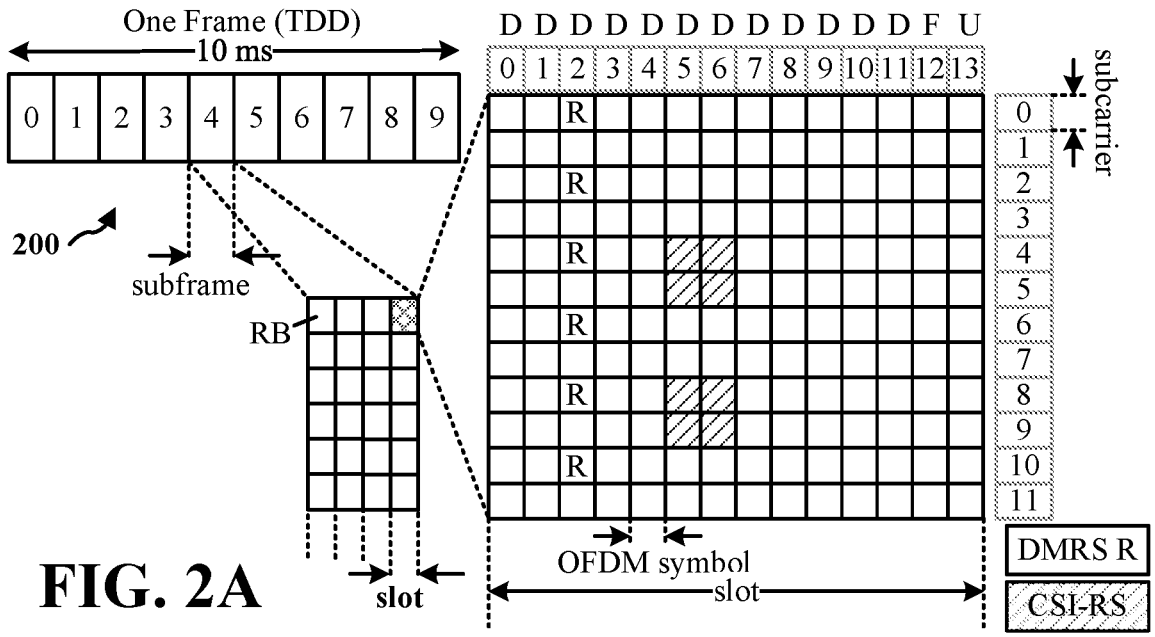
FIG. 2A is a diagram illustrating an example of a first frame, in accordance with various aspects of the present disclosure.
Figure 2B:
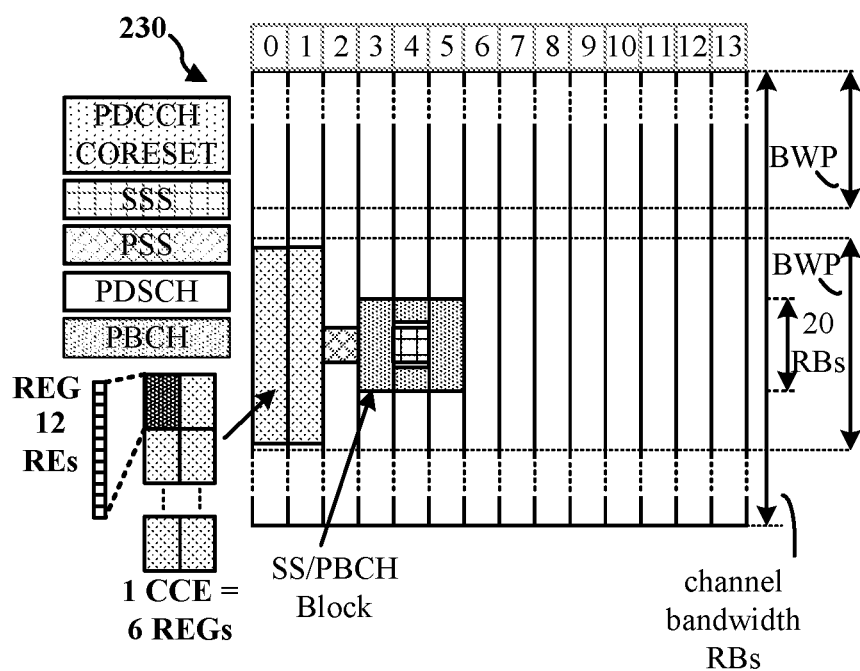
FIG. 2B is a diagram illustrating an example of DL channels within a subframe, in accordance with various aspects of the present disclosure.
Figure 2C:
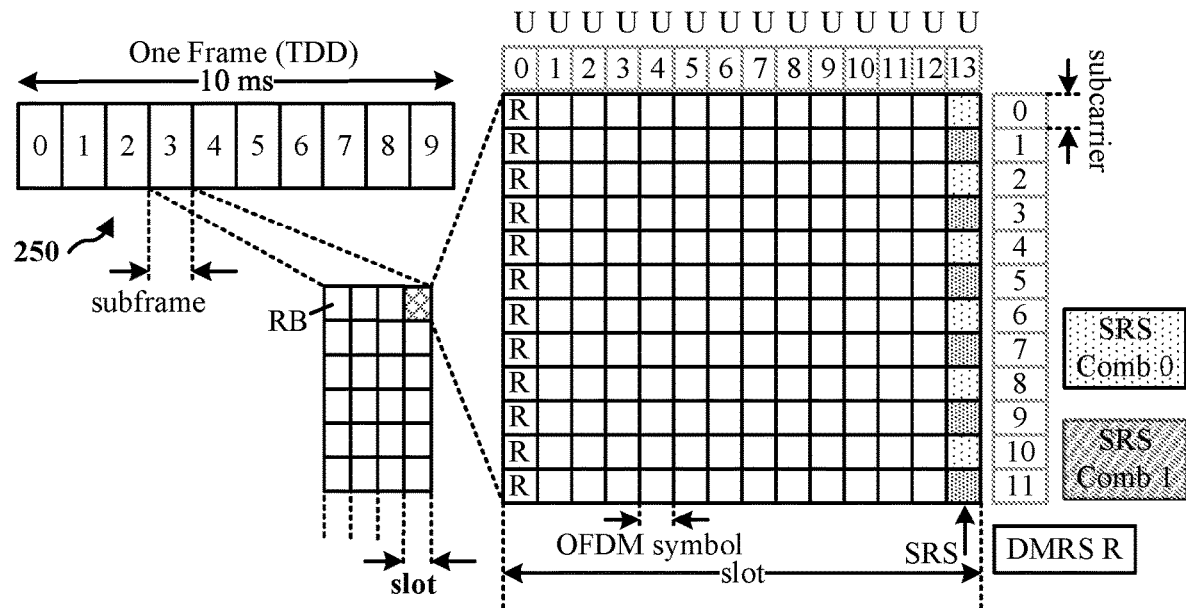
FIG. 2C is a diagram illustrating an example of a second frame, in accordance with various aspects of the present disclosure.
Figure 2D:
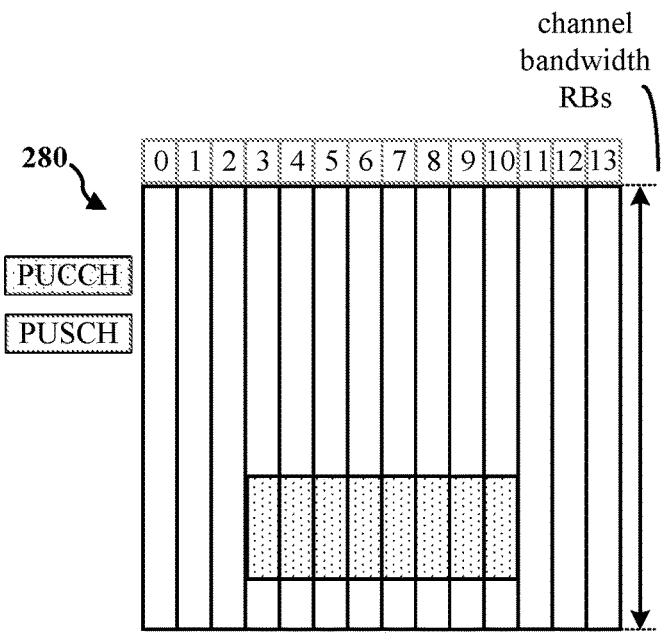
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [\text{kHz}]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
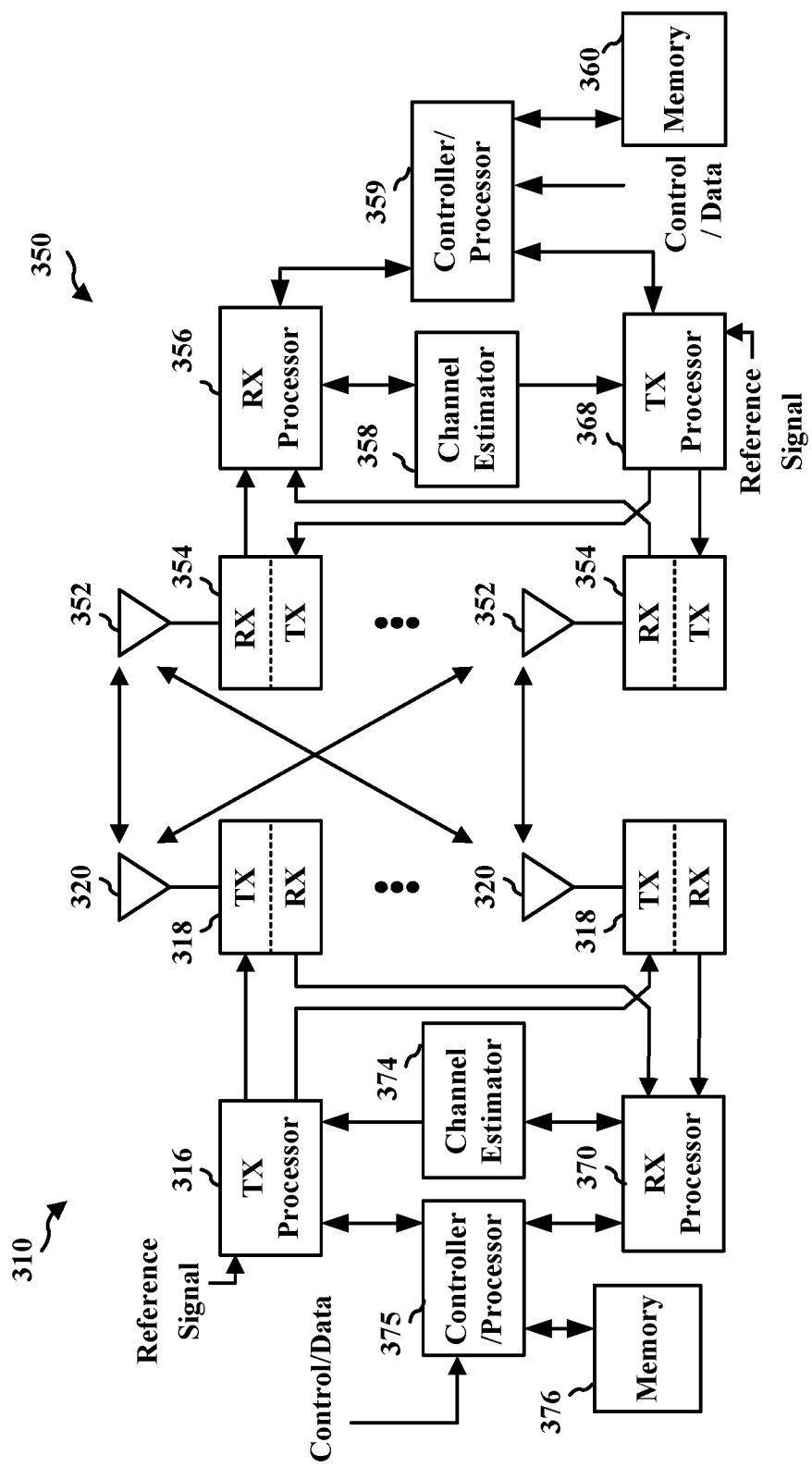
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the NTN UE positioning process component 198 of FIG. 1.

At least one of the TX processor 316, the RX processor 370, and the controller/processor 375 may be configured to perform aspects in connection with the NTN UE positioning configuration component 199 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDOA) measurements, and report them to a positioning entity (e.g., a location management function (LMF)). For example, the UE may receive identifiers (IDs) of a reference base station (which may also be referred to as a reference cell or a reference gNB) and at least one non-reference base station in assistance data (AD). The UE may then measure the RSTD between the reference base station and each of the non-reference base stations. Based on the known locations of the involved base stations and the RSTD measurements, the positioning entity may estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180) that includes aggregated or disaggregated components, such as described in connection with FIG. 1. For example, as an example of a disaggregated RAN, a base station may include CU, one or more DUs, one or more RUs, and/or one or more TRPs. One or more disaggregated components may be located at different locations. For example, different TRPs may be located at different geographic locations. In another example, a TRP may refer to a set of geographically co-located antennas (e.g., antenna array (with one or more antenna elements)) supporting transmission point (TP) and/or reception point (RP) functionality. Thus, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID and the timing advance (TA), as well as the identifiers, estimated timing, and signal strength of detected neighbor base stations. The location of the UE is then estimated based on this information and the known locations of the base station(s).

To assist positioning operations, a location server (e.g., a location server, an LMF, or an SLP) may provide assistance data (AD) to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations (e.g., in periodically broadcasted overhead messages, etc.). In some cases, the UE may be able to detect neighbor network nodes without the use of assistance data.

In the case of an OTDOA or DL-TDOA positioning procedure, the assistance data may further include an expected RSTD value and an associated uncertainty (e.g., a search space window) around the expected RSTD. In some cases, the value range of the expected RSTD may be plus-minus (+/−) 500 microseconds (µs). In some cases, when any of the resources used for the positioning measurement are in FR1, the value range for the uncertainty of the expected RSTD may be +/−32 In other cases, when all of the resources used for the positioning measurement(s) are in FR2, the value range for the uncertainty of the expected RSTD may be +/−8 In this context, "RSTD" may refer to one or more measurements indicative of a difference in time of arrival between a PRS transmitted by a base station, referred to herein as a "neighbor base station" or a "measuring base station," and a PRS transmitted by a reference base station. A reference base station may be selected by a location server and/or by a UE to provide good or sufficient signal strength observed at a UE, such that a PRS may be more accurately and/or more quickly acquired and/or measured, such as without any special assistance from a serving base station.

A location estimate may also be referred to as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include PRS, tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots. The periodicity may be a time from a first repetition of a first PRS resource of a first PRS instance to the same first repetition of the same first PRS resource of the next PRS instance. For example, the periodicity may have a length selected from $2^\mu*\{4, 5, 8, 10, 16, 20, 32, 40, 64, 80, 160, 320, 640, 1280, 2560, 5120, 10240\}$ slots, where =0, 1, 2, 3. The repetition factor may have a length selected from $\{1, 2, 4, 6, 8, 16, 32\}$ slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," and/or a "repetition," etc.

A positioning frequency layer (PFL) (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to a component carrier (CC) and a BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 4:
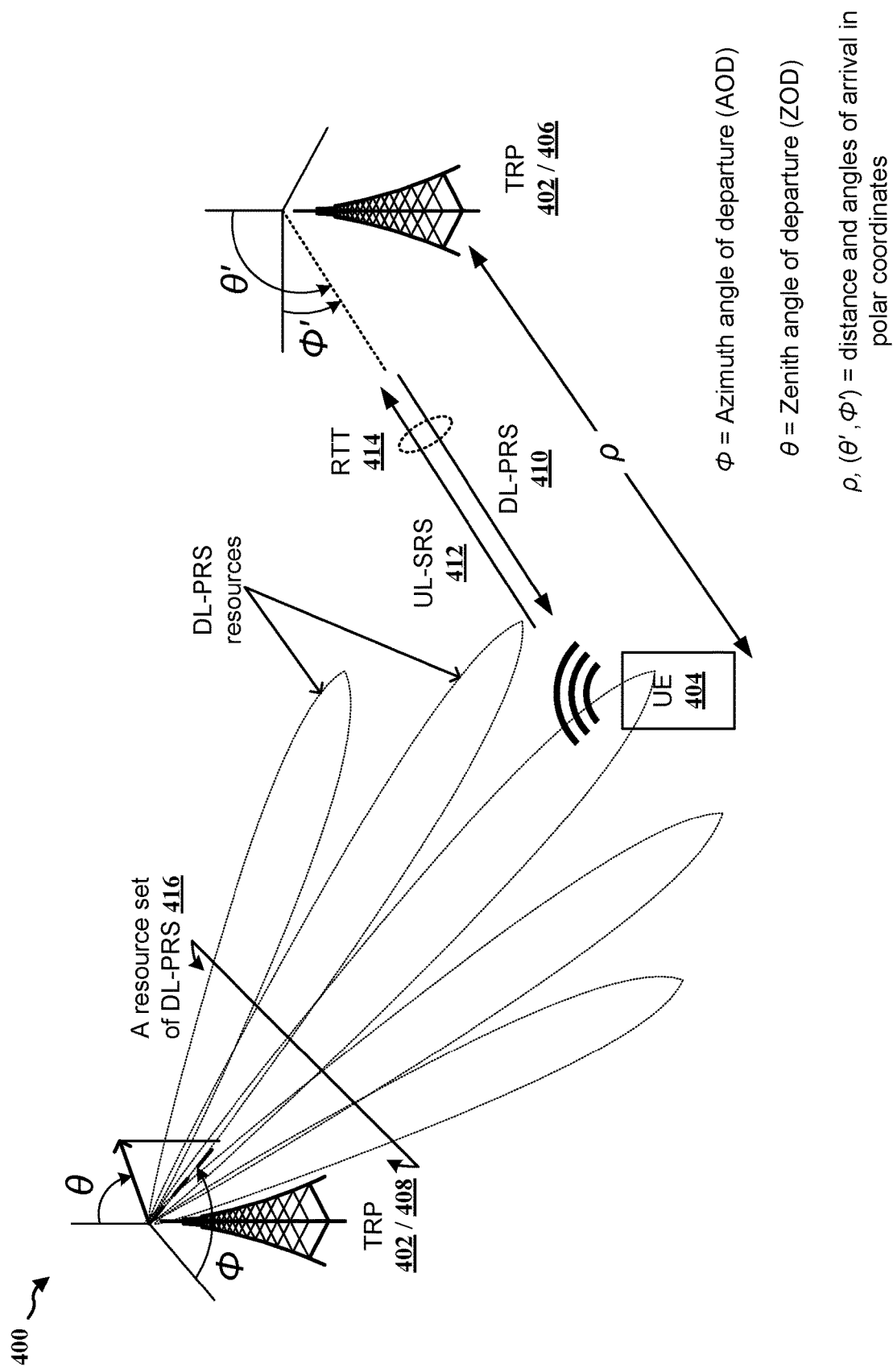
FIG. 4 is a diagram illustrating an example of a UE positioning based on reference signal measurements in accordance with various aspects of the present disclosure.

FIG. 4 is a diagram 400 illustrating an example of a UE positioning based on reference signal measurements in accordance with various aspects of the present disclosure. In one example, a location of UE 404 may be estimated based on multi-cell round trip time (multi-RTT) measurements, where multiple TRPs 402 may perform round trip time (RTT) measurements for signals transmitted to and received from the UE 404 to determine the approximate distance of UE 404 with respect to each of the multiple TRPs 402. Similarly, the UE 404 may perform RTT measurements for signals transmitted to and received from the TRPs 402 to determine the approximate distance of each TRP with respect to the UE 404. Then, based at least in part on the approximate distances of UE 404 with respect to the multiple TRPs 402, a location management function (LMF) that is associated with the TRPs 402 and/or the UE 404 may estimate the position of UE 404. For example, a TRP 406 may transmit at least one downlink positioning reference signal (DL-PRS) 410 to the UE 404, and may receive at least one uplink sounding reference signal (UL-SRS) 412 transmitted from the UE 404. Based at least in part on measuring an RTT 414 between the DL-PRS 410 transmitted and the UL-SRS 412 received, a serving base station associated with the TRP 406 or an LMF associated with the TRP 406 may identify the position of UE 404 (e.g., distance) with respect to the TRP 406. Similarly, the UE 404 may transmit UL-SRS 412 to the TRP 406, and may receive DL-PRS 410 transmitted from the TRP 406. Based at least in part on measuring the RTT 414 between the UL-SRS 412 transmitted and the DL-PRS 410 received, the UE 404 or an LMF associated with the UE 404 may identify the position of TRP 406 with respect to the UE 404. The multi-RTT measurement mechanism may be initiated by the LMF that is associated with the TRP 406/408 and/or the UE 404. A TRP may configure UL-SRS resources to a UE via radio resource control (RRC) signaling. In some examples, the UE and the TRP may report the multi-RTT measurements to the LMF, and the LMF may estimate the position of the UE based on the reported multi-RTT measurements.

In other examples, a position of a UE may be estimated based on multiple antenna beam measurements, where a downlink angle of departure (DL-AoD) and/or uplink angle of arrival (UL-AoA) of transmissions between a UE and one or more TRPs may be used to estimate the position of the UE and/or the distance of the UE with respect to each TRP. For example, referring back to FIG. 6, with regard to the DL-AoD, the UE 404 may perform reference signal received power (RSRP) measurements for a set of DL-PRS 416 transmitted from multiple transmitting beams (e.g., DL-PRS beams) of a TRP 408, and the UE 404 may provide the DL-PRS beam measurements to a serving base station (or to the LMF associated with the base station). Based on the DL-PRS beam measurements, the serving TRP or the LMF may derive the azimuth angle (e.g., $\Phi$) of departure and the zenith angle (e.g., $\theta$) of departure for DL-PRS beams of the TRP 408. Then, the serving TRP or the LMF may estimate the position of UE 404 with respect to the TRP 408 based on the azimuth angle of departure and the zenith angle of departure of the DL-PRS beams. Similarly, for the UL-AoA, a position of a UE may be estimated based on UL-SRS beam measurements measured at different TRPs, such as at the TRPs 402. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the position of the UE and/or the UE distance with respect to each of the TRPs based on the azimuth angle of arrival and the zenith angle of arrival of the UL-SRS beams.

Figure 5:
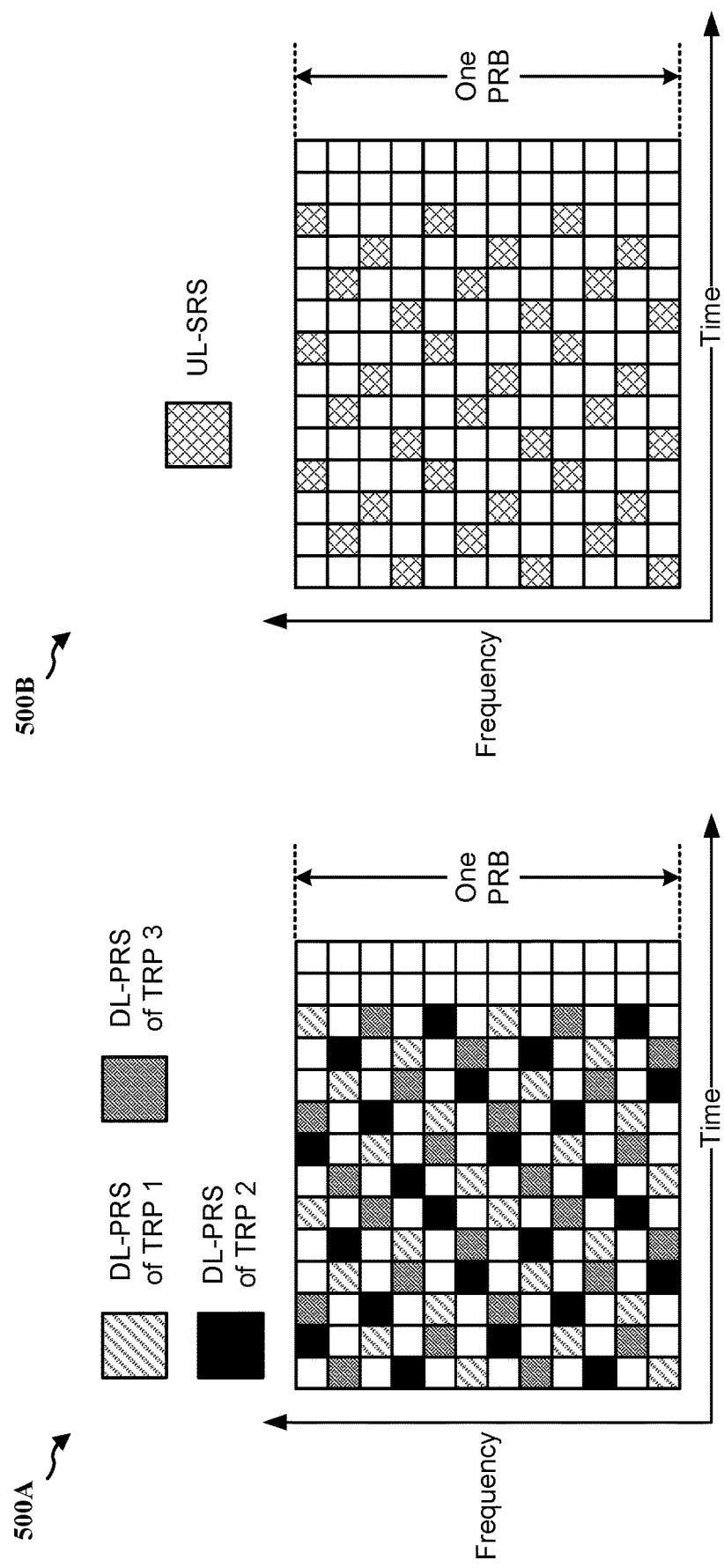
FIG. 5A is a diagram illustrating an example of downlink-positioning reference signal (DL-PRS) transmitted from multiple transmission-reception points (TRPs) in accordance with various aspects of the present disclosure.
FIG. 5B is a diagram illustrating an example of uplink-sounding reference signal (UL-SRS) transmitted from a UE in accordance with various aspects of the present disclosure.

FIG. 5A is a diagram 500A illustrating an example of DL-PRS transmitted from multiple TRPs in accordance with various aspects of the present disclosure. In one example, a serving base station may configure DL-PRS to be transmitted from one or more TRPs within a slot or across multiple slots. If the DL-PRS is configured to be transmitted within a slot, the serving base station may configure the starting resource element in time and frequency from each of the one or more TRPs. If the DL-PRS is configured to be transmitted across multiple slots, the serving base station may configure gaps between DL-PRS slots, periodicity of the DL-PRS, and/or density of the DL-PRS within a period. The serving base station may also configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 4. As shown by FIG. 5A, the DL-PRS transmitted from different TRPs and/or from different PRS beams may be multiplexed across symbols or slots.

In some examples, each symbol of the DL-PRS may be configured with a comb-structure in frequency, where the DL-PRS from a TRP of a base station may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 500A shows an example of a comb-6 DL-PRS configuration, where the pattern for the DL-PRS from different TRPs may be repeated after six (6) symbols.

FIG. 5B is a diagram 500B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a TRP. In some examples, the SRS resources may span 1, 2, 4, 8, or 12 consecutive OFDM symbols. In other examples, the comb size for the UL-SRS may be configured to be 2, 4, or 8.

Figure 6:
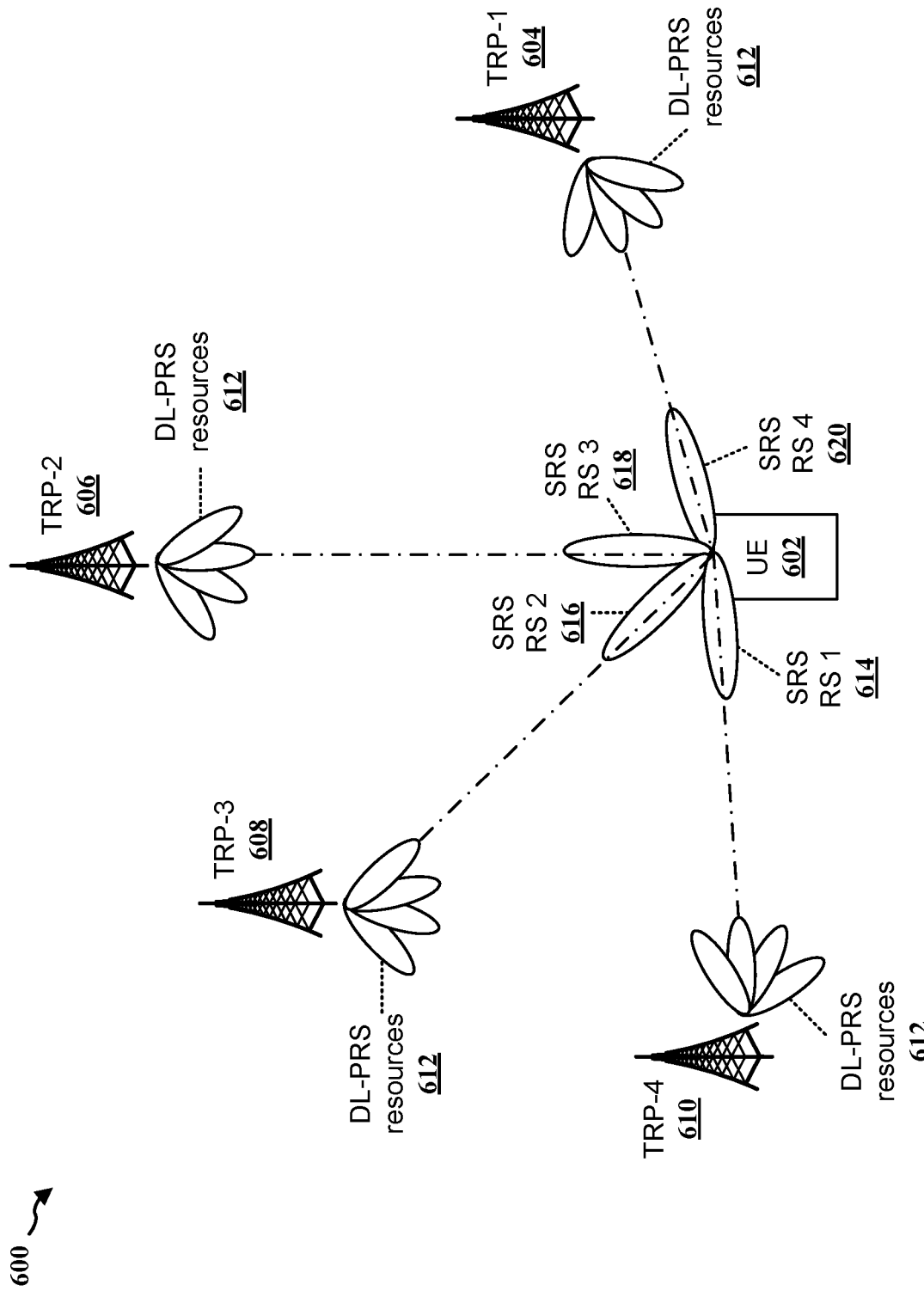
FIG. 6 is a diagram illustrating an example of estimating a position of a UE based on multi-round trip time (RTT) measurements from multiple TRPs in accordance with various aspects of the present disclosure.

FIG. 6 is a diagram 600 illustrating an example of estimating a position of a UE based on multi-RTT measurements from multiple TRPs in accordance with various aspects of the present disclosure. A UE 602 may be configured by a serving base station to decode DL-PRS resources 612 that correspond to and are transmitted from a first TRP 604 (TRP-1), a second TRP 606 (TRP-2), a third TRP 608 (TRP-3), and a fourth TRP 610 (TRP-4). The UE 602 may also be configured to transmit UL-SRSs on a set of UL-SRS resources, which may include a first SRS resource 614, a second SRS resource 616, a third SRS resource 618, and a fourth SRS resource 620, such that the serving cell(s), e.g., the first TRP 604, the second TRP 606, the third TRP 608, and the fourth TRP 610, and as well as other neighbor cell(s), may be able to measure the set of the UL-SRS resources transmitted from the UE 602. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 7:
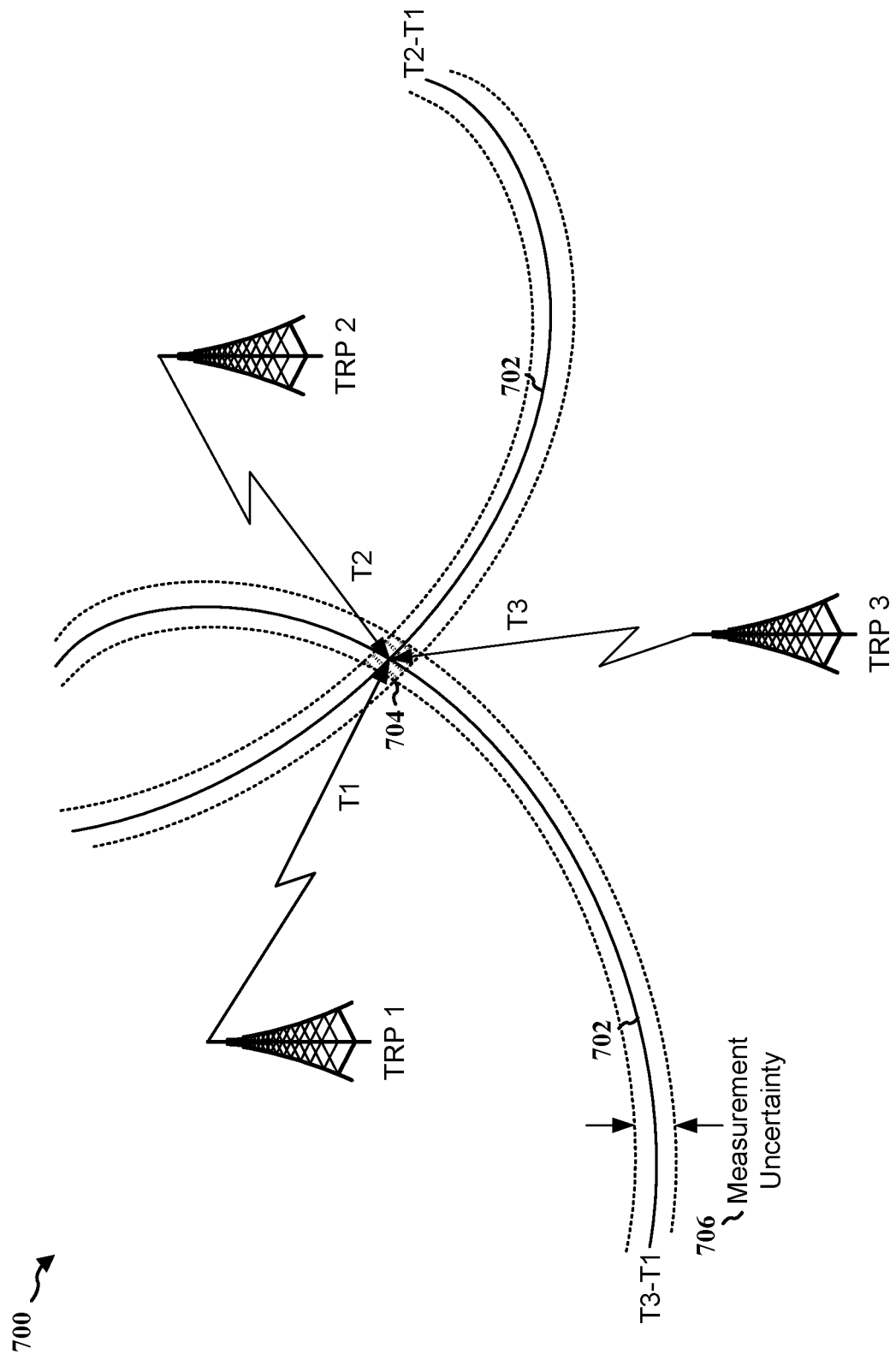
FIG. 7 is a diagram illustrating an example of a UE positioning based on observed time difference of arrival (OTDOA) in accordance with various aspects of the present disclosure.

FIG. 7 is a diagram 700 illustrating an example of a UE positioning based on OTDOA in accordance with various aspects of the present disclosure. OTDOA uses multilateration in which a UE may measure the TOA of signals received from multiple synchronized TRPs. The TOAs from several neighboring TRPs may be subtracted from the TOA of a reference TRP to form the OTDOA. In some scenarios, as shown at 702, geometrically, each TOA may determine a hyperbola, and the point at which the hyperbolas intersect, such as shown at 704, may be the UE location. In some examples, at least three timing measurements from geographically dispersed TRPs may be specified to determine two coordinates (latitude and longitude) of the UE. The performance and accuracy of the UE positioning may further be improved via incorporation of additional TRPs. In other words, multiple TDOA measurements may be used for triangulation (e.g., ≥4 TRPs/cells). For example, a UE may measure three TOAs relative to the UE internal time base, T1, T2, and T3. The measurement from a first TRP (TRP 1) may be selected as a reference, and two OTDOAs may be formed based on: $T_{2,1}$=T2−T1 and $T_{3,1}$=T3−T1. As shown at 706, each TOA measurement T(i) may have a certain accuracy and uncertainty. As such, the hyperbolas (e.g., 702) in the diagram 700 may include a certain width that illustrates the measurement uncertainty. The estimated UE location may be the intersection area of each set of the two hyperbolas, such as shown at 704. The measurement made by the UE for OTDOA positioning may be the RSTD measurement. The RSTD is the relative timing difference between two TRPs: a reference TRP and a measured neighboring TRP. In some examples, as network synchronization may be an important aspect for a high precision positioning, the precision and accuracy of a UE positioning session may be reduced if TRPs are not properly synchronized.

Figure 8:
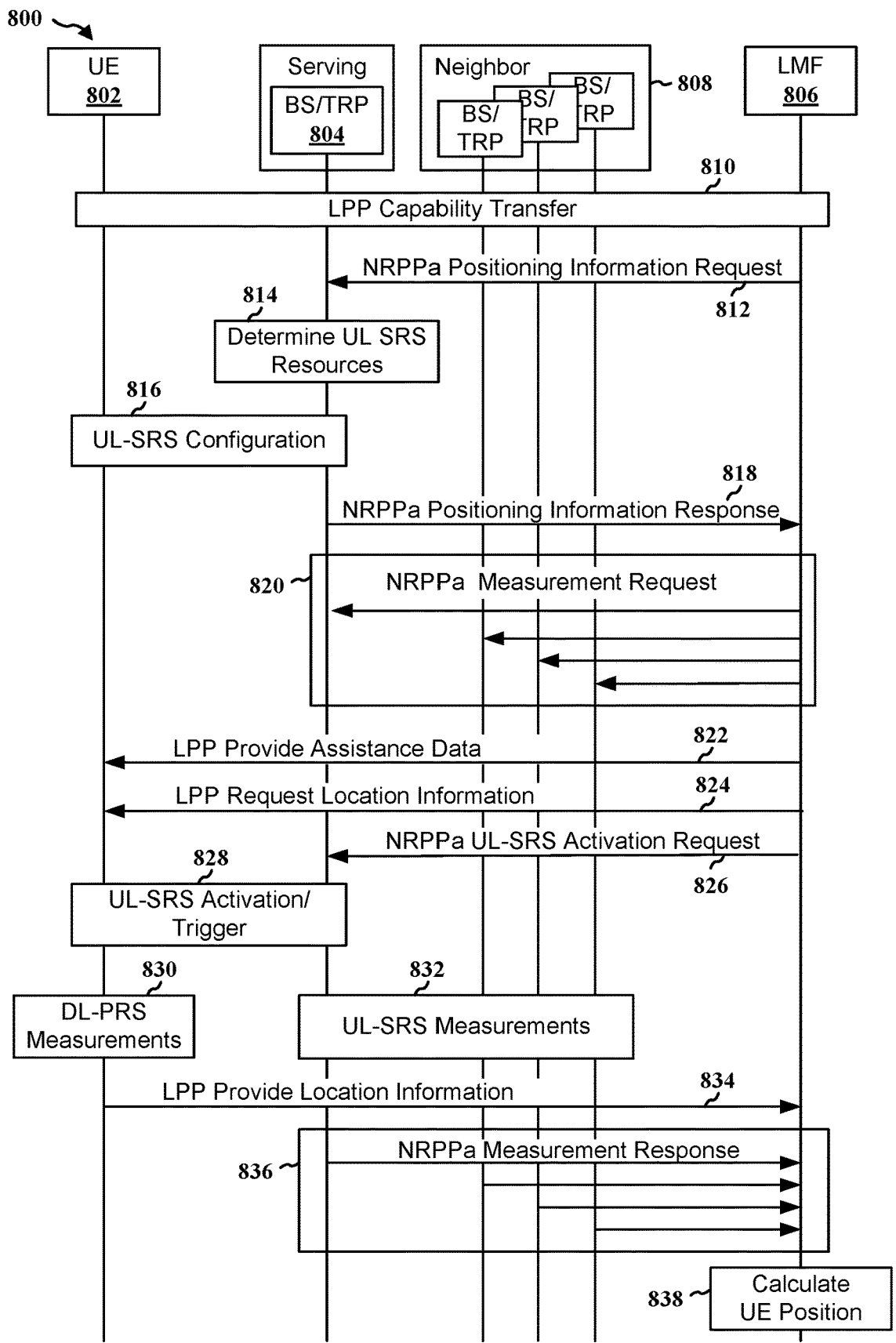
FIG. 8 is a communication flow illustrating an example multi-RTT positioning procedure in accordance with various aspects of the present disclosure.

FIG. 8 is a communication flow 800 illustrating an example multi-RTT positioning procedure in accordance with various aspects of the present disclosure. The numberings associated with the communication flow 800 do not specify a particular temporal order and are merely used as references for the communication flow 800. In addition, a DL-only and/or an UL-only positioning may use a subset or subsets of this multi-RTT positioning procedure.

At 810, an LMF 806 may request one or more positioning capabilities from a UE 802 (e.g., from a target device). In some examples, the request for the one or more positioning capabilities from the UE 802 may be associated with an LTE Positioning Protocol (LPP). For example, the LMF 806 may request the positioning capabilities of the UE 802 using an LPP capability transfer procedure.

At 812, the LMF 806 may request UL SRS configuration information for the UE 802. The LMF 806 may also provide assistance data specified by a serving base station 804 (e.g., pathloss reference, spatial relation, and/or SSB configuration(s), etc.). For example, the LMF 806 may send an NR Positioning Protocol A (NRPPa) positioning information request message to the serving base station 804 to request UL information for the UE 802.

At 814, the serving base station 804 may determine resources available for UL SRS, and at 816, the serving base station 804 may configure the UE 802 with one or more UL SRS resource sets based on the available resources.

At 818, the serving base station 804 may provide UL SRS configuration information to the LMF 806, such as via an NRPPa positioning information response message.

At 820, the LMF 806 may select one or more candidate neighbor BSs/TRPs 808, and the LMF 806 may provide an UL SRS configuration to the one or more candidate neighbor BSs/TRPs 808 and/or the serving base station 804, such as via an NRPPa measurement request message. The message may include information for enabling the one or more candidate neighbor BSs/TRPs 808 and/or the serving base station to perform the UL measurements.

At 822, the LMF 806 may send an LPP provide assistance data message to the UE 802. The message may include specified assistance data for the UE 802 to perform the DL measurements.

At 824, the LMF 806 may send an LPP request location information message to the UE 802 to request multi-RTT measurements.

At 826, for semi-persistent or aperiodic UL SRS, the LMF 806 may request the serving base station 804 to activate/trigger the UL SRS in the UE 802. For example, the LMF 806 may request activation of UE SRS transmission by sending an NRPPa positioning activation request message to the serving base station 804.

At 828, the serving base station 804 may activate the UE SRS transmission and send an NRPPa positioning activation response message. In response, the UE 802 may begin the UL-SRS transmission according to the time domain behavior of UL SRS resource configuration.

At 830, the UE 802 may perform the DL measurements from the one or more candidate neighbor BSs/TRPs 808 and/or the serving base station 804 provided in the assistance data. At 832, each of the configured one or more candidate neighbor BSs/TRPs 808 and/or the serving base station 804 may perform the UL measurements.

At 834, the UE 802 may report the DL measurements to the LMF 806, such as via an LPP provide location information message.

At 836, each of the one or more candidate neighbor BSs/TRPs 808 and/or the serving base station 804 may report the UL measurements to the LMF 806, such as via an NRPPa measurement response message.

At 838, the LMF 806 may determine the RTTs from the UE 802 and BS/TRP Rx-Tx time difference measurements for each of the one or more candidate neighbor BSs/TRPs 808 and/or the serving base station 804 for which corresponding UL and DL measurements were provided at 834 and 836, and the LMF 806 may calculate the position of the UE 802.

In addition to network-based positioning technologies, a wireless device or a UE, such as a mobile phone, an automobile, a smart watch, etc., may also be able to determine its location on the Earth based on global navigation satellite systems (GNSS). For example, the Global Positioning System (GPS) is a satellite-based radio navigation system that is capable of providing geolocation and time information to a GPS receiver anywhere on or near the Earth where there is a line of sight (LOS) to four or more GPS satellites. If there are obstacles such as physical structures (e.g., buildings, bridges) and terrains (e.g., mountains) between the GPS satellites and the GPS receiver, the GPS signals received by the GPS receiver may be weakened and/or include an offset/delay.

Figure 9:
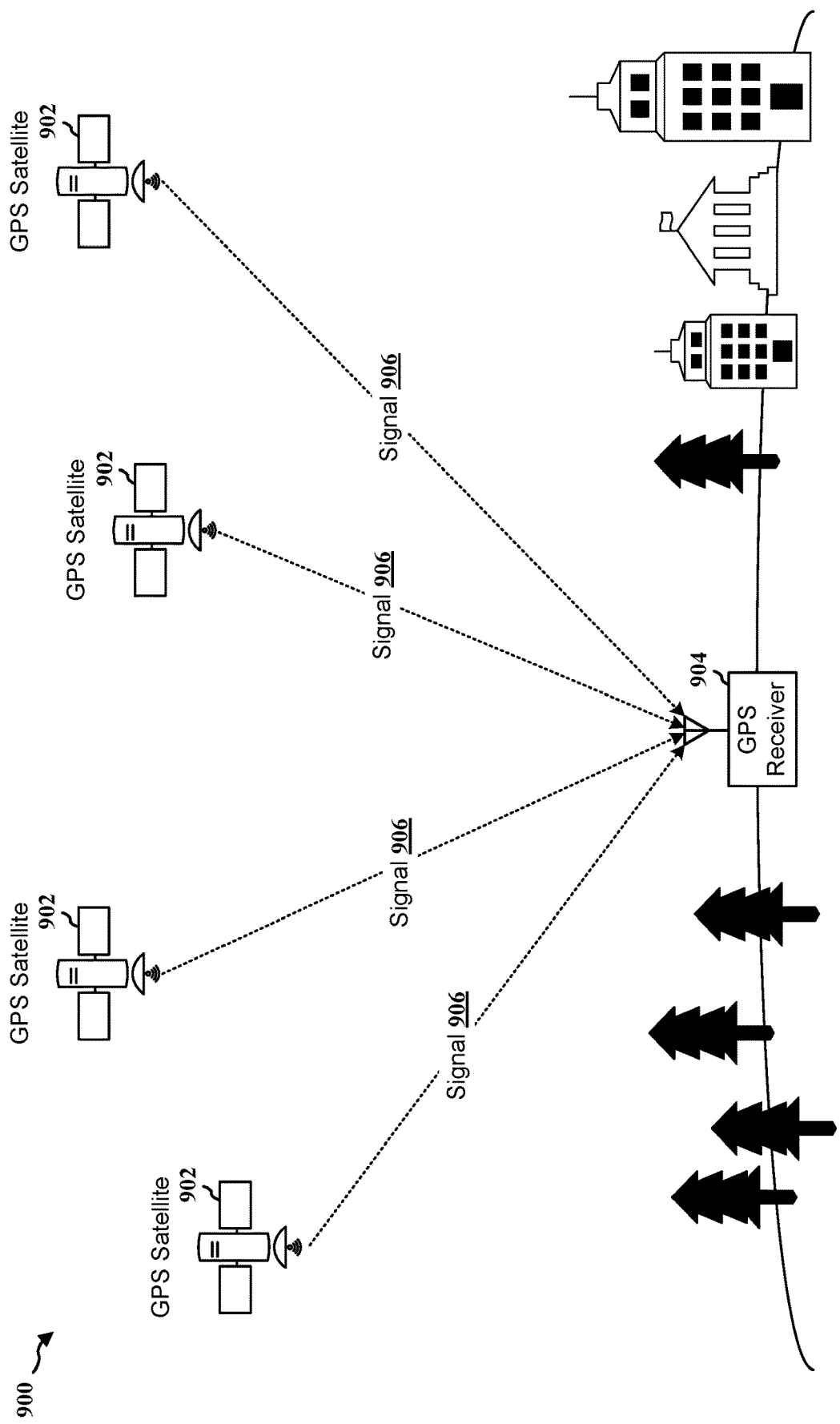
FIG. 9 is a diagram illustrating an example of a global positioning system (GPS) positioning in accordance with various aspects of the present disclosure.

FIG. 9 is a diagram 900 illustrating an example of a GPS positioning in accordance with various aspects of the present disclosure. A GPS receiver 904 may calculate its position and time based at least in part on data received from multiple GPS satellites 902, where each GPS satellite 902 may carry a record of its position and time and may transmit that data (e.g., the record) to the GPS receiver 904. Each GPS satellite 902 may further include a clock that is synchronized with other clocks of GPS satellites and with ground clock(s). If a GPS satellite 902 detects that there is a drift from the time maintained on the ground, the GPS satellite 902 may correct it. The GPS receiver 904 may also include a clock, but the clock for the GPS receiver 904 may be less stable and precise compared to the clocks for the GPS satellites 902.

As the speed of radio waves may be constant and independent of the satellite speed, a time delay between a time the GPS satellite 902 transmits a signal 906 and a time the GPS receiver 904 receives the signal 906 may be proportional to the distance from the GPS satellite 902 to the GPS receiver 904. In some examples, a minimum of four GPS satellites may be used by the GPS receiver 904 to compute/calculate one or more unknown quantities (e.g., three position coordinates and clock deviation from satellite time, etc.).

Each GPS satellite 902 may continually broadcast the signal 906 (e.g., a carrier wave with modulation) that may include a pseudorandom code (e.g., a sequence of ones and zeros) that may be known to the GPS receiver 904, and may also include a message that includes a time of transmission and the satellite position at that time. In other words, each signal 906 may carry two types of information: time and carrier wave (e.g., a modulated waveform with an input signal to be electromagnetically transmitted). Based on the signals 906 received from the GPS satellites 902, the GPS receiver 904 may measure the time of arrivals (TOAs) of the signals 906 and calculate the time of flights (TOFs) for the signals 906. Then, based on the TOFs, the GPS receiver 904 may compute its three-dimensional position and clock deviation, and the GPS receiver 904 may determine its position on the Earth. For example, the GPS receiver 904's location may be converted to a latitude, a longitude, and a height relative to an ellipsoidal Earth model. These coordinates may be displayed, such as on a moving map display, or recorded or used by some other system, such as a vehicle guidance system.

While the distance between a GPS receiver and a GPS satellite may be calculated based on the time it takes for a signal travel, the GPS satellite's signal sequence may be delayed in relation to the GPS receiver's sequence. Thus, in some examples, a delay may be applied to the GPS receiver's sequence, such that the two sequences may be aligned. For example, to calculate the delay, a GPS receiver may align a pseudorandom binary sequence contained in the GPS satellite's signal to an internally generated pseudorandom binary sequence. As the GPS satellite signal may take time to reach the receiver, the satellite's sequence may be delayed in relation to the receiver's sequence. By increasingly delaying the receiver's sequence, the two sequences may eventually be aligned.

The accuracy of GPS positioning may depend on various factors, such as satellite geometry, signal blockage, atmospheric conditions, and/or receiver design features/quality, etc. For example, GPS receivers used by smartphones or smart watches may have an accuracy lower than GPS receivers used by vehicles and surveying equipment.

To improve the accuracy of GPS positioning (e.g., from meters to centimeters), a real time kinematics (RTK) technique or mechanism may be used for a positioning device. RTK is a technique or mechanism that may be used by a positioning device (e.g., a UE, a surveying equipment, an automobile GPS, etc.) to improve the accuracy of positioning. For example, based on RTK, a positioning device (e.g., a client device) may use a base station's correction information to mitigate several error sources in GPS receiver PR and CP measurement of the positioning device, which may include satellite orbit, satellite clock, atmospheric error, etc. Thus, RTK may allow an improved accuracy to be achieved by the positioning device.

Figure 10:
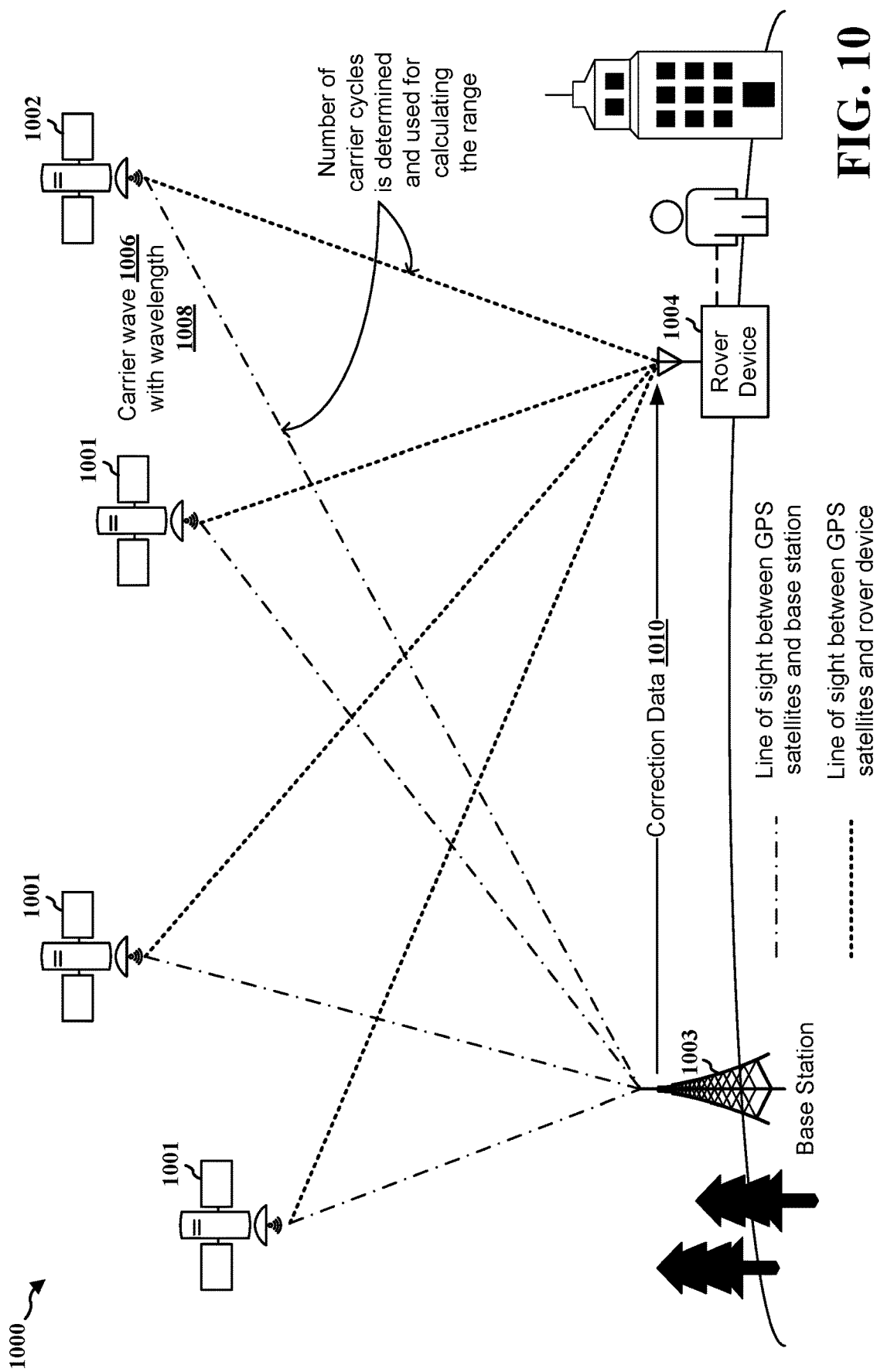
FIG. 10 is a diagram illustrating an example of a real time kinematics (RTK) positioning in accordance with various aspects of the present disclosure.

FIG. 10 is a diagram 1000 illustrating an example of an RTK positioning in accordance with various aspects of the present disclosure. In one example, at least two receivers may be used in association with the RTK positioning, where at least one of the receivers may be stationary, which may be referred to as a base station 1003, and at least one other receiver may be mobile (e.g., may move freely), which may be referred to as a rover or a rover device 1004 (e.g., a GNSS/GPS receiver, a UE, a rover station, etc.). In other words, an RTK system may include a base station and a rover, where the base station may be a stationary receiver whose location is known.

A range between a satellite 1002 (e.g., a GNSS/GPS satellite) and the rover device 1004 or between the satellite 1002 and the base station 1003 may be calculated by determining a number of carrier cycles between the satellite 1002 and the rover device 1004 or the base station 1003, and multiplying this number by the carrier wavelength 1008 of a carrier wave 1006 (e.g., a carrier signal) transmitted by the satellite 1002. For example, if the satellite 1002 transmits a carrier wave 1006 with a carrier wavelength 1008 of ten (10) meters, and the rover device 1004 receives the carrier wave 1006 and determines that there are five hundred (500) carrier cycles between the satellite 1002 and the rover device 1004, then the rover device 1004 may calculate the distance between the satellite 1002 and the rover device 1004 by multiplying the number of carriers cycles determined (e.g., 500) with the carrier wavelength 1008 (e.g., 10 meters), which may be five thousand meters (e.g., 500×10=5000). Similarly, the base station 1003 may also receive the carrier wave 1006 from the satellite 1002 and determine its ranges from the satellite 1002 based on the carrier wavelength 1008 of the carrier wave 1006 and the number of carrier cycles between the base station 1003 and the satellite 1002. The rover device 1004 and/or the base station 1003 may calculate ranges (e.g., distances) between the rover device 1004/base station 1003 and multiple (e.g., four or more) satellites (e.g., satellites 1001 and 1002) to determine their geographical locations (e.g., their locations on the Earth).

During the RTK positioning, the rover device 1004 (e.g., a UE, a client device, etc.) may undergo an "ambiguity resolution" process to determine the number of carrier cycles between a satellite 1002 and the rover device 1004. In other words, when the rover device 1004 receives a carrier wave from a satellite 1002, it may take time for the rover device 1004 to figure out how many carrier cycles are between the satellite 1002 and the rover device 1004. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity."

In some examples, ranges calculated by the rover device 1004 may include errors due to satellite clock and ephemerides, and ionospheric and tropospheric delays, etc. Also, as the rover device 1004 is more likely to be moving, the quality of a signal/carrier wave received from each satellite may change as the rover device moves from one location to another location. For example, if the rover device 1004 moves from an open sky area to an area with buildings, signals from one or more satellites 1001/1002 may be blocked/reflected by the buildings. As such, ranges calculated by the rover device 1004 may start to drift and may include error(s).

On the other hand, as the base station 1003 is likely to be stationary with a known location, and the base station 1003 may be equipped with a more sophisticated and high-end GNSS receiver, the base station 1003 may be able to maintain an accurate calculation for the ranges compared to the rover device 1004. For example, the base station 1003 may be configured to locate at a site (e.g., an open sky area) that has minimal environmental effects such as interference and multipath. As such, under the RTK positioning, the base station 1003 may be configured to calculate its location by using the signal received from satellites (e.g., the satellites 1001/1002) based on the carrier phase measurement, then the base station 1003 may compare the calculated location to its known location to identify if there are any errors. If the base station 1003 identifies that there are errors, the base station 1003 may generate a correction data 1010 (or a correction signal) and transmit the correction data 1010 to the rover device 1004 to assist the rover device 1004 in correcting the errors. For example, as the rover device 1004 may typically be configured to locate in proximity to the base station 1003 (e.g., within 6 miles, 12 miles, etc.), the rover device 1004 is likely to encounter similar errors (e.g., similar ionospheric and tropospheric delays) as the base station 1003. Thus, the rover device 1004 may use the correction data 1010 from the base station 1003 to improve its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 1004 may determine its position using algorithms that incorporate ambiguity resolution and differential correction. The position accuracy achievable by the rover device 1004 may depend on its distance from the base station 1003 and the accuracy of the differential corrections (e.g., the correction data 1010).

In some examples, an RTK positioning may also be used in association with a network, where positioning data from one or more fixed base stations (e.g., the base station 1003) may be transmitted to a central processing station. When requested by a rover device (which may transmit its approximate location to the central processing station), the central station may calculate and transmit correction information (e.g., the correction data 1010) or a corrected position to the rover device.

In one example, pseudo-range (PR) and carrier phase (CP) measurements between a satellite and a receiver may be calculated based on:

$$p = \rho + d\rho + c(dt - dT) + d_{ion} + d_{trop} + \varepsilon_p, \text{ and}$$

$$\varphi = \rho + d\rho + c(dt - dT) - d_{ion} + d_{trop} + \varepsilon_\varphi + \lambda N,$$

where p may indicate PR measurement (m), φ may indicate CP measurement (m), c may indicate the speed of light (m/s), λ may indicate CP wavelength (m), N may indicate CP integer ambiguity (cycle), dρ may indicate the satellite orbital error (m), dt may indicate the satellite clock error (m), $d_{ion}$ may indicate the ionospheric delay (m), $d_{trop}$ may indicate the tropospheric delay (m), $\varepsilon_p$ may indicate the pseudo-range noise and multipath (m), $\varepsilon_\varphi$ may indicate the carrier phase noise and multipath (m), dT may indicate the receiver clock error (m), and p may indicate the geometry range (m) between the satellite and the receiver.

Figure 11:
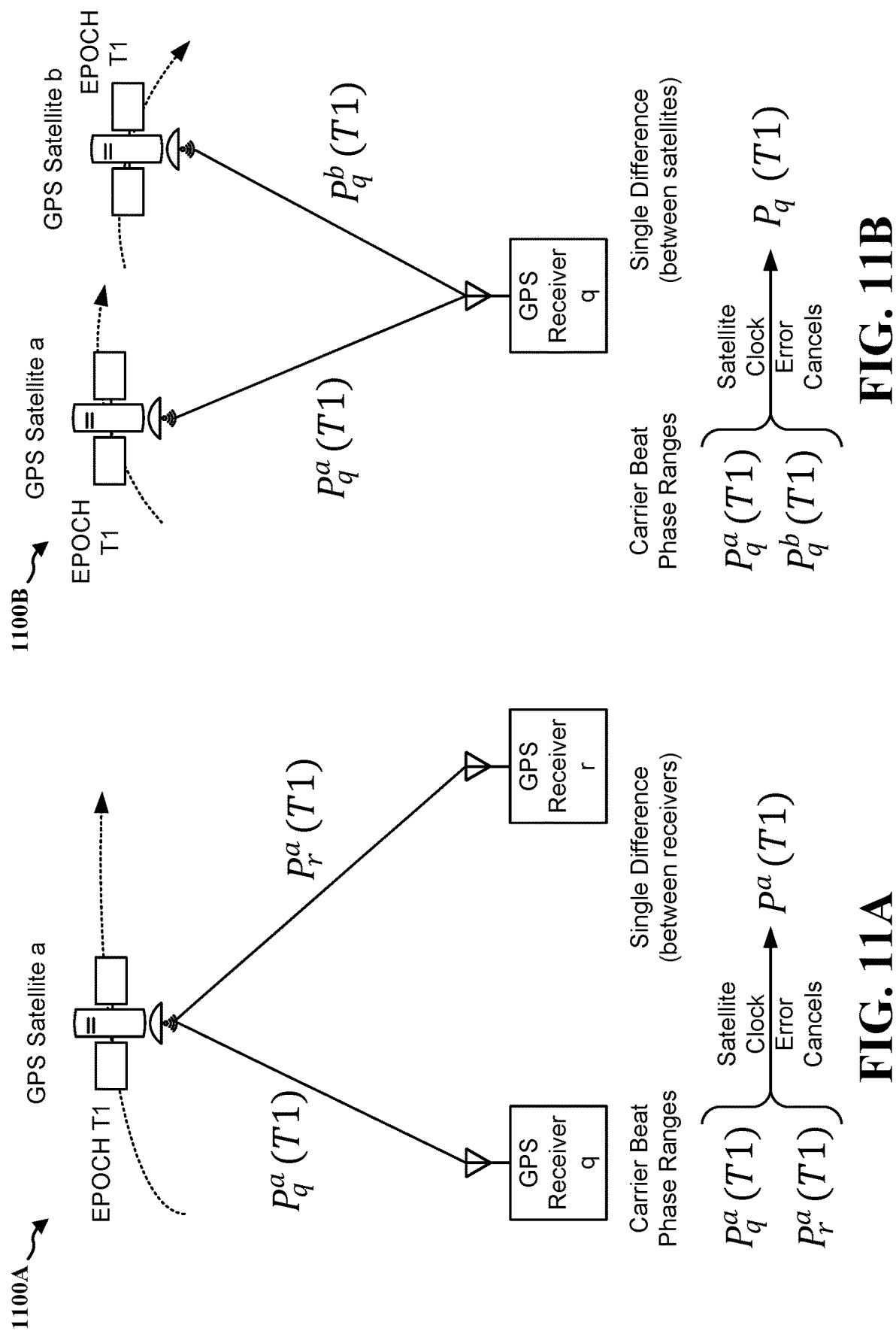
FIG. 11A is a diagram illustrating an example of a single difference between different receivers in accordance with various aspects of the present disclosure.
FIG. 11B is a diagram illustrating an example of a single difference between different satellites in accordance with various aspects of the present disclosure.

In one aspect, as shown by a diagram 1100A of FIG. 11A, a single difference (e.g., for PR and CP measurements) between different receivers may be calculated based on:

$$\nabla p = \nabla \rho + \nabla d\rho + c\nabla dt + \nabla d_{ion} + \nabla d_{trop} + \varepsilon_{\nabla p}, \text{ and}$$

$$\nabla \varphi = \nabla \rho + \nabla d\rho + c\nabla dt + \lambda \nabla N - \nabla d_{ion} + \nabla d_{trop} + \varepsilon_{\nabla \varphi}$$

The base station measurement may be subtracted from the rover station measurement for the same satellite, which may eliminate satellite clock error dt, reduce the satellite orbital error dρ as a function baseline length, and reduce the ionospheric and tropospheric effect, $d_{ion}$ and $d_{trop}$ as a function of baseline length.

Similarly, as shown by a diagram 1100B of FIG. 11B, a single difference (e.g., for PR and CP measurements) between different satellites may be calculated based on:

$$\nabla p = \nabla \rho + \nabla d\rho + c\nabla dt + \nabla d_{ion} + \nabla d_{trop} + \varepsilon_{pp}, \text{ and}$$

$$\nabla \varphi = \nabla \rho + \nabla d\rho + c\nabla dt + \lambda \nabla N - \nabla d_{ion} + \nabla d_{trop} + \varepsilon_{\nabla \varphi}.$$

The satellite measurement may be subtracted from the base satellite measurement for the same receiver, which may eliminate receiver clock error dT and eliminate common hardware bias in a receiver.

Accordingly, as shown by a diagram 1200 of FIG. 12, a double difference between receivers and between satellites may be calculated based on:

$$\nabla \Delta p = \nabla \Delta \rho + \nabla \Delta d\rho + \nabla \Delta d_{ion} + \nabla \Delta d_{trop} + \varepsilon_{\nabla \Delta p}, \text{ and}$$

$$\nabla \Delta \varphi = \nabla \Delta \rho + \nabla \Delta d\rho - \nabla \Delta d_{ion} + \nabla \Delta d_{trop} + \lambda \nabla \Delta N + \varepsilon_{\nabla \Delta \varphi}$$

The base station measurement may be subtracted from the rover station measurement for the same satellite. The difference between measurements from a base satellite and measurements at other satellites may further be taken, which may eliminate satellite clock error dt and receiver clock error dT, and reduce the satellite orbital error dρ, the ionospheric, and tropospheric effect, $d_{ion}$ and $d_{trop}$. ∇ΔN may indicate a double differenced integer ambiguity. In one example, for a 20-30 km baseline, the residual error may be less than half cycles (e.g., residual error<<<½ cycle).

In some scenarios, a positioning procedure may be associated with one or more non-terrestrial networks (NTNs). In some examples, NTNs may refer to networks, or segments of networks, using an airborne (e.g., an aircraft) or satellites (e.g., low earth orbit (LEO) satellites, medium earth orbit (MEO) satellites, geosynchronous (GEO) satellites, and/or high-altitude pseudo satellite (HAPS), etc.) for transmission. For example, an NTN may support direct communications between a UE (e.g., a handset, a mobile device, a mobile phone, etc.) and a satellite (e.g., an LEO satellite, or a GEO satellite, etc.), where the UE may transmit text messages and/or voice services to another UE via the satellite. In some aspects, determining a position of a UE may be an important factor for an NTN operation. For example, location information of a UE may be used in a random access network (RAN) for an initial synchronization, uplink timing and frequency pre-compensation, mobility, and/or handover, etc. In addition, an NTN may support different types of UEs, such as UEs with global navigation satellite system (GNSS) support (e.g., the positions of the UEs may be determined via global positioning system (GPS)) and/or UEs without GNSS support.

One advantage of a UE performing a positioning session based on an NTN with GNSS support is that the communication link between the UE and a satellite may enable the UE to interact with the satellite. For example, the PRS signals transmitted from a satellite may be tailored to or configured for a specific user or a specific device. As such, the performance and/or the accuracy of a positioning of a UE based on GNSS may further be supplemented with the assistance of an NTN as the UE and/or the satellite may exchange positioning related information with each other.

On the other hand, a UE may also perform a positioning session based on an NTN without GNSS support. For examples, for UEs without GNSS support, the network-based positioning methods and mechanisms discussed in connection with FIGS. 4 to 6 (e.g., multi-RTT, and/or OTDOA, etc.) may also be used for determining the location of the UE. For purposes of the present disclosure, an NTN may include just NTN cell(s), or a mix of NTN cell(s) and ground cell(s). As such, for a positioning operation associated with an NTN, the positioning operation may involve NTN cell(s) without ground cell(s), a mix of NTN and ground cells, and/or hybrid solutions involving NTN cells, ground cells, GNSS satellites, and/or other ground based positioning reference points such as WiFi, Bluetooth, etc.

Figure 13:
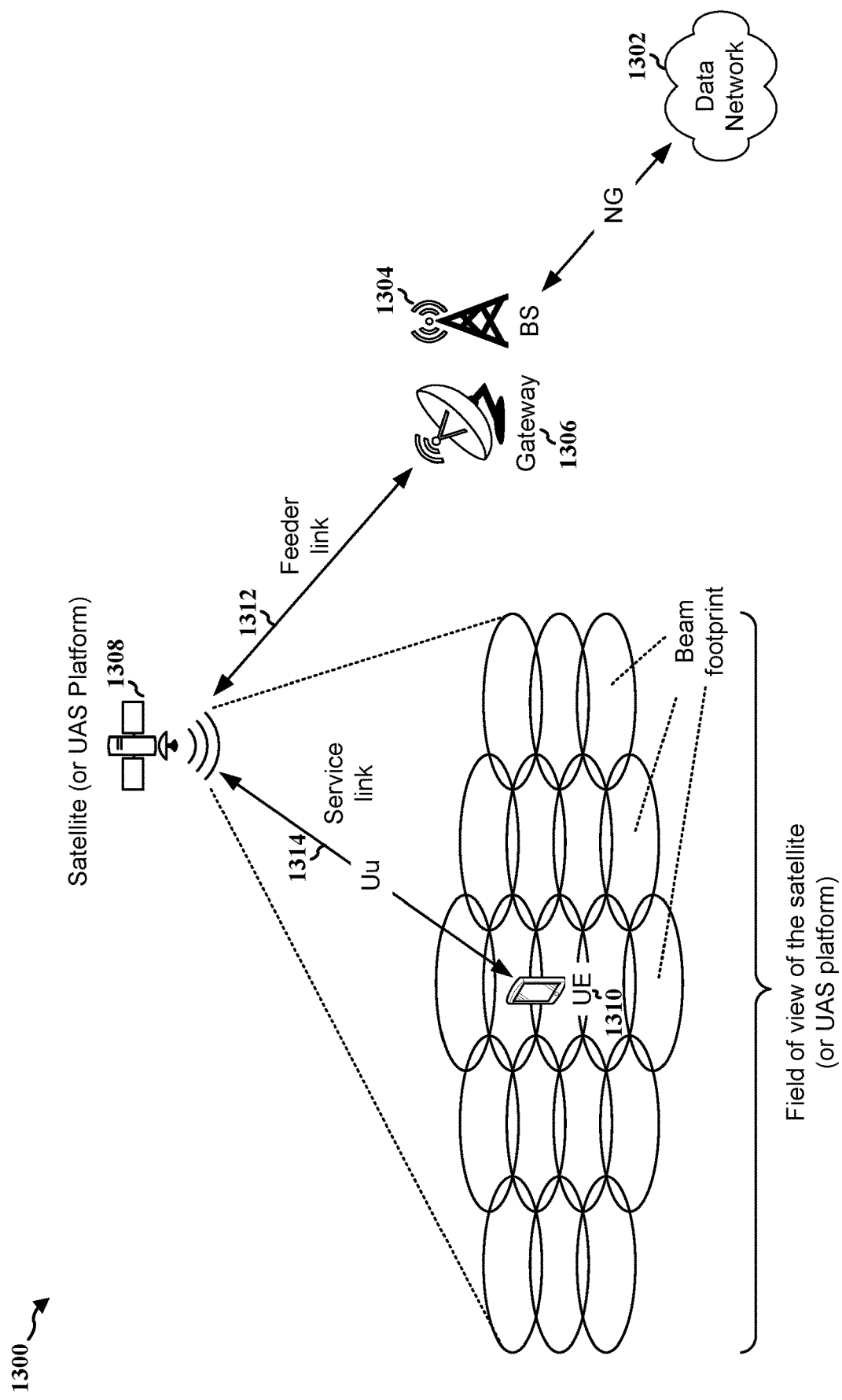
FIG. 13 is a diagram illustrating an example of a non-terrestrial network (NTN) architecture based on transparent payload in accordance with various aspects of the present disclosure.

FIG. 13 is a diagram 1300 illustrating an example of an NTN architecture based on a transparent payload in accordance with various aspects of the present disclosure. A data network 1302 (e.g., a 5G core (5GC) network) may connect to a base station 1304 (e.g., an gNB) via a communication interface (e.g., a next generation (NG) interface). The base station 1304 may be located on the ground and connected to an NTN gateway 1306, where the NTN gateway 1306 may be connected to an NTN payload 1308 (e.g., a network node embarked onboard a satellite, an unmanned aircraft systems (UAS), or HAPS, etc.) via a feeder link 1312. The NTN payload 1308 may connect to a UE 1310 via a service link 1314 (e.g., using the UE-UTRAN (Uu) interface). Under the transparent payload NTN architecture, the base station 1304 may be a ground station and the NTN payload 1308 (e.g., the satellite) may function like a relay, where the NTN payload 1308 may provide radio frequency filtering, frequency conversion, and/or amplification for data/payload received from the base station 1304 via the NTN gateway 1306 and relay/transmit the data/payload to the UE 1310. As such, the waveform signal relayed/repeated by the NTN payload 1308 may be un-changed. In some examples, the ground area(s) covered by the NTN payload 1308 may be referred to as "footprint(s)." The footprint of a satellite may be a ground area in which its transponders offer coverage, and the footprint may also determine the satellite dish diameter that may be needed to receive each transponder's signal. In some examples, there may be a different coverage map for each transponder (or group of transponders), as each transponder may be configured to cover different areas.

Figure 14B:
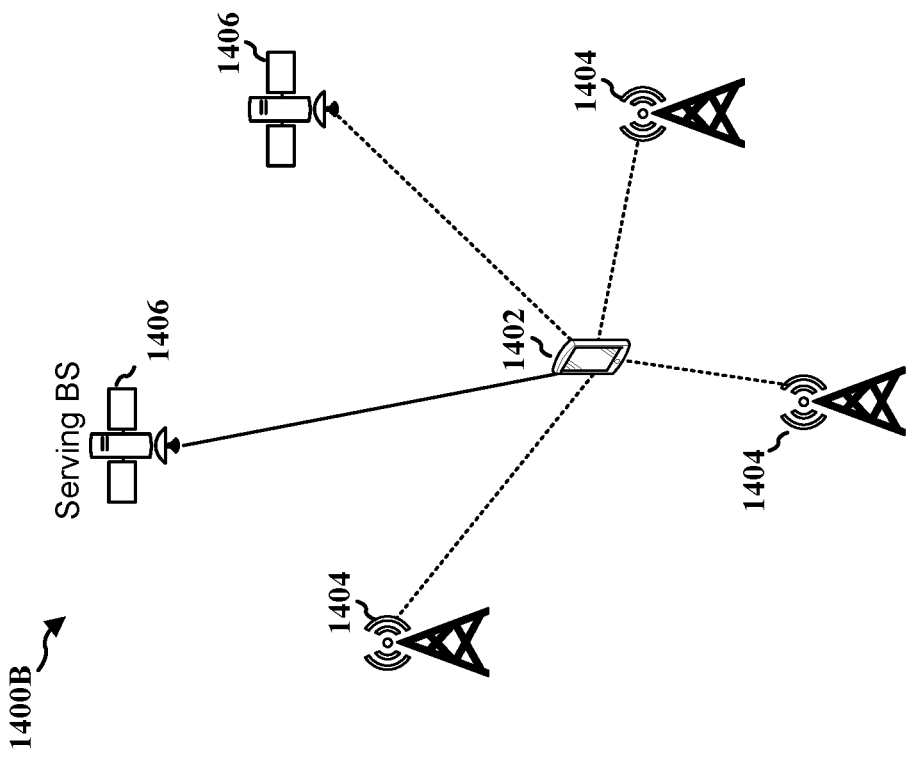
FIG. 14B is a diagram illustrating an example network that includes both NTN and TN devices in accordance with various aspects of the present disclosure.
Figure 14A:
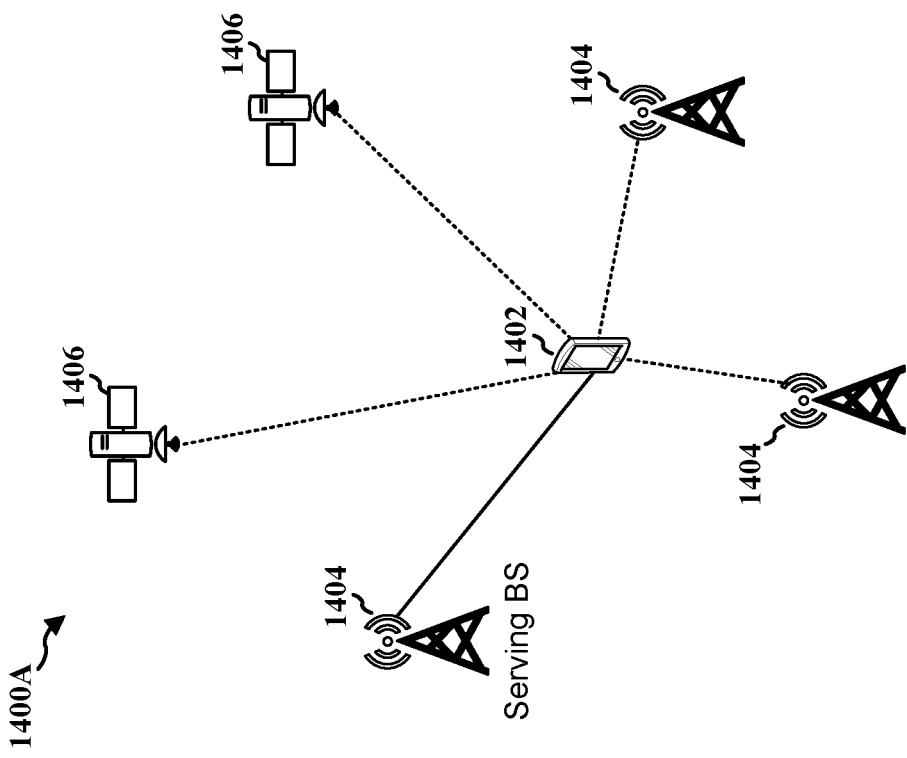
FIG. 14A is a diagram illustrating an example network that includes both NTN and TN devices in accordance with various aspects of the present disclosure.

In some examples, a communication network may include both NTN and terrestrial network (TN). In other words, a segment of an NTN may be operating based on non-terrestrial device(s) and another segment of the NTN may be operating based on terrestrial device(s). For example, FIGS. 14A and 14B are diagrams 1400A and 1400B illustrating examples of a network that includes both NTN and TN devices in accordance with various aspects of the present disclosure. An NTN may include one or more TN devices 1404 (e.g., ground base stations and/or TRPs) and one or more NTN devices 1406 (e.g., satellites and/or aircrafts), where a UE 1402 in a positioning session may transmit or receive signals (e.g., PRSs, SRSs, etc.) with both TN devices 1404 and the one or more NTN devices 1406, such as described in connection with FIG. 6. In some examples, as shown by the diagram 1400A, a serving base station may be a TN device, such that the UE 1402 may be connected to the serving base station via a TN network. In other examples, as shown by the diagram 1400B, the serving base station may be an NTN device, such that the UE 1402 may be connected to an NTN satellite base station. In both scenarios, the assistance data (AD) associated with the UE positioning session may include a mixed of TN and NTN base stations. For purposes of the present disclosure, a base station that is located on an NTN device (e.g., a satellite, an aircraft, or an UAS platform, etc.) may be referred to as an "NTN base station," an "NTN satellite base station," and/or an "NTN base station satellite." On the other hand, a base station that is located on the earth may be referred to as an "TN base station" and/or a "terrestrial base station."

DL-TDOA may be a good positioning mechanism for UE positioning associated with an NTN network (e.g., LEO satellite networks). As high precision carrier phase-based positioning may be challenging for some small form factor devices, such as smart phones, smart watches, and/or wearable devices due to the limitation of their antenna, DL-TDOA may enable DL based UE positioning in NTN networks and UE based positioning to increase the accuracy and reduce the latency for the UE positioning. However, satellite synchronization error may reduce the accuracy or performance of a DL-TDOA based positioning method, which may prevent an NTN network (e.g., NTN networks with LEO satellites) from achieving a high precision positioning. In other words, satellite synchronization may be an important factor to achieve high precision positioning in LEO satellite networks. For example, different hardware and/or radio frequency (RF) chains in different satellites may result synchronization error(s) across the satellites, even if these satellites are controlled by the same gateway (e.g., the gateway 1306). In other examples, different satellites may also be controlled by different gateways (e.g., two satellites may be controlled by two different gateways), which may result into additional network synchronization error. While one solution to eliminate satellite clock error is to subtract a base station measurement from a rover station measurement for the same satellite, such as described in connection with FIGS. 11A, 11B, and 12, such solution may specify an additional rover station, which may not be feasible or low cost for commercial use cases, such as for smart phone and/or smart watch positioning.

Aspects presented herein may improve the precision and performance of a TDOA-based UE positioning scheme that is associated with an NTN. Aspects presented herein provided enhanced TDOA based UE positioning schemes that may leverage the inter-satellite link to mitigate the impact of synchronization errors across different satellites.

In one aspect of the present disclosure, if one or more satellites associated with an NTN are equipped with on-board baseband processing (which may also be referred to as "baseband on-board processing), an inter-satellite link may be established between two satellites to aid a TDOA-based UE positioning. For example, there may be one or more satellites that cover (at least for a positioning service) a specific area at a specific time. If these satellites have the capability to conduct on-board baseband processing, the synchronization error(s) for PRS transmissions across this group of satellites may be eliminated based at least in part on inter-satellite reference signal (RS).

Figure 15:
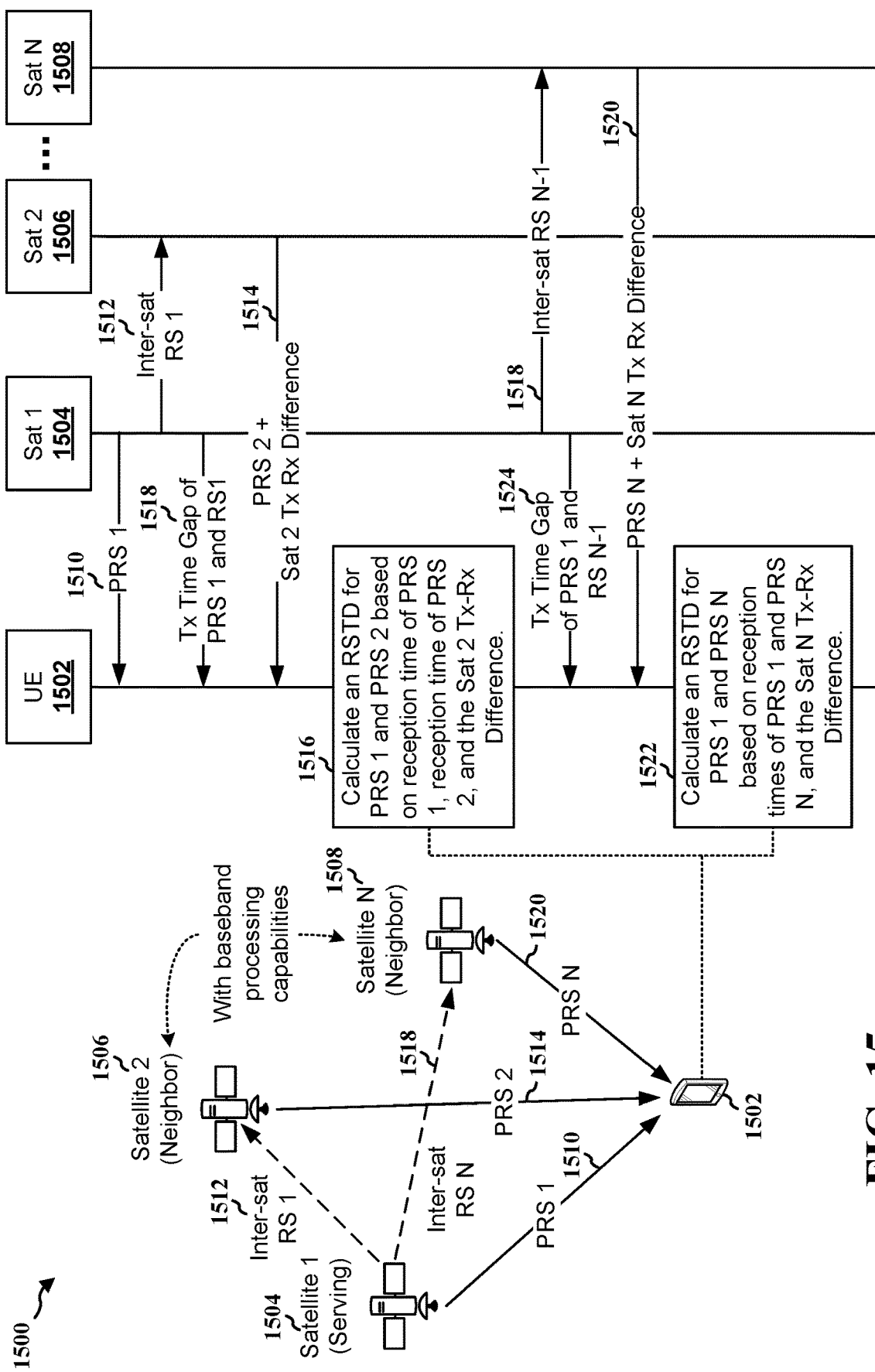
FIG. 15 is a communication flow illustrating an example of an intersatellite link aided TDOA-based UE positioning in accordance with various aspects of the present disclosure.

FIG. 15 is a communication flow 1500 illustrating an example of an intersatellite link aided TDOA-based UE positioning in accordance with various aspects of the present disclosure. The numberings associated with the communication flow 1500 do not specify a particular temporal order and are merely used as references for the communication flow 1500.

A TDOA-based UE positioning session may be established for a UE 1502 (e.g., by an LMF or a serving base station), where the UE 1502 may be configured to receive PRSs from multiple satellites that include a first satellite 1504, a second satellite 1506, and up to a $N^{th}$ satellite 1508 (collectively as "satellites" or "participating satellites"). In some examples, the first satellite 1504 may be referred to as a serving satellite, and the second satellite 1506 and up to the $N^{th}$ satellite 1508 may be referred to as neighbor satellites. The satellites may cover a specific area at a specific time, and the satellites may include the capability to provide on-board baseband processing (e.g., the satellites are capable of receiving signal, measuring signal, and/or generating signal).

In one aspect, to eliminate synchronization errors between PRSs transmitted from different satellites, a serving satellite may be configured to transmit at least one reference signal to a neighbor satellite (may be referred to as an "inter-satellite reference signal"), such that the neighbor satellite may estimate/calculate the time difference between the PRS transmission and the inter-satellite RS reception. Then, a UE may derive an RSTD for the PRSs received from the serving base station and the neighbor base station based at least in part on the reception times of the PRSs and the time difference between the PRS transmission and the inter-satellite RS reception.

For example, to eliminate or reduce synchronization errors between PRSs transmitted from the first satellite 1504 (e.g., a serving satellite) and the second satellite 1506 (e.g., a neighbor satellite), at 1510, the first satellite 1504 may transmit a first PRS (PRS 1) to the UE 1502, and at 1512, the first satellite 1504 may transmit a first inter-satellite RS (Inter-sat RS 1) to the second satellite 1506. The second satellite 1506 may cover the same area as the first satellite 1504. In some examples, the first inter-satellite RS may also be a PRS. In other words, the inter-satellite RS may also be PRS.

After receiving the first inter-satellite RS from the first satellite 1504, at 1514, the second satellite 1506 may transmit a second PRS (PRS 2) towards the UE 1502. In addition, the second satellite 1506 may estimate/calculate a time difference between the second PRS transmission and the inter-satellite RS reception, which may be denoted as $T_{sat\_2\_Tx \to Rx}$ for purposes of the present disclosure. After the second satellite 1506 estimates/calculates the time difference ($T_{sat\_2\_Tx \to Rx}$), the second satellite 1506 may transmit the estimated/calculated time difference ($T_{sat\_2\_Tx \to Rx}$) to the UE 1502, such as transmitted with the second PRS or via a separate signaling or message. In some examples, as the UE 1502 may use this time difference ($T_{sat\_2\_Tx \to Rx}$) for calculating the RSTD of the first PRS and the second PRS, each time difference ($T_{sat\_2\_Tx \to Rx}$) may be associated with a satellite identifier (ID) that identifies the satellite, a TRP ID, a PRS ID, and/or a timestamp.

At 1516, after the UE 1502 receives the first PRS (e.g., at 1510), the second PRS, and the time difference between the second PRS transmission and the inter-satellite RS reception ($T_{sat\_2\_Tx \to Rx}$), the UE 1502 may calculate an RSTD for the first PRS and the second PRS (denoted as RSTD_1_2) based on:

$$RSTD\_1\_2 = T_{\_Rx\_sat\_1} - T_{\_Rx\_sat\_2} - (T_{gap,iner-sat\_RS\_1 \to PRS\_1} + T_{prop,sat\_1 \to sat\_2} + T_{sat\_2\_Tx \to Rx}),$$

where $T_{-Rx\_sat\_1}$ may be the reception time of the first PRS at the UE, $T_{-Rx\_sat\_2}$ may be the reception time of the second PRS at the UE, $T_{gap,iner-sat\_RS\_1 \rightarrow PRS\_1}$ may be a time gap between the first satellite 1504 transmits the first inter-satellite RS and the first PRS, $T_{prop,sat\_1 \rightarrow sat\_2}$ may be a signal propagation time between the first satellite 1504 and the second satellite 1506 (which may be signaled to the UE 1502 by the second satellite 1506 and/or an LMF), and $T_{sat\_2\_Tx \rightarrow Rx}$ may be the time difference between the second satellite 1506 transmits the second PRS and receives the first inter-satellite RS as described in connection with 1514. In some examples, as shown at 1518, as the UE 1502 may also not be aware of the inter-satellite RS transmission between the first satellite 1504 and the second satellite 1506, the first satellite 1504 may signal the time gap ($T_{gap,iner-sat\_RS\_1 \rightarrow PRS\_1}$) to the UE 1502, such as transmitted with the first PRS (e.g., at 1510) or via a separate signaling or message.

As the inter-satellite RS transmission between the first satellite 1504 and the second satellite 1506 (e.g., the first inter-satellite RS) may enable the UE 1502 to take into account the time gap between the first satellite 1504 transmits the first inter-satellite RS and the first PRS, the signal propagation time between the first satellite 1504 and the second satellite 1506, and the time difference between the second satellite 1506 transmits the second PRS and receives the first inter-satellite RS when the UE 1502 is calculating/estimating the RSTD for the PRSs received from the first satellite 1504 and the second satellite 1506, the synchronization error(s) between the PRSs received from the first satellite 1504 and the second satellite 1506 may be eliminated or reduced, thereby providing a more precise or an improved TDOA-based UE positioning.

Similarly, synchronization errors between other satellites associated with the UE positioning session may also be eliminated based such configuration. For example, to eliminate or reduce synchronization errors between PRSs transmitted from the first satellite 1504 and the $N^{th}$ satellite 1508, at 1518, the first satellite 1504 may transmit an (N−1)th inter-satellite RS to the $N^{th}$ satellite 1508.

After receiving the $(N-1)^{th}$ inter-satellite RS from the first satellite 1504, at 1520, the $N^{th}$ satellite 1508 may transmit a $N^{th}$ PRS (PRS N) towards the UE 1502. In addition, the $N^{th}$ satellite 1508 may estimate/calculate a time difference ($T_{sat\_N\_Tx \rightarrow Rx}$) between the $N^{th}$ PRS transmission and the inter-satellite RS reception and transmit the estimated/calculated time difference ($T_{sat\_N\_Tx \rightarrow Rx}$) to the UE 1502. Then, at 1522, after the UE 1502 receives the first PRS (e.g., at 1510), the $N^{th}$ PRS, and the time difference between the $N^{th}$ PRS transmission and the inter-satellite RS reception ($T_{sat\_N\_Tx \rightarrow Rx}$), the UE 1502 may calculate an RSTD for the first PRS and the $N^{th}$ PRS (denoted as RSTD_1_N) based on:

$$RSTD\_1\_N = T_{-Rx\_sat\_1} - T_{-Rx\_sat\_N} - (T_{gap,iner-sat\_RS\_(N-1) \rightarrow PRS\_1} + T_{prop,sat\_1 \rightarrow sat\_N} + T_{sat\_N\_Tx \rightarrow Rx}),$$

where $T_{-Rx\_sat\_1}$ may be the reception time of the first PRS at the UE, $T_{-Rx\_sat\_N}$ may be the reception time of the $N^{th}$ PRS at the UE, $T_{gap,iner-sat\_RS\_(N-1) \rightarrow PRS\_1}$ may be a time gap between the first satellite 1504 transmits the $(N-1)^{th}$ inter-satellite RS and the first PRS, $T_{prop,sat\_1 \rightarrow sat\_N}$ may be a signal propagation time between the first satellite 1504 and the $N^{th}$ satellite 1508, and $T_{sat\_N\_Tx \rightarrow Rx}$ may be the time difference between the $N^{th}$ satellite 1508 transmits the $N^{th}$ PRS and receives the $(N-1)^{th}$ inter-satellite RS as described in connection with 1514. In some examples, as shown at 1524, as the UE 1502 may also not be aware of the inter-satellite RS transmission between the first satellite 1504 and the $N^{th}$ satellite 1508, the first satellite 1504 may signal the time gap ($T_{gap,iner-sat\_RS\_(N-1) \rightarrow PRS\_1}$) to the UE 1502.

In some scenarios, for satellites with on-board baseband processing, an LMF may coordinate the gateway and the participating satellites for the inter-satellite RS transmission(s). For example, a satellite (e.g., the serving satellite or a reference satellite) may be guided by the LMF at which time and/or frequency resource to signal the inter-satellite RS. In some examples, a measurement gap may also be configured for the neighbor satellite (e.g., the second satellite 1506 and up to the $N^{th}$ satellite 1508) for the reception of inter-satellite RS.

In another example, the LMF may be specified to signal the positioning assistance data to the neighbor satellite to aid the inter-satellite RS reception, such as informing the neighbor satellite regarding the time and/or frequency allocation of the inter-satellite RS.

In another example, the LMF and/or a gateway associated with the satellites may also recommend the transmission (Tx) and/or the reception (Rx) beam(s) to the satellites, such that the satellites may be able to determine which beam(s) may be used for transmitting the RS and/or for receiving the RS. In another example, an absolute or relative direction between the serving satellite (or a reference satellite) and neighbor satellites may be configured at the serving satellite and the neighbor satellites, which may guide the antenna selection (Tx/Rx) beamforming at the satellites for inter satellite link transmission/reception. In another example, there may be a quasi-co-located (QCL) configuration to aid the neighbor satellites to find a best or a most suitable Rx beam for an inter-satellite RS reception.

In another aspect of the present disclosure, if one or more satellites associated with an NTN are not equipped with on-board baseband processing, the synchronization error(s) for PRS transmissions across this group of satellites may be eliminated based at least in part on a bent pipe operation.

Figure 16:
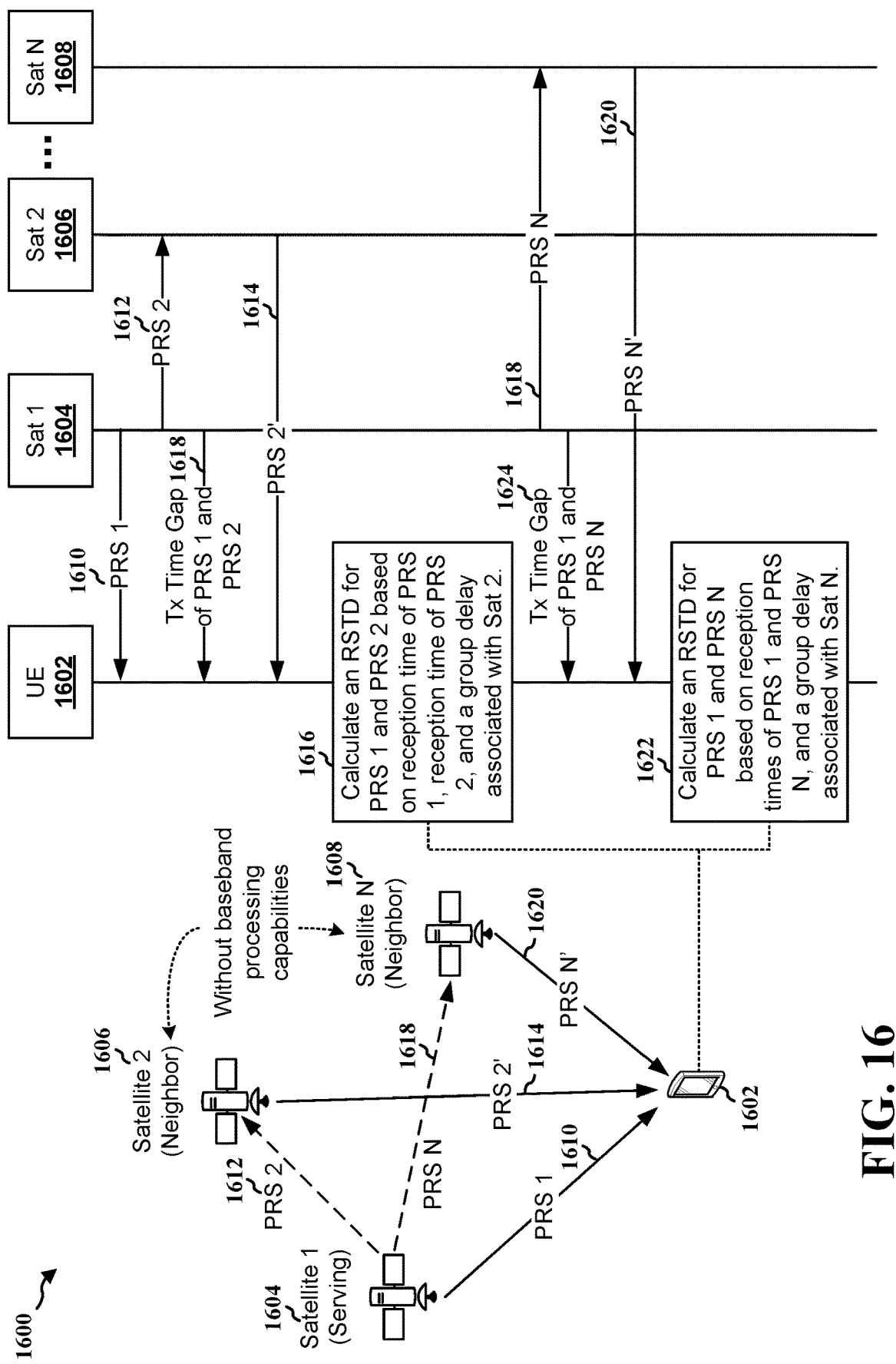
FIG. 16 is a communication flow illustrating an example of an intersatellite link aided TDOA-based UE positioning with bent pipe operation in accordance with various aspects of the present disclosure.

FIG. 16 is a communication flow 1600 illustrating an example of an intersatellite link aided TDOA-based UE positioning with bent pipe operation in accordance with various aspects of the present disclosure. The numberings associated with the communication flow 1600 do not specify a particular temporal order and are merely used as references for the communication flow 1600.

A TDOA-based UE positioning session may be established for a UE 1602 (e.g., by an LMF or a serving base station), where the UE 1602 may be configured to receive PRSs from multiple satellites that include a first satellite 1604, a second satellite 1606, and up to an $N^{th}$ satellite 1608 (collectively as "satellites" or "participating satellites"). In some examples, the first satellite 1604 may be referred to as a serving satellite, and the second satellite 1606 and up to the $N^{th}$ satellite 1608 may be referred to as neighbor satellites. The satellites may cover a specific area at a specific time, and at least the second satellite 1606 and up to the $N^{th}$ satellite 1608 may have the capability to perform bent pipe operations but may not have the capability to provide on-board baseband processing (which may be referred to as bent pipe satellites for purposes of the present disclosure hereafter). A bent pipe operation may refer to a satellite receiving a signal from another satellite or a ground station and relaying/rerouting the signal to another device (e.g., such as to another ground station on earth or to a UE). In other words, for bent pipe-based satellites, the baseband samples may not be re-generated at the bent pipe satellites, hence the baseband samples of an inter-satellite signal and a corresponding relayed signal may be the same.

In one aspect, to eliminate synchronization errors between PRSs transmitted from different satellites, a serving satellite may be configured to transmit a first PRS to a UE and a second PRS to a neighbor satellite that is a bent pipe satellite, such that the neighbor satellite may relay/reroute the second PRS to the UE. Then, the UE may derive an RSTD for the PRSs received from the serving base station and the neighbor base station based at least in part on the reception times of the PRSs and a group delay associated with the neighbor satellite.

For example, to eliminate or reduce synchronization errors between PRSs transmitted from the first satellite 1604 (e.g., a serving satellite) and the second satellite 1606 (e.g., a neighbor satellite), at 1610, the first satellite 1604 may transmit a first PRS (PRS 1) to the UE 1602, and at 1612, the first satellite 1604 may transmit a second PRS (PRS 2) to the second satellite 1606. The second satellite 1606 may cover the same area as the first satellite 1604.

After receiving the second PRS from the first satellite 1604, at 1614, the second satellite 1606 may relay/reroute the second PRS (PRS 2') towards the UE 1602. In other words, the second satellite 1606 may bent pipe the PRS received from the first satellite 1604 towards the UE 1602.

At 1616, after the UE 1602 receives the first PRS (e.g., at 1610) and the second PRS (e.g., at 1614), the UE 1602 may calculate an RSTD for the first PRS and the second PRS (denoted as RSTD_1_2) based on:

$$RSTD\_1\_2 = T_{\_Rx\_sat\_1} - T_{\_Rx\_sat\_2} - (T_{gap,PRS\_2 \to PRS\_1} + T_{prop,sat\_1 \to sat\_2} + T_{GD\_BP}),$$

where $T_{\_Rx\_sat\_1}$ may be the reception time of the first PRS at the UE, $T_{\_Rx\_sat\_2}$ may be the reception time of the second PRS at the UE, $T_{gap,PRS\_2 \to PRS\_1}$ may be a time gap between the first satellite 1604 transmits the first PRS and the second PRS, $T_{prop,sat\_1 \to sat\_2}$ may be a signal propagation time between the first satellite 1604 and the second satellite 1606 (which may be signaled to the UE 1602 by an LMF), and $T_{GD\_BP}$ may be a group delay associated with the second satellite 1606. In some examples, as shown at 1618, as the UE 1602 may also not be aware of the inter-satellite PRS transmission between the first satellite 1604 and the second satellite 1606, the first satellite 1604 may signal the time gap $(T_{gap,PRS\_2 \to PRS\_1})$ to the UE 1602, such as transmitted with the first PRS (e.g., at 1610) or via a separate signaling or message.

In some examples, the group delay $(T_{GD\_BP})$ of the bent pipe operation may be pre-calibrated at the UE 1602. For example, an LMF may signal the group delay $(T_{GD\_BP})$ to the UE 1602 in positioning assistance data for the UE 1602 to perform the RSTD calculation. In addition, each group delay $(T_{GD\_BP})$ may be associated with a satellite ID and/or a TRP ID. The variance of the group delay $(T_{GD\_BP})$ (e.g., a dynamic range of the group delay distribution) may also be signaled in the assistance data.

As the inter-satellite PRS transmission between the first satellite 1604 and the second satellite 1606 (e.g., the second PRS) may enable the UE 1602 to take into account the time gap between the first satellite 1604 transmits the second PRS and the first PRS, the signal propagation time between the first satellite 1604 and the second satellite 1606, and the and the group delay associated with the second satellite 1606 when the UE 1602 is calculating/estimating the RSTD for the PRSs received from the first satellite 1604 and the second satellite 1606, the synchronization error(s) between the PRSs received from the first satellite 1604 and the second satellite 1606 may be eliminated or reduced, thereby providing a more precise or an improved TDOA-based UE positioning.

Similarly, synchronization errors between other satellites associated with the UE positioning session may also be eliminated based such configuration. For example, to eliminate or reduce synchronization errors between PRSs transmitted from the first satellite 1604 and the $N^{th}$ satellite 1608 (e.g., a satellite without baseband processing capability), at 1618, the first satellite 1604 may transmit an $N^{th}$ PRS to the $N^{th}$ satellite 1608.

After receiving the $N^{th}$ PRS from the first satellite 1604, at 1620, the $N^{th}$ satellite 1608 may relay/reroute the $N^{th}$ PRS (PRS N') towards the UE 1602. In other words, the $N^{th}$ satellite 1608 may bent pipe the PRS received from the first satellite 1604 towards the UE 1602.

At 1622, after the UE 1602 receives the first PRS (e.g., at 1610) and the $N^{th}$ PRS (e.g., at 1614), the UE 1602 may calculate an RSTD for the first PRS and the $N^{th}$ PRS (denoted as RSTD_1_N) based on:

$$RSTD\_1\_N = T_{\_Rx\_sat\_1} - T_{\_Rx\_sat\_N} - (T_{gap,PRS\_N \to PRS\_1} + T_{prop,sat\_1 \to sat\_N} + T_{GD\_BP}),$$

where $T_{\_Rx\_sat\_1}$ may be the reception time of the first PRS at the UE, $T_{\_Rx\_sat\_N}$ may be the reception time of the $N^{th}$ PRS at the UE, $T_{gap,PRS\_N \to PRS\_1}$ may be a time gap between the first satellite 1604 transmits the first PRS and the $N^{th}$ PRS, $T_{prop,sat\_1 \to sat\_N}$ may be a signal propagation time between the first satellite 1604 and the $N^{th}$ satellite 1608 (which may be signaled to the UE 1602 by an LMF), and $T_{GD\_BP}$ may be a group delay associated with the $N^{th}$ satellite 1608. In some examples, as shown at 1624, as the UE 1602 may also not be aware of the inter-satellite PRS transmission between the first satellite 1604 and the $N^{th}$ satellite 1608, the first satellite 1604 may signal the time gap $(T_{gap,PRS\_N \to PRS\_1})$ to the UE 1602, such as transmitted with the first PRS (e.g., at 1610) or via a separate signaling or message.

In some scenarios, for bent pipe-based satellites, the baseband samples (e.g., signals received from another satellite or a ground station) may not be re-generated, hence the baseband samples of the inter-satellite PRS (e.g., the PRS 2, the PRS N) and the corresponding relayed PRS (e.g., the PRS 2', the PRS N') may be the same. In addition, the bent pipe-based satellites may not be aware of the content of the baseband samples, hence the LMF may be configured to coordinate the gateway and the related satellites for the PRS relay. For example, the gateway and/or the serving satellite (or the reference satellite) may be guided by an LMF at which time and/or frequency resources to signal the inter-satellite PRS. Also, there may be some controls/options on the beam selection for serving/neighbor satellites based on the guidance from LMF/gateway.

Figure 17:
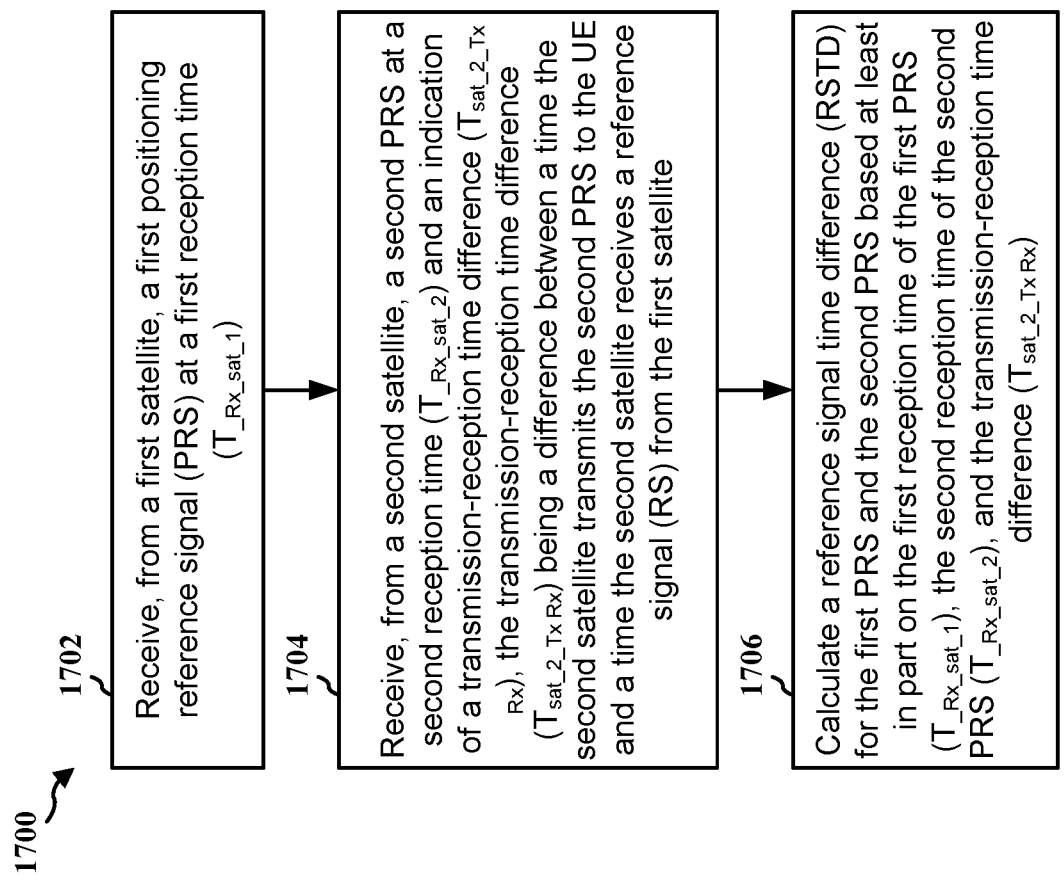
FIG. 17 is a flowchart of a method of wireless communication in accordance with aspects presented herein.

FIG. 17 is a flowchart 1700 of a method of wireless communication. The method may be performed by a UE or a component of a UE (e.g., the UE 104, 350, 404, 602, 802, 1310, 1402, 1502, 1602; the apparatus 1802; a processing system, which may include the memory 360 and which may be the entire UE 350 or a component of the UE 350, such as the TX processor 368, the RX processor 356, and/or the controller/processor 359). The method may improve the precision and performance of a TDOA-based UE positioning scheme that is associated with an NTN.

At 1702, the UE may receive, from a first satellite, a first PRS at a first reception time $(T_{\_Rx\_sat\_1})$, such as described in connection with FIG. 15. For example, at 1510, the UE 1502 may receive a first PRS from the first satellite 1504 at a first reception time. The reception of the first PRS may be performed by, e.g., the first PRS process component 1840 and/or the reception component 1830 of the apparatus 1802 in FIG. 18.

At 1704, the UE may receive, from a second satellite, a second PRS at a second reception time ($T_{\_Rx\_sat\_2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives a reference signal (RS) from the first satellite, such as described in connection with FIG. 15. For example, at 1514, the UE 1502 may receive a second PRS at a second reception time and an indication of a transmission-reception time difference ($T_{sat\_2\_Tx \rightarrow Rx}$) from the second satellite 1506. The reception of the second PRS and/or the indication of the transmission-reception time difference may be performed by, e.g., the second PRS process component 1842 and/or the reception component 1830 of the apparatus 1802 in FIG. 18.

At 1706, the UE may calculate a reference signal time difference (RSTD) for the first PRS and the second PRS based at least in part on the first reception time of the first PRS ($T_{\_Rx\_sat\_1}$), the second reception time of the second PRS ($T_{\_Rx\_sat\_2}$), and the transmission-reception time difference ($T_{sat\_2\_Tx \rightarrow Rx}$), such as described in connection with FIG. 15. For example, at 1516, the UE 1502 may calculate an RSTD for the first PRS and the second PRS based on the reception time of the first PRS, the reception time of the second PRS, and the transmission-reception time difference. The calculation of the RSTD may be performed by, e.g., the RSTD calculation component 1844 of the apparatus 1802 in FIG. 18.

In one example, the second satellite may have a capability to provide baseband onboard processing.

In another example, the RSTD for the first PRS and the second PRS (RSTD_1_2) may be calculated based on: RSTD_1_2=$T_{\_Rx\_sat\_1}$−$T_{\_Rx\_sat\_2}$−($T_{gap,iner-sat\_RS\_1 \rightarrow PRS\_1}$+$T_{prop,sat\_1 \rightarrow sat\_2}$+$T_{sat\_2\_Tx \rightarrow Rx}$), where the $T_{gap,iner-sat\_RS\_1 \rightarrow PRS\_1}$ is a time gap between a time the first satellite transmits the first PRS to the UE and a time the first satellite transmits the RS to the second satellite, and the $T_{prop,sat\_1 \rightarrow sat\_2}$ is a signal propagation time between the first satellite and the second satellite. In such an example, the UE may receive, from the first satellite, an indication of the $T_{gap,iner-sat\_RS\_1 \rightarrow PRS\_1}$. In such an example, the UE may receive, from the second satellite, an indication of the $T_{prop,sat\_1 \rightarrow sat\_2}$.

In another example, the transmission-reception time difference ($T_{sat\_2\_Tx \rightarrow Rx}$) may be associated with one or more of: a satellite ID, a TRP ID, a PRS ID, or a timestamp.

In another example, the UE may calculate a position of the UE based at least in part on the RSTD for the first PRS and the second PRS.

Figure 18:
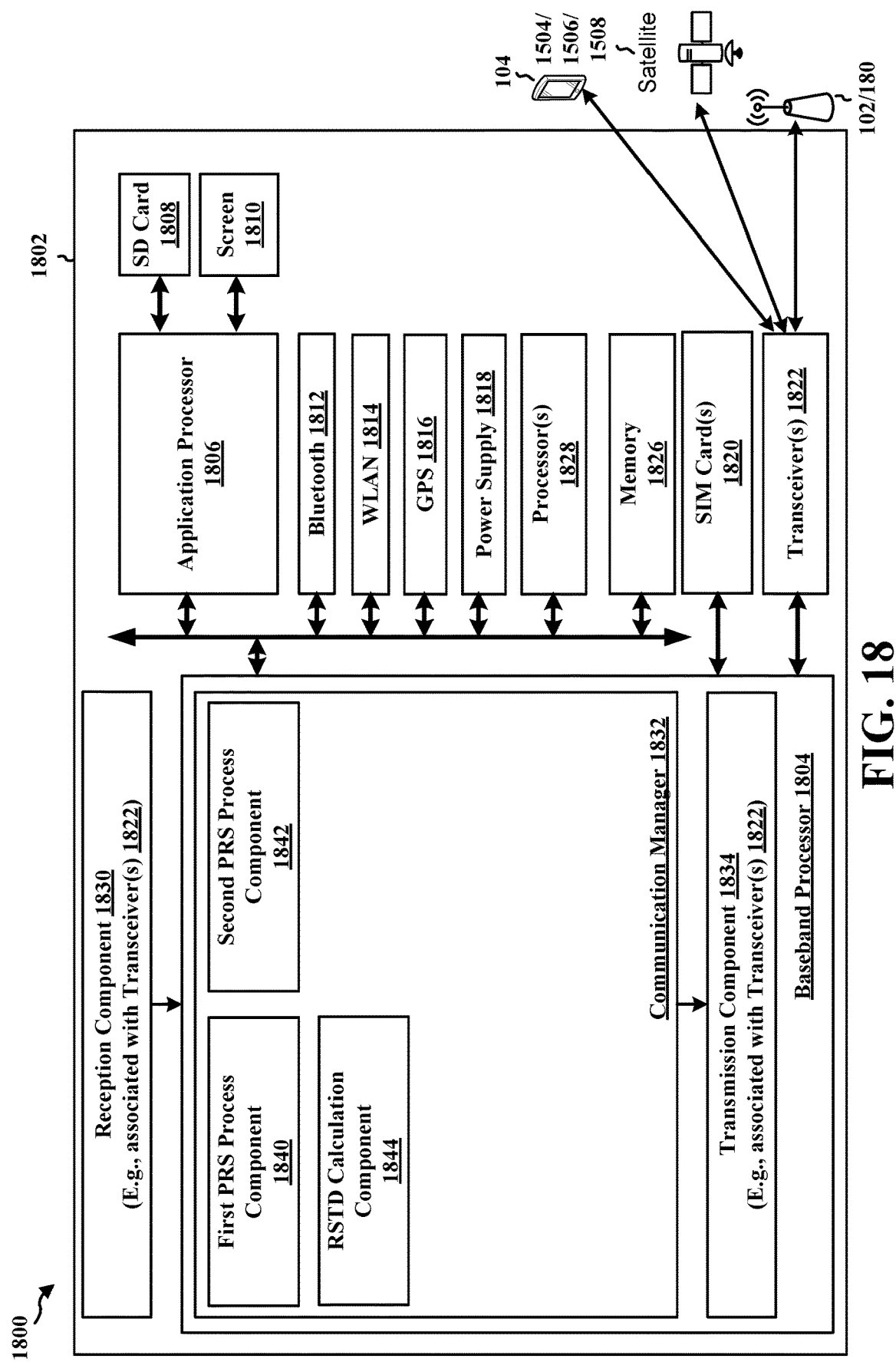
FIG. 18 is a diagram illustrating an example of a hardware implementation for an example apparatus in accordance with aspects presented herein.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a baseband processor 1804 (also referred to as a modem) coupled to at least one transceiver 1822 (e.g., one or more RF transceivers and/or antennas). The at least one transceiver 1822 may be associated with or include a reception component 1830 and/or a transmission component 1834. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The baseband processor 1804 communicates through the at least one transceiver 1822 with the UE 104 and/or BS 102/180. The baseband processor 1804 may include a computer-readable medium/memory (e.g., a memory 1826). The computer-readable medium/memory may be non-transitory. The baseband processor 1804 and/or at least one processor 1828 is responsible for general processing, including the execution of software stored on the computer-readable medium/memory. The software, when executed by the baseband processor 1804 and/or the at least one processor 1828, causes the baseband processor 1804 and/or the at least one processor 1828 to perform the various functions described supra. The computer-readable medium/memory may also be used for storing data that is manipulated by the baseband processor 1804 when executing software. The baseband processor 1804 further includes the reception component 1830, a communication manager 1832, and the transmission component 1834. The reception component 1830 and the transmission component 1834 may, in a non-limiting example, include at least one transceiver and/or at least one antenna subsystem. The communication manager 1832 includes the one or more illustrated components. The components within the communication manager 1832 may be stored in the computer-readable medium/memory and/or configured as hardware within the baseband processor 1804. The baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a first PRS process component 1840 that is configured to receive, from a first satellite, a first positioning reference signal (PRS) at a first reception time ($T_{\_Rx\_sat\_1}$), e.g., as described in connection with 1702 of FIG. 17. The communication manager 1832 further includes a second PRS process component 1842 that is configured to receive, from a second satellite, a second PRS at a second reception time ($T_{\_Rx\_sat\_2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives an RS from the first satellite, e.g., as described in connection with 1704 of FIG. 17. The communication manager 1832 further includes an RSTD calculation component 1844 that is configured to calculate a reference signal time difference (RSTD) for the first PRS and the second PRS based at least in part on the first reception time of the first PRS ($T_{\_Rx\_sat\_1}$), the second reception time of the second PRS ($T_{\_Rx\_sat\_2}$), and the transmission-reception time difference ($T_{sat\_2\_Tx \rightarrow Rx}$), e.g., as described in connection with 1706 of FIG. 17.

The apparatus may include additional components that perform each of the blocks of the algorithm in the flowchart of FIG. 17. As such, each block in the flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband processor 1804, includes means for receiving, from a first satellite, a first positioning reference signal (PRS) at a first reception time ($T_{-Rx-sat-1}$) (e.g., the first PRS process component 1840 and/or the reception component 1830). The apparatus 1802 includes means for receiving, from a second satellite, a second PRS at a second reception time ($T_{-Rx-sat-2}$) and an indication of a transmission-reception time difference ($T_{sat\_2\_Tx \to Rx}$), the transmission-reception time difference ($T_{sat\_2\_Tx \to Rx}$) being a difference between a time the second satellite transmits the second PRS to the UE and a time the second satellite receives a reference signal (RS) from the first satellite (e.g., the second PRS process component 1842 and/or the reception component 1830). The apparatus 1802 includes means for calculating a reference signal time difference (RSTD) for the first PRS and the second PRS based at least in part on the first reception time of the first PRS ($T_{-Rx-sat-1}$), the second reception time of the second PRS ($T_{-Rx-sat-2}$), and the transmission-reception time difference ($T_{sat\_2\_Tx \to Rx}$) (e.g., the RSTD calculation component 1844).

In one configuration, the second satellite may have a capability to provide baseband onboard processing.

In another configuration, the RSTD for the first PRS and the second PRS ($RSTD_{1\_2}$) may be calculated based on: $RSTD_{1\_2} = T_{-Rx-sat-1} - T_{-Rx-sat-2} - (T_{gap,iner-sat\_RS\_1 \to PRS\_1} + T_{prop,sat\_1 \to sat\_2} + T_{sat\_2\_Tx \to Rx})$, where the $T_{gap,iner-sat\_RS\_1 \to PRS\_1}$ is a time gap between a time the first satellite transmits the first PRS to the UE and a time the first satellite transmits the RS to the second satellite, and the $T_{prop,sat\_1 \to sat\_2}$ is a signal propagation time between the first satellite and the second satellite. In such a configuration, the apparatus 1802 includes means for receiving, from the first satellite, an indication of the $T_{gap,iner-sat\_RS\_1 \to PRS\_1}$. In such a configuration, the apparatus 1802 includes means for receiving, from the second satellite, an indication of the $T_{prop,sat\_1 \to sat\_2}$.

In another configuration, the transmission-reception time difference ($T_{sat\_2\_Tx \to Rx}$) may be associated with one or more of: a satellite ID, a TRP ID, a PRS ID, or a time stamp.

In another configuration, the apparatus 1802 includes means for calculating a position of the UE based at least in part on the RSTD for the first PRS and the second PRS.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
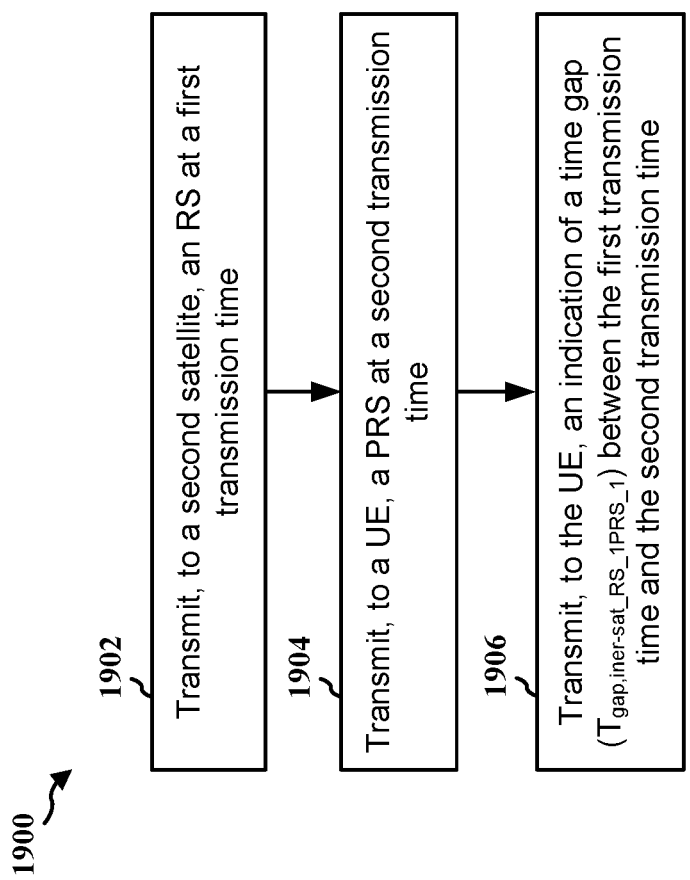
FIG. 19 is a flowchart of a method of wireless communication in accordance with aspects presented herein.

FIG. 19 is a flowchart 1900 of a method of wireless communication. The method may be performed by a satellite or a component of a satellite (e.g., the satellite 902, 1001, 1002, 1504, 1506, 1508; NTN payload 1308; one or more NTN devices 1406; the apparatus 2002; a processing system, which may include the memory 376 and which may be the entire base station 310 or a component of the base station 310, such as the TX processor 316 the RX processor 370, and/or the controller/processor 375). The method may improve the precision and performance of a TDOA-based UE positioning scheme that is associated with an NTN.

At 1902, a first satellite may transmit, to a second satellite, an RS at a first transmission time, such as described in connection with FIG. 15. For example, at 1512, the first satellite 1504 may transmit an inter-satellite RS to the second satellite 1506. The transmission of the RS may be performed by, e.g., the RS configuration component 2040 and/or the transmission component 2034 of the apparatus 2002 in FIG. 20.

At 1904, the first satellite may transmit, to a UE, a PRS at a second transmission time, such as described in connection with FIG. 15. For example, at 1510, the first satellite 1504 may transmit a first PRS to the UE 1502. The transmission of the PRS may be performed by, e.g., the PRS configuration component 2042 and/or the transmission component 2034 of the apparatus 2002 in FIG. 20.

At 1906, the first satellite may transmit, to the UE, an indication of a time gap ($T_{gap,iner-sat\_RS\_1 \to PRS\_1}$) between the first transmission time and the second transmission time, such as described in connection with FIG. 15. For example, at 1518, the first satellite 1504 may transmit to the UE 1502 an indication of transmission time gap between the RS and the first PRS. The transmission of the indication of the time gap may be performed by, e.g., the time gap indication component 2044 and/or the transmission component 2034 of the apparatus 2002 in FIG. 20.

In one example, the second satellite may have a capability to provide baseband onboard processing.

In another example, the RS may be a second PRS.

In another example, the first satellite may receive, from a gateway or an LMF, a resource allocation for transmitting the RS.

In another example, the first satellite may receive, from a gateway or an LMF, a resource allocation for transmitting the RS.

In another example, the first satellite may receive, from a gateway or an LMF, a configuration of one or more transmission beams for transmitting the RS.

Figure 20:
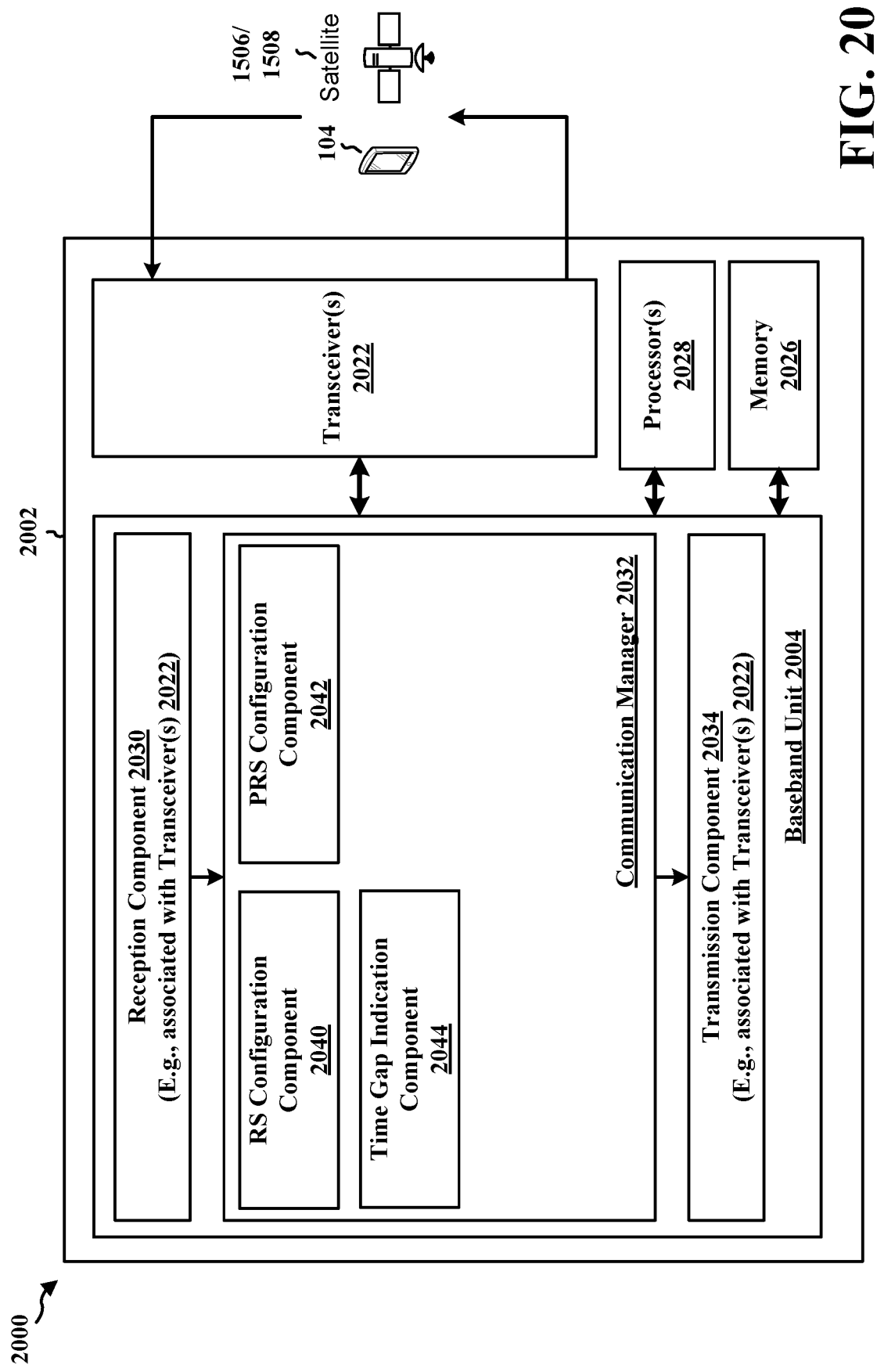
FIG. 20 is a diagram illustrating an example of a hardware implementation for an example apparatus in accordance with aspects presented herein.

FIG. 20 is a diagram 2000 illustrating an example of a hardware implementation for an apparatus 2002. The apparatus 2002 may be a satellite, a component of a satellite, or may implement base station functionality. In some aspects, the apparatus 2002 may include a baseband unit 2004. The baseband unit 2004 may communicate through at least one transceiver 2022 (e.g., one or more RF transceivers and/or antennas) with the UE 104 or with another satellite. The at least one transceiver 2022 may be associated with or include a reception component 2030 and/or a transmission component 2034. The baseband unit 2004 may include a computer-readable medium/memory (e.g., a memory 2026). The baseband unit 2004 and/or the at least one processor 2028 may be responsible for general processing, including the execution of software stored on the computer-readable medium/memory. The software, when executed by the baseband unit 2004 and/or the at least one processor 2028, causes the baseband unit 2004 and/or the at least one processor 2028 to perform the various functions described supra. The computer-readable medium/memory may also be used for storing data that is manipulated by the baseband unit 2004 when executing software. The baseband unit 2004 further includes the reception component 2030, a communication manager 2032, and the transmission component 2034. The reception component 2030 and the transmission component 2034 may, in a non-limiting example, include at least one transceiver and/or at least one antenna subsystem. The communication manager 2032 includes the one or more illustrated components. The components within the communication manager 2032 may be stored in the computer-readable medium/ memory and/or configured as hardware within the baseband unit 2004. The baseband unit 2004 may be a component of the base station and may include the memory 376 and/or at least one of the TX processor 316, the RX processor 370, and the controller/processor 375.

The communication manager 2032 includes an RS configuration component 2040 that transmits, to a second satellite, an RS at a first transmission time, e.g., as described in connection with 1902 of FIG. 19. The communication manager 2032 further includes a PRS configuration component 2042 that transmits, to a UE, a PRS at a second transmission time, e.g., as described in connection with 1904 of FIG. 19. The communication manager 2032 further includes a time gap indication component 2044 that transmits, to the UE, an indication of a time gap ($T_{gap,iner\text{-}sat\_RS\_1 \to PRS\_1}$) between the first transmission time and the second transmission time, e.g., as described in connection with 1906 of FIG. 19.

The apparatus may include additional components that perform each of the blocks of the algorithm in the flowchart of FIG. 19. As such, each block in the flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the baseband unit 2004, includes means for transmitting, to a second satellite, an RS at a first transmission time (e.g., the RS configuration component 2040 and/or the transmission component 2034). The apparatus 2002 includes means for transmitting, to a UE, a PRS at a second transmission time (e.g., the PRS configuration component 2042 and/or the transmission component 2034). The apparatus 2002 includes means for transmitting, to the UE, an indication of a time gap ($T_{gap,iner\text{-}sat\_RS\_1 \to PRS\_1}$) between the first transmission time and the second transmission time (e.g., the time gap indication component 2044 and/or the transmission component 2034).

In one configuration, the second satellite may have a capability to provide baseband onboard processing.

In another configuration, the RS may be a second PRS.

In another configuration, the apparatus 2002 includes means for receiving, from a gateway or an LMF, a resource allocation for transmitting the RS.

In another configuration, the apparatus 2002 includes means for receiving, from a gateway or an LMF, a resource allocation for transmitting the RS.

In another configuration, the apparatus 2002 includes means for receiving, from a gateway or an LMF, a configuration of one or more transmission beams for transmitting the RS.

The means may be one or more of the components of the apparatus 2002 configured to perform the functions recited by the means. As described supra, the apparatus 2002 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 21:
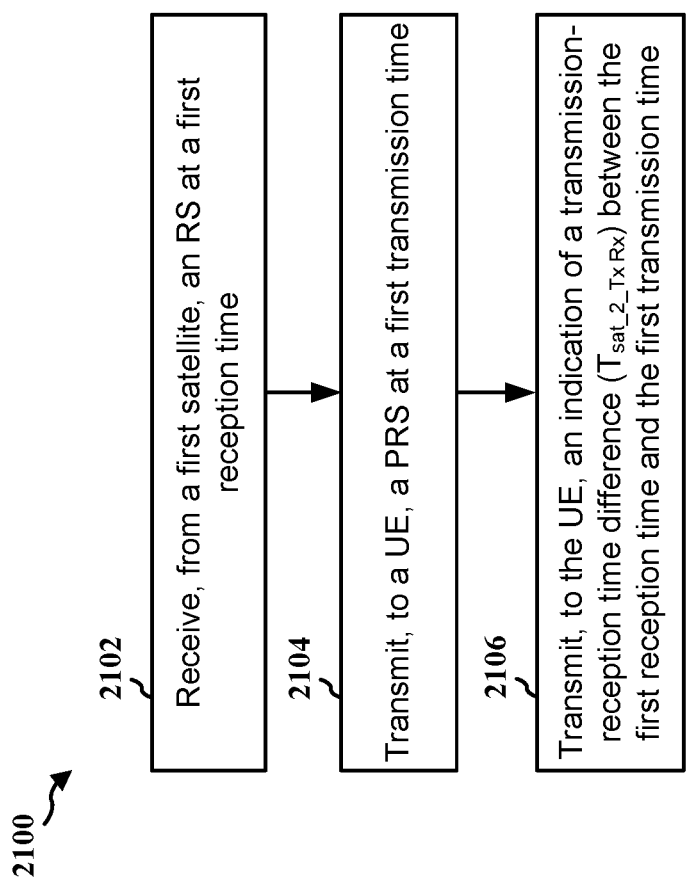
FIG. 21 is a flowchart of a method of wireless communication in accordance with aspects presented herein.

FIG. 21 is a flowchart 2100 of a method of wireless communication. The method may be performed by a satellite or a component of a satellite (e.g., the satellite 902, 1001, 1002, 1504, 1506, 1508; NTN payload 1308; one or more NTN devices 1406; the apparatus 2202; a processing system, which may include the memory 376 and which may be the entire base station 310 or a component of the base station 310, such as the TX processor 316 the RX processor 370, and/or the controller/processor 375). The method may improve the precision and performance of a TDOA-based UE positioning scheme that is associated with an NTN.

At 2102, a second satellite may receive, from a first satellite, an RS at a first reception time, such as described in connection with FIG. 15. For example, at 1512, the second satellite 1506 may receive an inter-satellite RS from the first satellite 1504. The reception of the RS may be performed by, e.g., the RS process component 2240 and/or the reception component 2230 of the apparatus 2202 in FIG. 22.

At 2104, the second satellite may transmit, to a UE, a PRS at a first transmission time, such as described in connection with FIG. 15. For example, at 1514, the second satellite 1506 may transmit a second PRS to the UE 1502. The transmission of the PRS may be performed by, e.g., the PRS configuration component 2242 and/or the transmission component 2234 of the apparatus 2202 in FIG. 22.

At 2106, the second satellite may transmit, to the UE, an indication of a transmission-reception time difference ($T_{sat\_2\_Tx \to Rx}$) between the first reception time and the first transmission time, such as described in connection with FIG. 15. For example, at 1514, the second satellite 1506 may transmit to the UE 1502 an indication of the transmission-reception time difference ($T_{sat\_2\_Tx \to Rx}$). The transmission of the indication of the transmission-reception time difference ($T_{sat\_2\_Tx \to Rx}$) may be performed by, e.g., the Tx-Rx time difference indication component 2244 and/or the transmission component 2234 of the apparatus 2202 in FIG. 22.

In one example, the second satellite may have a capability to provide baseband onboard processing.

In another example, the second satellite may transmit, to the UE, an indication of a signal propagation time ($T_{prop,sat\_1 \to sat\_2}$) between the first satellite and the second satellite.

In another example, the transmission-reception time difference ($T_{sat\_2\_Tx \to Rx}$) may be associated with one or more of: a satellite ID, a TRP ID, a PRS ID, or a timestamp.

In another example, the second satellite may receive, from a gateway or an LMF, a configuration to transmit the PRS based on the RS.

In another example, the second satellite may receive, from a gateway or an LMF, a measurement gap for receiving the RS.

In another example, the RS is a second PRS.

In another example, the second satellite may receive, from a gateway or an LMF, a resource allocation for receiving the RS.

In another example, the second satellite may receive, from a gateway or an LMF, a configuration of one or more reception beams for receiving the RS.

Figure 22:
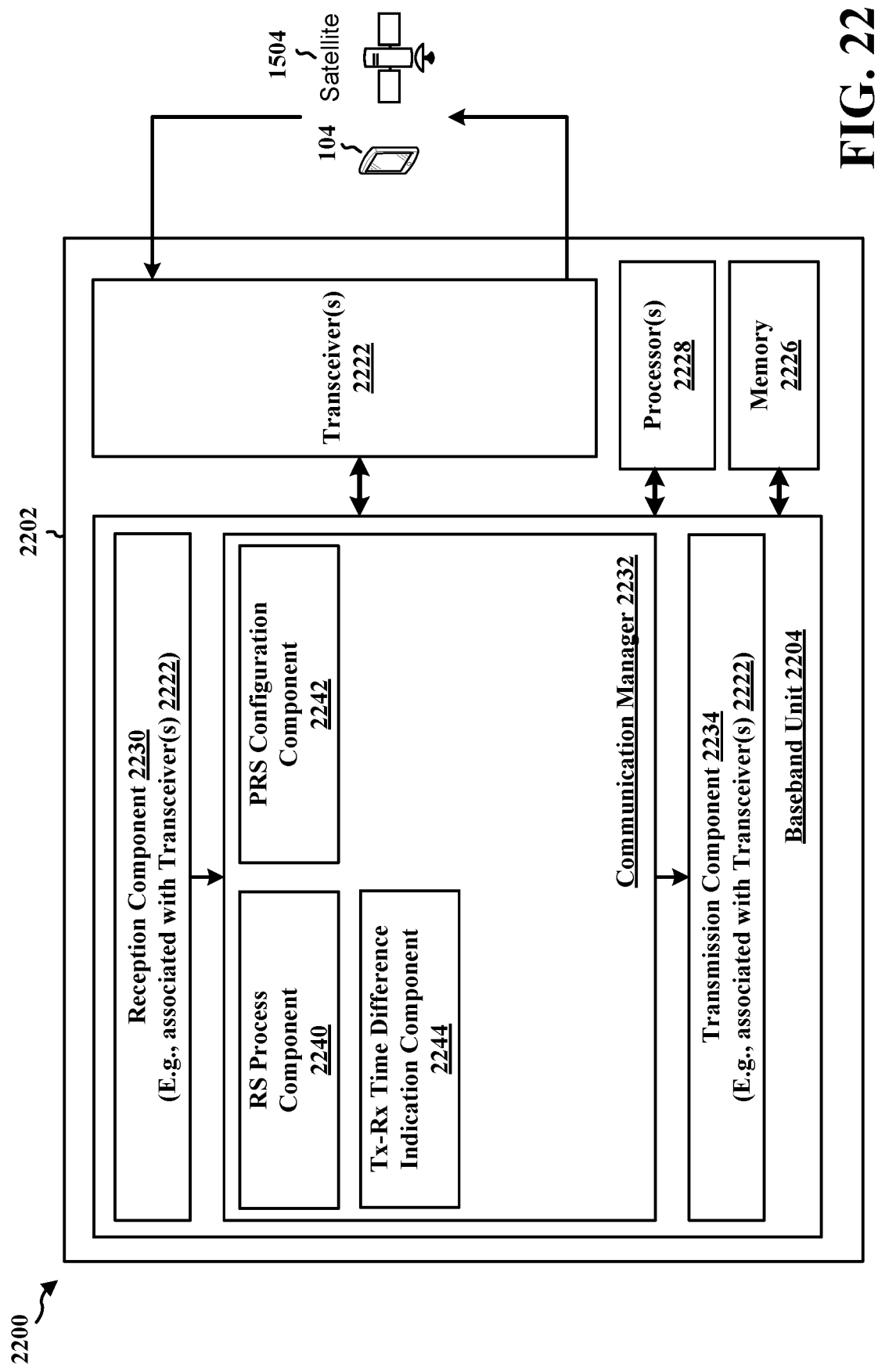
FIG. 22 is a diagram illustrating an example of a hardware implementation for an example apparatus in accordance with aspects presented herein.

FIG. 22 is a diagram 2200 illustrating an example of a hardware implementation for an apparatus 2202. The apparatus 2202 may be a satellite, a component of a satellite, or may implement base station functionality. In some aspects, the apparatus 2202 may include a baseband unit 2204. The baseband unit 2204 may communicate through at least one transceiver 2222 (e.g., one or more RF transceivers and/or antennas) with the UE 104 or with another satellite. The at least one transceiver 2222 may be associated with or include a reception component 2230 and/or a transmission component 2234. The baseband unit 2204 may include a computer-readable medium/memory (e.g., a memory 2226). The baseband unit 2204 and/or the at least one processor 2228 may be responsible for general processing, including the execution of software stored on the computer-readable medium/memory. The software, when executed by the baseband unit 2204 and/or the at least one processor 2228, causes the baseband unit 2204 and/or the at least one processor 2228 to perform the various functions described supra. The computer-readable medium/memory may also be used for storing data that is manipulated by the baseband unit 2204 when executing software. The baseband unit 2204 further includes the reception component 2230, a communication manager 2232, and the transmission component 2234. The reception component 2230 and the transmission component 2234 may, in a non-limiting example, include at least one transceiver and/or at least one antenna subsystem. The communication manager 2232 includes the one or more illustrated components. The components within the communication manager 2232 may be stored in the computer-readable medium/memory and/or configured as hardware within the baseband unit 2204. The baseband unit 2204 may be a component of the base station and may include the memory 376 and/or at least one of the TX processor 316, the RX processor 370, and the controller/processor 375.

The communication manager 2232 includes an RS process component 2240 that receives, from a first satellite, an RS at a first reception time, e.g., as described in connection with 2102 of FIG. 21. The communication manager 2232 further includes a PRS configuration component 2242 that transmits, to a UE, a PRS at a first transmission time, e.g., as described in connection with 2104 of FIG. 21. The communication manager 2232 further includes a Tx-Rx time difference indication component 2244 that transmits, to the UE, an indication of a transmission-reception time difference ($T_{sat\_2\_Tx \to Rx}$) between the first reception time and the first transmission time, e.g., as described in connection with 2106 of FIG. 21.

The apparatus may include additional components that perform each of the blocks of the algorithm in the flowchart of FIG. 21. As such, each block in the flowchart of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2202 may include a variety of components configured for various functions. In one configuration, the apparatus 2202, and in particular the baseband unit 2204, includes means for receiving, from a first satellite, an RS at a first reception time (e.g., the RS process component 2240 and/or the reception component 2230). The apparatus 2202 includes means for transmitting, to a UE, a PRS at a first transmission time (e.g., the PRS configuration component 2242 and/or the transmission component 2234). The apparatus 2202 includes means for transmitting, to the UE, an indication of a transmission-reception time difference ($T_{sat\_2\_Tx \to Rx}$) between the first reception time and the first transmission time (e.g., the Tx-Rx time difference indication component 2244 and/or the transmission component 2234).

In one configuration, the second satellite may have a capability to provide baseband onboard processing.

In another configuration, the second satellite may transmit, to the UE, an indication of a signal propagation time ($T_{prop,sat\_1 \to sat\_2}$) between the first satellite and the second satellite.

In another configuration, the transmission-reception time difference ($T_{sat\_2\_Tx \to Rx}$) may be associated with one or more of: a satellite ID, a TRP ID, a PRS ID, or a time stamp.

In another configuration, the apparatus 2202 includes means for receiving, from a gateway or an LMF, a configuration to transmit the PRS based on the RS.

In another configuration, the apparatus 2202 includes means for receiving, from a gateway or an LMF, a measurement gap for receiving the RS.

In another configuration, the RS is a second PRS.

In another configuration, the apparatus 2202 includes means for receiving, from a gateway or an LMF, a resource allocation for receiving the RS.

In another configuration, the apparatus 2202 includes means for receiving, from a gateway or an LMF, a configuration of one or more reception beams for receiving the RS.

The means may be one or more of the components of the apparatus 2202 configured to perform the functions recited by the means. As described supra, the apparatus 2202 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 23:
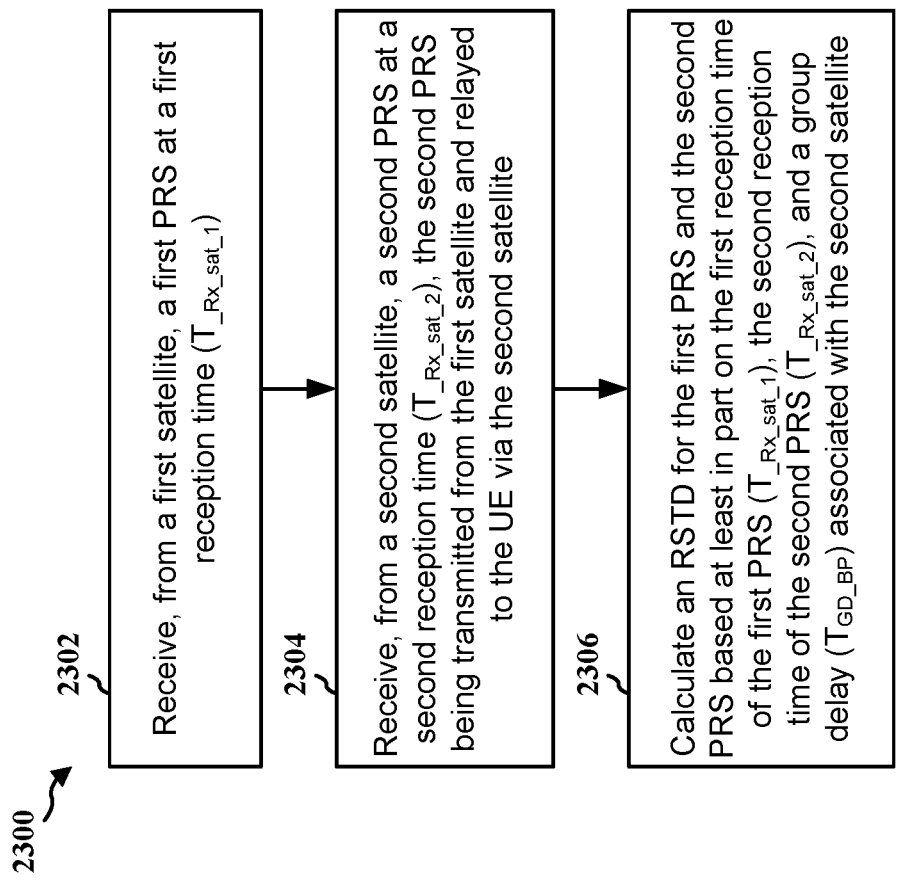
FIG. 23 is a flowchart of a method of wireless communication in accordance with aspects presented herein.

FIG. 23 is a flowchart 2300 of a method of wireless communication. The method may be performed by a UE or a component of a UE (e.g., the UE 104, 350, 404, 602, 802, 1310, 1402, 1502, 1602; the apparatus 2402; a processing system, which may include the memory 360 and which may be the entire UE 350 or a component of the UE 350, such as the TX processor 368, the RX processor 356, and/or the controller/processor 359). The method may improve the precision and performance of a TDOA-based UE positioning scheme that is associated with an NTN.

At 2302, the UE may receive, from a first satellite, a first PRS at a first reception time ($T_{\_Rx \gets sat\_1}$), such as described in connection with FIG. 16. For example, at 1610, the UE 1602 may receive a first PRS from the first satellite 1604 at a first reception time. The reception of the first PRS may be performed by, e.g., the first PRS process component 2440 and/or the reception component 2430 of the apparatus 2402 in FIG. 24.

At 2304, the UE may receive, from a second satellite, a second PRS at a second reception time ($T_{\_Rx \gets sat\_2}$), the second PRS being transmitted from the first satellite and relayed to the UE via the second satellite, such as described in connection with FIG. 16. For example, at 1614, the UE 1602 may receive a second PRS at a second reception time from the second satellite 1606. The reception of the second PRS may be performed by, e.g., the second PRS process component 2442 and/or the reception component 2430 of the apparatus 2402 in FIG. 24.

At 2306, the UE may calculate an RSTD for the first PRS and the second PRS based at least in part on the first reception time of the first PRS ($T_{\_Rx \gets sat\_1}$), the second reception time of the second PRS ($T_{\_Rx \gets sat\_2}$), and a group delay ($T_{GD\_BP}$) associated with the second satellite, such as described in connection with FIG. 16. For example, at 1616, the UE 1602 may calculate an RSTD for the first PRS and the second PRS based on the reception time of the first PRS, the reception time of the second PRS, and a group delay associated with the second satellite 1606. The calculation of the RSTD may be performed by, e.g., the RSTD calculation component 2444 of the apparatus 2402 in FIG. 24.

In one example, the second satellite may not have a capability to provide baseband onboard processing.

In another example, the RSTD for the first PRS and the second PRS ($RSTD_{1\_2}$) may be calculated based on: $RSTD_{1\_2}=T_{-Rx-sat-1}-T_{-Rx-sat-2}-(T_{gap,PRS\_2 \to PRS\_1}+T_{prop,sat\_1 \to sat\_2}+T_{GD\_BP})$, where the $T_{gap,PRS\_2 \to PRS\_1}$ is a time gap between a time the first satellite transmits the first PRS to the UE and a time the first satellite transmits the second PRS to the second satellite, and the $T_{prop,sat\_1 \to sat\_2}$ is a signal propagation time between the first satellite and the second satellite.

In another example, the UE may receive, from the first satellite, an indication of the $T_{gap,PRS\_2 \to PRS\_1}$.

In another example, the UE may receive, from the second satellite, an indication of the $T_{prop,sat\_1 \to sat\_2}$.

In another example, the UE may receive, from an LMF, the group delay ($T_{GD\_BP}$) via AD.

In another example, the group delay ($T_{GD\_BP}$) may be associated with one or more of: a satellite ID or a TRP ID.

In another example, the UE may calculate a position of the UE based at least in part on the RSTD for the first PRS and the second PRS.

In another example, the second PRS may not be a re-generated signal of the first PRS.

Figure 24:
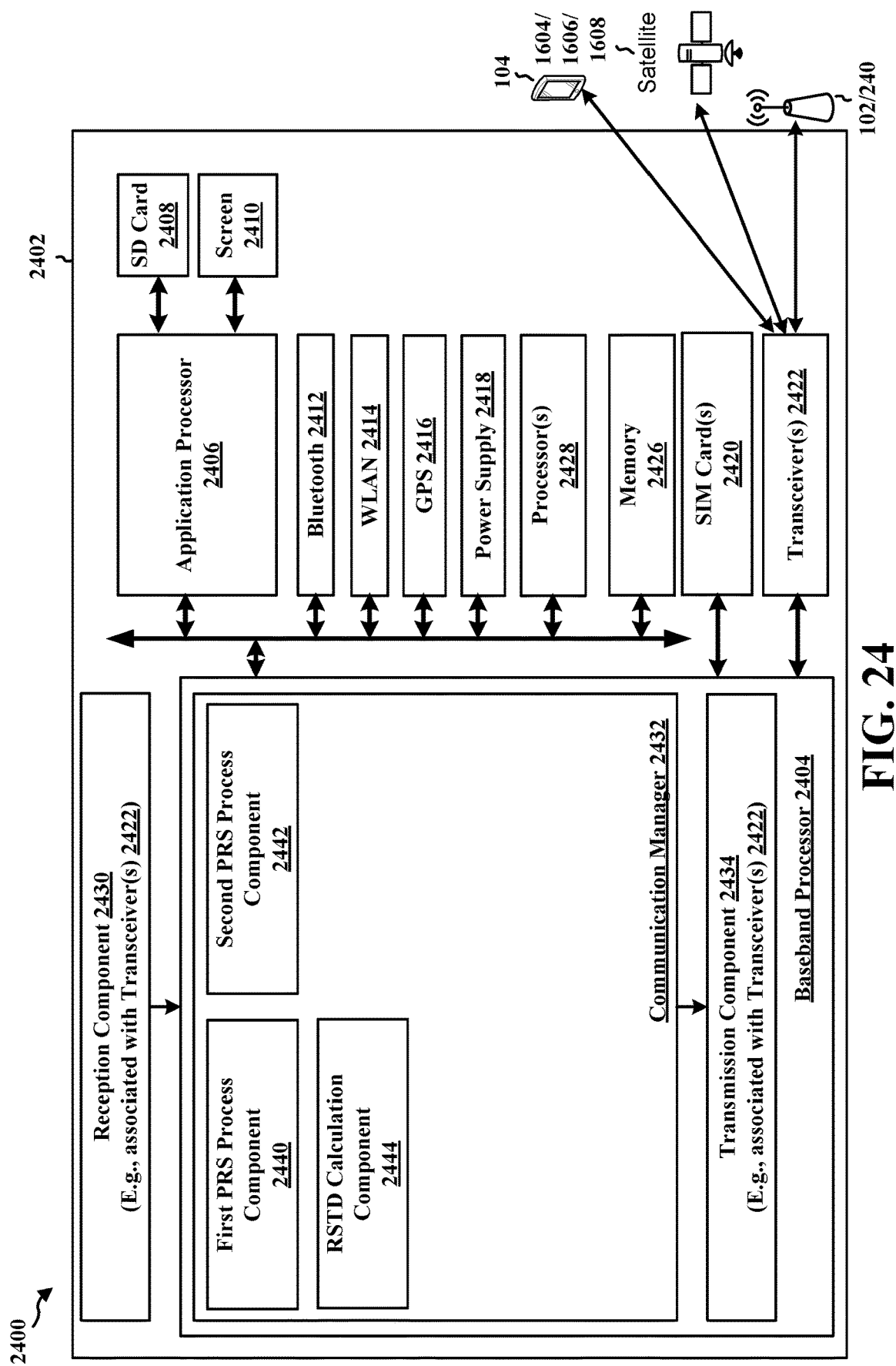
FIG. 24 is a diagram illustrating an example of a hardware implementation for an example apparatus in accordance with aspects presented herein.

FIG. 24 is a diagram 2400 illustrating an example of a hardware implementation for an apparatus 2402. The apparatus 2402 may be a UE, a component of a UE, or may implement UE functionality. In some aspects, the apparatus 2402 may include a baseband processor 2404 (also referred to as a modem) coupled to at least one transceiver 2422 (e.g., one or more RF transceivers and/or antennas). The at least one transceiver 2422 may be associated with or include a reception component 2430 and/or a transmission component 2434. In some aspects, the apparatus 2402 may further include one or more subscriber identity modules (SIM) cards 2420, an application processor 2406 coupled to a secure digital (SD) card 2408 and a screen 2410, a Bluetooth module 2412, a wireless local area network (WLAN) module 2414, a Global Positioning System (GPS) module 2416, or a power supply 2418. The baseband processor 2404 communicates through the at least one transceiver 2422 with the UE 104 and/or BS 102/240. The baseband processor 2404 may include a computer-readable medium/memory (e.g., a memory 2426). The computer-readable medium/memory may be non-transitory. The baseband processor 2404 and/or at least one processor 2428 is responsible for general processing, including the execution of software stored on the computer-readable medium/memory. The software, when executed by the baseband processor 2404 and/or the at least one processor 2428, causes the baseband processor 2404 and/or the at least one processor 2428 to perform the various functions described supra. The computer-readable medium/memory may also be used for storing data that is manipulated by the baseband processor 2404 when executing software. The baseband processor 2404 further includes the reception component 2430, a communication manager 2432, and the transmission component 2434. The reception component 2430 and the transmission component 2434 may, in a non-limiting example, include at least one transceiver and/or at least one antenna subsystem. The communication manager 2432 includes the one or more illustrated components. The components within the communication manager 2432 may be stored in the computer-readable medium/memory and/or configured as hardware within the baseband processor 2404. The baseband processor 2404 may be a component of the UE 350 and may include the memory 360 and/or at least one of the TX processor 368, the RX processor 356, and the controller/processor 359. In one configuration, the apparatus 2402 may be a modem chip and include just the baseband processor 2404, and in another configuration, the apparatus 2402 may be the entire UE (e.g., see 350 of FIG. 3) and include the additional modules of the apparatus 2402.

The communication manager 2432 includes a first PRS process component 2440 that is configured to receive, from a first satellite, a first PRS at a first reception time ($T_{-Rx-sat-1}$), e.g., as described in connection with 2302 of FIG. 23. The communication manager 2432 further includes a second PRS process component 2442 that is configured to receive, from a second satellite, a second PRS at a second reception time ($T_{-Rx-sat-2}$), the second PRS being transmitted from the first satellite and relayed to the UE via the second satellite, e.g., as described in connection with 2304 of FIG. 23. The communication manager 2432 further includes an RSTD calculation component 2444 that is configured to calculate an RSTD for the first PRS and the second PRS based at least in part on the first reception time of the first PRS ($T_{-Rx-sat-1}$), the second reception time of the second PRS ($T_{-Rx-sat-2}$), and a group delay ($T_{GD\_BP}$) associated with the second satellite, e.g., as described in connection with 2306 of FIG. 23.

The apparatus may include additional components that perform each of the blocks of the algorithm in the flowchart of FIG. 23. As such, each block in the flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2402 may include a variety of components configured for various functions. In one configuration, the apparatus 2402, and in particular the baseband processor 2404, includes means for receiving, from a first satellite, a first PRS at a first reception time ($T_{-Rx-sat-1}$) (e.g., the first PRS process component 2440 and/or the reception component 2430). The apparatus 2402 includes means for receiving, from a second satellite, a second PRS at a second reception time ($T_{-Rx-sat-2}$), the second PRS being transmitted from the first satellite and relayed to the UE via the second satellite (e.g., the second PRS process component 2442 and/or the reception component 2430). The apparatus 2402 includes means for calculating an RSTD for the first PRS and the second PRS based at least in part on the first reception time of the first PRS ($T_{-Rx-sat-1}$), the second reception time of the second PRS ($T_{-Rx-sat-2}$), and a group delay ($T_{GD\_BP}$) associated with the second satellite (e.g., the RSTD calculation component 2444).

In one configuration, the second satellite may not have a capability to provide baseband onboard processing.

In another configuration, the RSTD for the first PRS and the second PRS ($RSTD_{1\_2}$) may be calculated based on: $RSTD_{1\_2}=T_{-Rx-sat-1}-T_{-Rx-sat-2}-(T_{gap,PRS\_2 \to PRS\_1}+T_{prop,sat\_1 \to sat\_2}+T_{GD\_BP})$, where the $T_{gap,PRS\_2 \to PRS\_1}$ is a time gap between a time the first satellite transmits the first PRS to the UE and a time the first satellite transmits the second PRS to the second satellite, and the $T_{prop,sat\_1 \to sat\_2}$ is a signal propagation time between the first satellite and the second satellite.

In another configuration, the apparatus 2402 includes means for receiving, from the first satellite, an indication of the $T_{gap,PRS\_2 \rightarrow PRS\_1}$.

In another configuration, the apparatus 2402 includes means for receiving, from the second satellite, an indication of the $T_{prop,sat\_1 \rightarrow sat\_2}$.

In another configuration, the apparatus 2402 includes means for receiving, from an LMF, the group delay ($T_{GD\_BP}$) via AD.

In another configuration, the group delay ($T_{GD\_BP}$) may be associated with one or more of: a satellite ID or a TRP ID.

In another configuration, the apparatus 2402 includes means for calculating a position of the UE based at least in part on the RSTD for the first PRS and the second PRS.

In another configuration, the second PRS may not be a re-generated signal of the first PRS.

Figure 25:
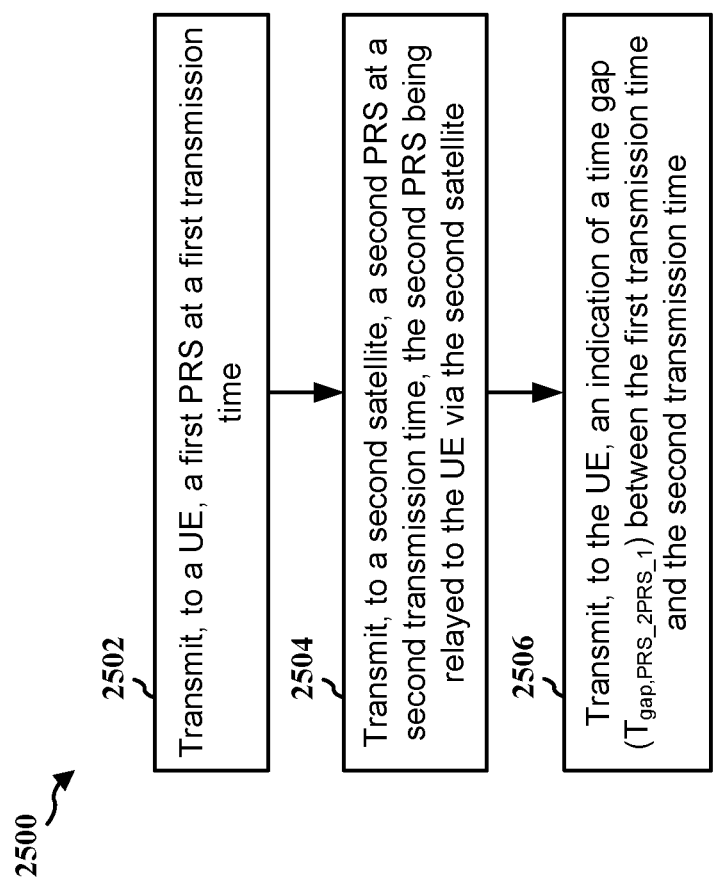
FIG. 25 is a flowchart of a method of wireless communication in accordance with aspects presented herein.

FIG. 25 is a flowchart 2500 of a method of wireless communication. The method may be performed by a satellite or a component of a satellite (e.g., the satellite 902, 1001, 1002, 1504, 1506, 1508, 1604; NTN payload 1308; one or more NTN devices 1406; the apparatus 2602; a processing system, which may include the memory 376 and which may be the entire base station 310 or a component of the base station 310, such as the TX processor 316 the RX processor 370, and/or the controller/processor 375). The method may improve the precision and performance of a TDOA-based UE positioning scheme that is associated with an NTN.

At 2502, a first satellite may transmit, to a UE, a first PRS at a first transmission time, such as described in connection with FIG. 16. For example, at 1610, the first satellite 1604 may transmit a first PRS to the UE 1602. The transmission of the first PRS may be performed by, e.g., the first PRS configuration component 2640 and/or the transmission component 2634 of the apparatus 2602 in FIG. 26.

At 2504, the first satellite may transmit, to a second satellite, a second PRS at a second transmission time, the second PRS being relayed to the UE via the second satellite, such as described in connection with FIG. 16. For example, at 1612, the first satellite 1604 may transmit a second PRS to the second satellite 1606. The transmission of the second PRS may be performed by, e.g., the second PRS configuration component 2642 and/or the transmission component 2634 of the apparatus 2602 in FIG. 26.

At 2506, the first satellite may transmit, to the UE, an indication of a time gap ($T_{gap,PRS\_2 \rightarrow PRS\_1}$) between the first transmission time and the second transmission time, such as described in connection with FIG. 16. For example, at 1618, the first satellite 1604 may transmit to the UE 1602 an indication of transmission time gap between the first PRS and the second PRS. The transmission of the indication of the time gap may be performed by, e.g., the time gap indication component 2644 and/or the transmission component 2634 of the apparatus 2602 in FIG. 26.

In one example, the second satellite may not have a capability to provide baseband onboard processing.

In another example, the UE may receive, from a gateway or an LMF, a resource allocation for transmitting the second PRS.

In another example, the UE may receive, from a gateway or an LMF, a configuration of one or more transmission beams for transmitting the second PRS.

Figure 26:
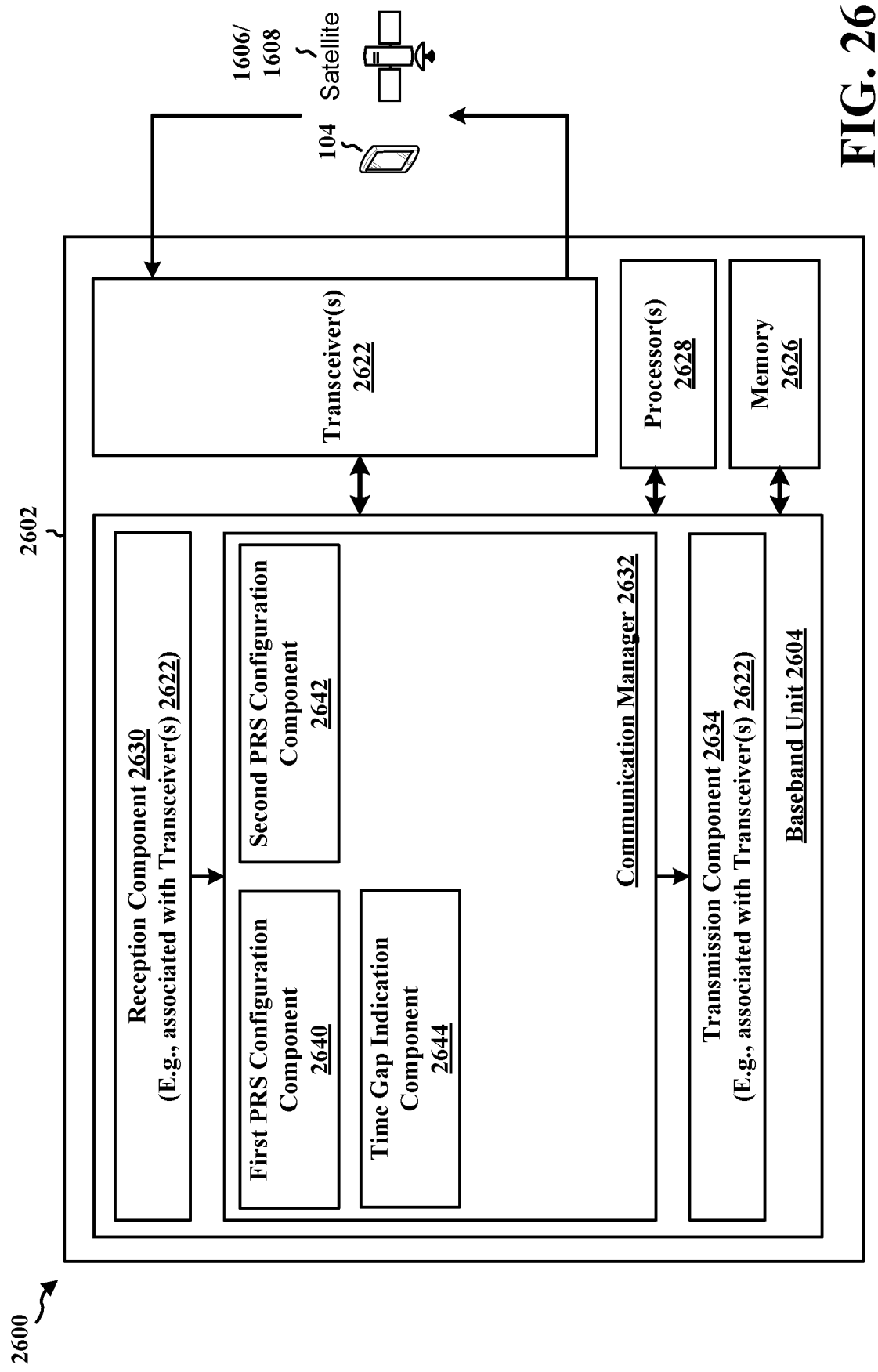
FIG. 26 is a diagram illustrating an example of a hardware implementation for an example apparatus in accordance with aspects presented herein.

FIG. 26 is a diagram 2600 illustrating an example of a hardware implementation for an apparatus 2602. The apparatus 2602 may be a satellite, a component of a satellite, or may implement base station functionality. In some aspects, the apparatus 2602 may include a baseband unit 2604. The baseband unit 2604 may communicate through at least one transceiver 2622 (e.g., one or more RF transceivers and/or antennas) with the UE 104 or with another satellite. The at least one transceiver 2622 may be associated with or include a reception component 2630 and/or a transmission component 2634. The baseband unit 2604 may include a computer-readable medium/memory (e.g., a memory 2626). The baseband unit 2604 and/or the at least one processor 2628 may be responsible for general processing, including the execution of software stored on the computer-readable medium/memory. The software, when executed by the baseband unit 2604 and/or the at least one processor 2628, causes the baseband unit 2604 and/or the at least one processor 2628 to perform the various functions described supra. The computer-readable medium/memory may also be used for storing data that is manipulated by the baseband unit 2604 when executing software. The baseband unit 2604 further includes the reception component 2630, a communication manager 2632, and the transmission component 2634. The reception component 2630 and the transmission component 2634 may, in a non-limiting example, include at least one transceiver and/or at least one antenna subsystem. The communication manager 2632 includes the one or more illustrated components. The components within the communication manager 2632 may be stored in the computer-readable medium/memory and/or configured as hardware within the baseband unit 2604. The baseband unit 2604 may be a component of the base station and may include the memory 376 and/or at least one of the TX processor 316, the RX processor 370, and the controller/processor 375.

The communication manager 2632 includes a first PRS configuration component 2640 that transmits, to a UE, a first PRS at a first transmission time, e.g., as described in connection with 2502 of FIG. 25. The communication manager 2632 further includes a second PRS configuration component 2642 that transmits, to a second satellite, a second PRS at a second transmission time, the second PRS being relayed to the UE via the second satellite, e.g., as described in connection with 2504 of FIG. 25. The communication manager 2632 further includes a time gap indication component 2644 that transmits, to the UE, an indication of a time gap ($T_{gap,PRS\_2 \rightarrow PRS\_1}$) between the first transmission time and the second transmission time, e.g., as described in connection with 2506 of FIG. 25.

The apparatus may include additional components that perform each of the blocks of the algorithm in the flowchart of FIG. 25. As such, each block in the flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2602 may include a variety of components configured for various functions. In one configuration, the apparatus 2602, and in particular the baseband unit 2604, includes means for transmitting, to a UE, a first PRS at a first transmission time (e.g., the first PRS configuration component 2640 and/or the transmission component 2634). The apparatus 2602 includes means for transmitting, to a second satellite, a second PRS at a second transmission time, the second PRS being relayed to the UE via the second satellite (e.g., the second PRS configuration component 2642 and/or the transmission component 2634). The apparatus 2602 includes means for transmitting, to the UE, an indication of a time gap ($T_{gap,PRS\_2 \rightarrow PRS\_1}$) between the first transmission time and the second transmission time (e.g., the time gap indication component 2644 and/or the transmission component 2634).

In one configuration, the second satellite may not have a capability to provide baseband onboard processing.

In another configuration, the apparatus 2602 includes means for receiving, from a gateway or an LMF, a resource allocation for transmitting the second PRS.

In another configuration, the apparatus 2602 includes means for receiving, from a gateway or an LMF, a configuration of one or more transmission beams for transmitting the second PRS.

The means may be one or more of the components of the apparatus 2602 configured to perform the functions recited by the means. As described supra, the apparatus 2602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including a memory; at least one transceiver; and at least one processor communicatively connected to the memory and the at least one transceiver, the at least one processor configured to: receive, from a first satellite, a first PRS at a first reception time ($T_{Rx\_sat\_1}$); receive, from a second satellite, a second PRS at a second reception time ($T_{Rx\_sat\_2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives an RS from the first satellite; and calculate an RSTD for the first PRS and the second PRS based at least in part on the first reception time of the first PRS ($T_{Rx\_sat\_1}$), the second reception time of the second PRS ($T_{Rx\_sat\_2}$), and the transmission-reception time difference ($T_{sat\_2\_Tx \rightarrow Rx}$).

Aspect 2 is the apparatus of aspect 1, where the second satellite has a capability to provide baseband onboard processing.

Aspect 3 is the apparatus of any of aspects 1 and 2, where the RSTD for the first PRS and the second PRS ($RSTD_{1\_2}$) is calculated based on: $RSTD_{1\_2} = T_{Rx\_sat\_1} - T_{Rx\_sat\_2} - (T_{gap,iner-sat\_RS\_1 \rightarrow PRS\_1} + T_{prop,sat\_1 \rightarrow sat\_2} + T_{sat\_2\_Tx \rightarrow Rx})$, where the $T_{gap,iner-sat\_RS\_1 \rightarrow PRS\_1}$ is a time gap between a time the first satellite transmits the first PRS to the UE and a time the first satellite transmits the RS to the second satellite, and the $T_{prop,sat\_1 \rightarrow sat\_2}$ is a signal propagation time between the first satellite and the second satellite.

Aspect 4 is the apparatus of any of aspects 1 to 3, where the at least one processor is further configured to: receive, from the first satellite, an indication of the $T_{gap,iner-sat\_RS\_1 \rightarrow PRS\_1}$.

Aspect 5 is the apparatus of any of aspects 1 to 4, where the at least one processor is further configured to: receive, from the second satellite, an indication of the $T_{prop,sat\_1 \rightarrow sat\_2}$.

Aspect 6 is the apparatus of any of aspects 1 to 5, where the transmission-reception time difference ($T_{sat\_2\_Tx \rightarrow Rx}$) is associated with one or more of: a satellite ID, a TRP ID, a PRS ID, or a timestamp.

Aspect 7 is the apparatus of any of aspects 1 to 6, where the at least one processor is further configured to: calculate a position of the UE based at least in part on the RSTD for the first PRS and the second PRS.

Aspect 8 is a method of wireless communication for implementing any of aspects 1 to 7.

Aspect 9 is an apparatus for wireless communication including means for implementing any of aspects 1 to 7.

Aspect 10 is a computer-readable medium storing computer executable code, where the code when executed by a processor causes the processor to implement any of aspects 1 to 7.

Aspect 11 is an apparatus for wireless communication including a memory; at least one transceiver; and at least one processor communicatively connected to the memory and the at least one transceiver, the at least one processor configured to: transmit, to a second satellite, an RS at a first transmission time; and transmit, to a UE, a PRS at a second transmission time; and transmit, to the UE, an indication of a time gap ($T_{gap,iner\text{-}sat\_RS\_1 \rightarrow PRS\_1}$) between the first transmission time and the second transmission time.

Aspect 12 is the apparatus of aspect 11, where the second satellite has a capability to provide baseband onboard processing.

Aspect 13 is the apparatus of any of aspects 11 to 12, where the RS is a second PRS.

Aspect 14 is the apparatus of any of aspects 11 to 13, where the at least one processor is further configured to: receive, from a gateway or an LMF, a resource allocation for transmitting the RS.

Aspect 15 is the apparatus of any of aspects 11 to 14, where the at least one processor is further configured to: receive, from a gateway or an LMF, a resource allocation for transmitting the RS.

Aspect 16 is the apparatus of any of aspects 11 to 15, where the at least one processor is further configured to: receive, from a gateway or an LMF, a configuration of one or more transmission beams for transmitting the RS.

Aspect 17 is a method of wireless communication for implementing any of aspects 11 to 16.

Aspect 18 is an apparatus for wireless communication including means for implementing any of aspects 11 to 16.

Aspect 19 is a computer-readable medium storing computer executable code, where the code when executed by a processor causes the processor to implement any of aspects 11 to 16.

Aspect 20 is an apparatus for wireless communication including a memory; at least one transceiver; and at least one processor communicatively connected to the memory and the at least one transceiver, the at least one processor configured to: receive, from a first satellite, an RS at a first reception time; and transmit, to a UE, a PRS at a first transmission time; and transmit, to the UE, an indication of a transmission-reception time difference ($T_{sat\_2\_Tx \rightarrow Rx}$) between the first reception time and the first transmission time.

Aspect 21 is the apparatus of aspect 20, where the second satellite has a capability to provide baseband onboard processing.

Aspect 22 is the apparatus of any of aspects 20 and 21, where the at least one processor is further configured to: transmit, to the UE, an indication of a signal propagation time ($T_{prop,sat\_1 \rightarrow sat\_2}$) between the first satellite and the second satellite.

Aspect 23 is the apparatus of any of aspects 20 to 22, where the transmission-reception time difference ($T_{sat\_2\_Tx \rightarrow Rx}$) is associated with one or more of: a satellite ID, a TRP ID, a PRS ID, or a timestamp.

Aspect 24 is the apparatus of any of aspects 20 to 23, where the at least one processor is further configured to: receive, from a gateway or an LMF, a configuration to transmit the PRS based on the RS.

Aspect 25 is the apparatus of any of aspects 20 to 24, where the at least one processor is further configured to: receive, from a gateway or an LMF, a measurement gap for receiving the RS.

Aspect 26 is the apparatus of any of aspects 20 to 25, where the RS is a second PRS.

Aspect 27 is the apparatus of any of aspects 20 to 26, where the at least one processor is further configured to: receive, from a gateway or an LMF, a resource allocation for receiving the RS.

Aspect 28 is the apparatus of any of aspects 20 to 27, where the at least one processor is further configured to: receive, from a gateway or an LMF, a configuration of one or more reception beams for receiving the RS.

Aspect 29 is a method of wireless communication for implementing any of aspects 20 to 28.

Aspect 30 is an apparatus for wireless communication including means for implementing any of aspects 20 to 28.

Aspect 31 is a computer-readable medium storing computer executable code, where the code when executed by a processor causes the processor to implement any of aspects 20 to 28.

Aspect 32 is an apparatus for wireless communication including a memory; at least one transceiver; and at least one processor communicatively connected to the memory and the at least one transceiver, the at least one processor configured to: receive, from a first satellite, a first PRS at a first reception time ($T_{\_Rx-sat-1}$); receive, from a second satellite, a second PRS at a second reception time ($T_{\_Rx-sat-2}$), the second PRS being transmitted from the first satellite and relayed to the UE via the second satellite; and calculate an RSTD for the first PRS and the second PRS based at least in part on the first reception time of the first PRS ($T_{\_Rx-sat-1}$), the second reception time of the second PRS ($T_{\_Rx-sat-2}$), and a group delay ($T_{GD\_BP}$) associated with the second satellite.

Aspect 33 is the apparatus of aspect 32, where the second satellite does not have a capability to provide baseband onboard processing.

Aspect 34 is the apparatus of any of aspects 32 and 33, where the RSTD for the first PRS and the second PRS ($RSTD_{\_1\_2}$) is calculated based on: $RSTD_{\_1\_2} = T_{\_Rx-sat-1} - T_{\_Rx-sat-2} - (T_{gap,PRS\_2 \rightarrow PRS\_1} + T_{prop,sat\_1 \rightarrow sat\_2} + T_{GD\_BP})$, where the $T_{gap,PRS\_2 \rightarrow PRS\_1}$ is a time gap between a time the first satellite transmits the first PRS to the UE and a time the first satellite transmits the second PRS to the second satellite, and the $T_{prop,sat\_1 \rightarrow sat\_2}$ is a signal propagation time between the first satellite and the second satellite.

Aspect 35 is the apparatus of any of aspects 32 to 34, where the at least one processor is further configured to: receive, from the first satellite, an indication of the $T_{gap,PRS\_2 \rightarrow PRS\_1}$.

Aspect 36 is the apparatus of any of aspects 32 to 35, where the at least one processor is further configured to: receive, from the second satellite, an indication of the $T_{prop,sat\_1 \rightarrow sat\_2}$.

Aspect 37 is the apparatus of any of aspects 32 to 36, where the at least one processor is further configured to: receive, from an LMF, the group delay ($T_{GD\_BP}$) via assistance data.

Aspect 38 is the apparatus of any of aspects 32 to 37, where the group delay ($T_{GD\_BP}$) is associated with one or more of: a satellite ID or a TRP ID.

Aspect 39 is the apparatus of any of aspects 32 to 38, where the at least one processor is further configured to: calculate a position of the UE based at least in part on the RSTD for the first PRS and the second PRS.

Aspect 40 is the apparatus of any of aspects 32 to 39, where the second PRS is not a re-generated signal of the first PRS.

Aspect 41 is a method of wireless communication for implementing any of aspects 32 to 40.

Aspect 42 is an apparatus for wireless communication including means for implementing any of aspects 32 to 40.

Aspect 43 is a computer-readable medium storing computer executable code, where the code when executed by a processor causes the processor to implement any of aspects 32 to 40.

Aspect 44 is an apparatus for wireless communication including a memory; at least one transceiver; and at least one processor communicatively connected to the memory and the at least one transceiver, the at least one processor configured to: transmit, to a UE, a first PRS at a first transmission time; transmit, to a second satellite, a second PRS at a second transmission time, the second PRS being relayed to the UE via the second satellite; and transmit, to the UE, an indication of a time gap ($T_{gap,PRS\_2 \rightarrow PRS\_1}$) between the first transmission time and the second transmission time.

Aspect 45 is the apparatus of aspect 44, where the second satellite does not have a capability to provide baseband onboard processing.

Aspect 46 is the apparatus of any of aspects 44 and 45, where the at least one processor is further configured to: receive, from a gateway or an LMF, a resource allocation for transmitting the second PRS.

Aspect 47 is the apparatus of any of aspects 44 to 46, where the at least one processor is further configured to: receive, from a gateway or an LMF, a configuration of one or more transmission beams for transmitting the second PRS.

Aspect 48 is a method of wireless communication for implementing any of aspects 44 to 47.

Aspect 49 is an apparatus for wireless communication including means for implementing any of aspects 44 to 47.

Aspect 50 is a computer-readable medium storing computer executable code, where the code when executed by a processor causes the processor to implement any of aspects 44 to 47.

Aspect 51 is an apparatus for wireless communication including a memory; at least one transceiver; and at least one processor communicatively connected to the memory and the at least one transceiver, the at least one processor configured to: receive, from a first satellite, a PRS at a first reception time; and relay, to a UE, the PRS at a first relay time.

Aspect 52 is the apparatus of aspect 51, where the at least one processor is further configured to: transmit, to the UE, an indication of a signal propagation time between the first satellite and the second satellite ($T_{prop,sat\_1 \rightarrow sat\_2}$).

Aspect 53 is the apparatus of any of aspects 51 and 52, where the second satellite does not have a capability to provide baseband onboard processing.

Aspect 54 is the apparatus of any of aspects 51 to 53, where the at least one processor is further configured to: receive, from a gateway or an LMF, a configuration to relay the PRS.

Aspect 55 is a method of wireless communication for implementing any of aspects 51 to 54.

Aspect 56 is an apparatus for wireless communication including means for implementing any of aspects 51 to 54.

Aspect 57 is a computer-readable medium storing computer executable code, where the code when executed by a processor causes the processor to implement any of aspects 51 to 54.

What is claimed is:

1. An apparatus for wireless communication at a user equipment (UE), comprising:
   memory;
   at least one transceiver; and
   at least one processor communicatively connected to the memory and the at least one transceiver, the at least one processor configured to:
   receive, from a first satellite, a first positioning reference signal (PRS) at a first reception time ($T_{\_Rx-sat-1}$);
   receive, from a second satellite, a second PRS at a second reception time ($T_{\_Rx-sat-2}$) and an indication of a transmission-reception time difference ($T_{sat\_2\_Tx \rightarrow Rx}$), the transmission-reception time difference ($T_{sat\_2\_Tx \rightarrow Rx}$) being a difference between a time the second satellite transmits the second PRS to the UE and a time the second satellite receives a reference signal (RS) from the first satellite; and
   calculate a reference signal time difference (RSTD) for the first PRS and the second PRS based at least in part on the first reception time of the first PRS ($T_{\_Rx-sat-1}$), the second reception time of the second PRS ($T_{\_Rx-sat-2}$), and the transmission-reception time difference ($T_{sat\_2\_Tx \rightarrow Rx}$).

2. The apparatus of claim 1, wherein the RSTD for the first PRS and the second PRS (RSTD$_{\_1\_2}$) is calculated based on:

$$RSTD\_1\_2 = T_{\_Rx\_sat\_1} - T_{\_Rx-sat-2} - (T_{gap,iner-sat\_RS\_1 \rightarrow PRS\_1} + T_{prop,sat\_1 \rightarrow sat\_2} + T_{sat\_2\_Tx \rightarrow Rx}),$$

wherein the $T_{gap,iner-sat\_RS\_1 \rightarrow PRS\_1}$ is a time gap between a time the first satellite transmits the first PRS to the UE and a time the first satellite transmits the RS to the second satellite, and the $T_{prop,sat\_1 \rightarrow sat\_2}$ is a signal propagation time between the first satellite and the second satellite.

3. The apparatus of claim 2, wherein the at least one processor is further configured to:
   receive, from the first satellite, an indication of the $T_{gap,iner-sat\_RS\_1 \rightarrow PRS\_1}$.

4. The apparatus of claim 2, wherein the at least one processor is further configured to:
   receive, from the second satellite, an indication of the $T_{prop,sat\_1 \rightarrow sat\_2}$.

5. The apparatus of claim 1, wherein the transmission-reception time difference ($T_{sat\_2\_Tx \rightarrow Rx}$) is associated with one or more of: a satellite identifier (ID), a transmission reception point (TRP) ID, a PRS ID, or a timestamp.

6. The apparatus of claim 1, wherein the at least one processor is further configured to:
   calculate a position of the UE based at least in part on the RSTD for the first PRS and the second PRS.

7. An apparatus for wireless communication at a first satellite, comprising:
   memory;
   at least one transceiver; and
   at least one processor communicatively connected to the memory and the at least one transceiver, the at least one processor configured to:
   transmit, to a second satellite, a reference signal (RS) at a first transmission time;
   transmit, to a user equipment (UE), a positioning reference signal (PRS) at a second transmission time; and transmit, to the UE, an indication of a time gap ($T_{gap,iner\text{-}sat\_RS\_1 \rightarrow PRS\_1}$) between the first transmission time and the second transmission time.

8. The apparatus of claim 7, wherein the second satellite has a capability to provide baseband onboard processing.

9. The apparatus of claim 7, wherein the RS is a second PRS.

10. The apparatus of claim 7, wherein the at least one processor is further configured to:
receive, from a gateway or a location management function (LMF), a resource allocation for transmitting the RS.

11. The apparatus of claim 7, wherein the at least one processor is further configured to:
receive, from a gateway or a location management function (LMF), a resource allocation for transmitting the RS.

12. The apparatus of claim 7, wherein the at least one processor is further configured to:
receive, from a gateway or a location management function (LMF), a configuration of one or more transmission beams for transmitting the RS.

13. An apparatus for wireless communication at a second satellite, comprising:
memory;
at least one transceiver; and
at least one processor communicatively connected to the memory and the at least one transceiver, the at least one processor configured to:
receive, from a first satellite, a reference signal (RS) at a first reception time;
transmit, to a user equipment (UE), a positioning reference signal (PRS) at a first transmission time; and
transmit, to the UE, an indication of a transmission-reception time difference ($T_{sat\_2\_Tx \rightarrow Rx}$) between the first reception time and the first transmission time.

14. The apparatus of claim 13, wherein the second satellite has a capability to provide baseband onboard processing.

15. The apparatus of claim 13, wherein the at least one processor is further configured to:
transmit, to the UE, an indication of a signal propagation time ($T_{prop,sat\_1 \rightarrow sat\_2}$) between the first satellite and the second satellite.

16. The apparatus of claim 13, wherein the transmission-reception time difference ($T_{sat\_2\_Tx \rightarrow Rx}$) is associated with one or more of: a satellite identifier (ID), a transmission reception point (TRP) ID, a PRS ID, or a timestamp.

17. The apparatus of claim 13, wherein the at least one processor is further configured to:
receive, from a gateway or a location management function (LMF), a configuration to transmit the PRS based on the RS.

18. The apparatus of claim 13, wherein the at least one processor is further configured to:
receive, from a gateway or a location management function (LMF), a measurement gap for receiving the RS.

19. The apparatus of claim 13, wherein the RS is a second PRS.

20. The apparatus of claim 13, wherein the at least one processor is further configured to:
receive, from a gateway or a location management function (LMF), a resource allocation for receiving the RS.

21. The apparatus of claim 13, wherein the at least one processor is further configured to:
receive, from a gateway or a location management function (LMF), a configuration of one or more reception beams for receiving the RS.

22. An apparatus for wireless communication at a user equipment (UE), comprising:
memory;
at least one transceiver; and
at least one processor communicatively connected to the memory and the at least one transceiver, the at least one processor configured to:
receive, from a first satellite, a first positioning reference signal (PRS) at a first reception time ($T_{\_Rx\_sat\_1}$);
receive, from a second satellite, a second PRS at a second reception time ($T_{\_Rx\_sat\_2}$), the second PRS being transmitted from the first satellite and relayed to the UE via the second satellite; and
calculate a reference signal time difference (RSTD) for the first PRS and the second PRS based at least in part on the first reception time of the first PRS ($T_{\_Rx\_sat\_1}$), the second reception time of the second PRS ($T_{\_Rx\_sat\_2}$), and a group delay ($T_{GD\_BP}$) associated with the second satellite.

23. The apparatus of claim 22, wherein the second satellite does not have a capability to provide baseband onboard processing.

24. The apparatus of claim 22, wherein the RSTD for the first PRS and the second PRS (RSTD$_{\_1\_2}$) is calculated based on:

$$RSTD\_1\_2 = T_{\_Rx\_sat\_1} - T_{\_Rx\_sat\_2} - (T_{gap,PRS\_2 \rightarrow PRS\_1} + T_{prop,sat\_1 \rightarrow sat\_2} + T_{GD\_BP}),$$

wherein the $T_{gap,PRS\_2 \rightarrow PRS\_1}$ is a time gap between a time the first satellite transmits the first PRS to the UE and a time the first satellite transmits the second PRS to the second satellite, and the $T_{prop,sat\_1 \rightarrow sat\_2}$ is a signal propagation time between the first satellite and the second satellite.

25. The apparatus of claim 24, wherein the at least one processor is further configured to:
receive, from the first satellite, an indication of the $T_{gap,PRS\_2 \rightarrow PRS\_1}$.

26. The apparatus of claim 24, wherein the at least one processor is further configured to:
receive, from the second satellite, an indication of the $T_{prop,sat\_1 \rightarrow sat\_2}$.

27. The apparatus of claim 22, wherein the at least one processor is further configured to:
receive, from a location management function (LMF), the group delay ($T_{GD\_BP}$) via assistance data (AD).

28. The apparatus of claim 22, wherein the group delay ($T_{GD\_BP}$) is associated with one or more of: a satellite identifier (ID) or a transmission reception point (TRP) ID.

29. The apparatus of claim 22, wherein the at least one processor is further configured to:
calculate a position of the UE based at least in part on the RSTD for the first PRS and the second PRS.

30. The apparatus of claim 22, wherein the second PRS is not a re-generated signal of the first PRS.

* * * * *